United States Patent
Calley et al.

(10) Patent No.: US 8,836,196 B2
(45) Date of Patent: Sep. 16, 2014

(54) TRANSVERSE AND/OR COMMUTATED FLUX SYSTEMS HAVING SEGMENTED STATOR LAMINATIONS

(71) Applicant: Electric Torque Machines, Inc., Flagstaff, AZ (US)

(72) Inventors: David G. Calley, Flagstaff, AZ (US); Daniel S. Cole, Flagstaff, AZ (US); John M. Dyer, Flagstaff, AZ (US); Thomas F. Janecek, Flagstaff, AZ (US); Tyler K. Williams, Flagstaff, AZ (US)

(73) Assignee: Electric Torque Machines, Inc., Flagstaff, AZ (US)

( * ) Notice: Subject to any disclaimer, the term of this patent is extended or adjusted under 35 U.S.C. 154(b) by 0 days.

(21) Appl. No.: 13/797,671

(22) Filed: Mar. 12, 2013

(65) Prior Publication Data

US 2013/0264905 A1    Oct. 10, 2013

Related U.S. Application Data

(62) Division of application No. 13/291,373, filed on Nov. 8, 2011, now Pat. No. 8,405,275.

(60) Provisional application No. 61/414,769, filed on Nov. 17, 2010, provisional application No. 61/414,774, filed on Nov. 17, 2010, provisional application No. 61/414,781, filed on Nov. 17, 2010, provisional application No. 61/453,075, filed on Mar. 15, 2011.

(51) Int. Cl.
    *H02K 1/06*    (2006.01)

(52) U.S. Cl.
    USPC .................................. 310/216.133

(58) Field of Classification Search
    CPC ..... H02K 21/227; H02K 1/14; H02K 21/125; H02K 2201/12; H02K 1/145
    USPC .................... 310/216.001–216.137
    See application file for complete search history.

(56) References Cited

U.S. PATENT DOCUMENTS

| | | |
|---|---|---|
| 1,361,136 A | 12/1920 | Burke |
| 1,809,197 A | 6/1931 | Fendrich, Jr. |
| 2,078,668 A | 4/1937 | Kilgore |
| 2,122,307 A | 6/1938 | Welch |
| 3,403,273 A | 9/1968 | Higuchi |
| 3,437,854 A | 4/1969 | Olso |

(Continued)

FOREIGN PATENT DOCUMENTS

| | | |
|---|---|---|
| DE | 1513856 | 4/1969 |
| DE | 3626149 | 8/1986 |

(Continued)

OTHER PUBLICATIONS

Office Action dated May 19, 2010 for U.S. Appl. No. 12/149,934.

(Continued)

*Primary Examiner* — Hanh Nguyen
(74) *Attorney, Agent, or Firm* — Pillsbury Winthrop Shaw Pittman LLP

(57) ABSTRACT

Electrical machines, for example transverse flux machines and/or commutated flux machines, may be configured to achieve increased efficiency, increased output torque, and/or reduced operating losses via use of laminated materials, for example laminated materials configured with cuts and/or segmentations. Segmentations may also assist with manufacturability, mechanical retention of components, and the like.

15 Claims, 33 Drawing Sheets

(56) References Cited

U.S. PATENT DOCUMENTS

| | | | |
|---|---|---|---|
| 3,558,941 A | 1/1971 | Visconti Brebbia et al. |
| 3,700,942 A | 10/1972 | Alth |
| 3,710,158 A | 1/1973 | Bachle et al. |
| 3,774,059 A | 11/1973 | Cox |
| 3,869,625 A | 3/1975 | Sawyer |
| 3,984,711 A | 10/1976 | Kordik |
| 3,999,107 A | 12/1976 | Reuting |
| 4,021,691 A | 5/1977 | Dukshtau et al. |
| 4,114,057 A | 9/1978 | Esters |
| 4,127,802 A | 11/1978 | Johnson |
| 4,206,374 A | 6/1980 | Goddijn |
| 4,237,396 A | 12/1980 | Blenkinsop et al. |
| 4,237,397 A | 12/1980 | Mohr et al. |
| 4,255,684 A | 3/1981 | Mischler et al. |
| 4,255,696 A | 3/1981 | Field, II |
| 4,286,180 A | 8/1981 | Langley |
| 4,306,164 A | 12/1981 | Itoh et al. |
| 4,339,875 A | 7/1982 | Muller |
| 4,363,988 A | 12/1982 | Kliman |
| 4,388,545 A | 6/1983 | Honsinger et al. |
| 4,392,072 A | 7/1983 | Rosenberry |
| 4,459,501 A | 7/1984 | Fawzy |
| 4,501,980 A | 2/1985 | Welburn |
| 4,508,984 A | 4/1985 | Guedj |
| 4,605,874 A | 8/1986 | Whiteley |
| 4,611,139 A | 9/1986 | Godkin et al. |
| 4,620,752 A | 11/1986 | Fremerey et al. |
| 4,639,626 A | 1/1987 | McGee |
| 4,658,166 A | 4/1987 | Oudet |
| 4,704,555 A | 11/1987 | Stokes |
| 4,794,286 A | 12/1988 | Taenzer |
| 4,797,602 A | 1/1989 | West |
| 4,801,834 A | 1/1989 | Stokes |
| 4,835,840 A | 6/1989 | Stokes |
| 4,850,100 A | 7/1989 | Stokes |
| 4,857,786 A | 8/1989 | Nihei et al. |
| 4,883,999 A | 11/1989 | Hendershot |
| 4,899,072 A | 2/1990 | Ohta |
| 4,900,965 A | 2/1990 | Fisher |
| 4,959,577 A | 9/1990 | Radomski |
| 4,990,812 A | 2/1991 | Nam |
| 5,015,903 A | 5/1991 | Hancock |
| 5,038,066 A | 8/1991 | Pawlak et al. |
| 5,051,641 A | 9/1991 | Weh |
| 5,062,012 A | 10/1991 | Maeda et al. |
| 5,097,167 A | 3/1992 | Kanayama et al. |
| 5,117,142 A | 5/1992 | von Zweygbergk |
| 5,130,595 A | 7/1992 | Arora |
| 5,132,581 A | 7/1992 | Kusase |
| 5,177,054 A | 1/1993 | Lloyd et al. |
| 5,195,231 A | 3/1993 | Fanning et al. |
| 5,208,503 A | 5/1993 | Hisey |
| 5,212,419 A | 5/1993 | Fisher et al. |
| 5,214,333 A | 5/1993 | Kawamura |
| 5,250,865 A | 10/1993 | Meeks |
| 5,262,746 A | 11/1993 | Masuda |
| 5,278,470 A | 1/1994 | Neag |
| 5,289,072 A | 2/1994 | Lange |
| 5,306,977 A | 4/1994 | Hayashi |
| 5,338,996 A | 8/1994 | Yamamoto |
| 5,370,200 A | 12/1994 | Takata |
| 5,382,859 A | 1/1995 | Huang et al. |
| 5,386,166 A | 1/1995 | Reimer et al. |
| 5,474,148 A | 12/1995 | Takata |
| 5,477,841 A | 12/1995 | Trost et al. |
| 5,485,072 A | 1/1996 | Fehringer |
| 5,530,308 A | 6/1996 | Fanning et al. |
| 5,543,674 A | 8/1996 | Koehler |
| 5,543,677 A | 8/1996 | Fakler |
| 5,633,551 A | 5/1997 | Weh |
| 5,650,680 A | 7/1997 | Chula |
| 5,696,419 A | 12/1997 | Rakestraw et al. |
| 5,712,521 A | 1/1998 | Detela |
| 5,717,262 A | 2/1998 | Muller et al. |
| 5,723,921 A | 3/1998 | Sugiura |
| 5,726,514 A | 3/1998 | Wurz et al. |
| 5,729,065 A | 3/1998 | Fremery et al. |
| 5,731,649 A | 3/1998 | Caamano |
| 5,773,910 A | 6/1998 | Lange |
| 5,777,418 A | 7/1998 | Lange et al. |
| 5,780,953 A | 7/1998 | Umeda et al. |
| 5,814,907 A | 9/1998 | Bandera |
| 5,839,530 A | 11/1998 | Dietzel |
| 5,879,265 A | 3/1999 | Bek |
| 5,886,449 A | 3/1999 | Mitcham |
| 5,889,348 A | 3/1999 | Muhlberger et al. |
| 5,894,183 A | 4/1999 | Borchert |
| 5,909,339 A | 6/1999 | Hong |
| 5,925,965 A | 7/1999 | Li et al. |
| 5,942,828 A | 8/1999 | Hill |
| 5,954,779 A | 9/1999 | Dietzel |
| 5,973,436 A | 10/1999 | Mitcham |
| 5,994,802 A | 11/1999 | Shichijyo et al. |
| 5,994,814 A | 11/1999 | Kawabata |
| 6,028,377 A | 2/2000 | Sakamoto |
| 6,043,579 A | 3/2000 | Hill |
| 6,060,810 A | 5/2000 | Lee et al. |
| 6,066,906 A | 5/2000 | Kalsi |
| 6,097,118 A | 8/2000 | Hull |
| 6,097,126 A | 8/2000 | Takura |
| 6,118,159 A | 9/2000 | Fan |
| 6,121,712 A | 9/2000 | Sakamoto |
| 6,133,655 A | 10/2000 | Suzuki et al. |
| 6,133,664 A | 10/2000 | Torok et al. |
| 6,133,669 A | 10/2000 | Tupper |
| 6,137,202 A | 10/2000 | Holmes et al. |
| 6,154,013 A | 11/2000 | Caamano |
| 6,163,097 A | 12/2000 | Smith et al. |
| 6,175,177 B1 | 1/2001 | Sabinski et al. |
| 6,177,748 B1 | 1/2001 | Katcher et al. |
| 6,181,035 B1 | 1/2001 | Acquaviva |
| 6,194,799 B1 | 2/2001 | Miekka et al. |
| 6,215,616 B1 | 4/2001 | Phan et al. |
| 6,229,238 B1 | 5/2001 | Graef |
| 6,232,693 B1 | 5/2001 | Gierer et al. |
| 6,236,131 B1 | 5/2001 | Schafer |
| 6,246,561 B1 | 6/2001 | Flynn |
| 6,276,479 B1 | 8/2001 | Suzuki et al. |
| 6,278,216 B1 | 8/2001 | Li |
| 6,288,467 B1 | 9/2001 | Lange et al. |
| 6,300,702 B1 | 10/2001 | Jack et al. |
| 6,304,010 B1 | 10/2001 | Sugiura |
| 6,333,582 B1 | 12/2001 | Asao |
| 6,342,746 B1 | 1/2002 | Flynn |
| 6,365,999 B1 | 4/2002 | Muhlberger et al. |
| 6,445,105 B1 | 9/2002 | Kliman et al. |
| 6,448,686 B1* | 9/2002 | Dawson et al. ........ 310/216.051 |
| 6,448,687 B2 | 9/2002 | Higashino et al. |
| 6,455,970 B1 | 9/2002 | Shafer et al. |
| 6,472,792 B1 | 10/2002 | Jack et al. |
| 6,492,758 B1 | 12/2002 | Gianni et al. |
| 6,508,321 B1 | 1/2003 | Mueller |
| 6,545,382 B1 | 4/2003 | Bennett |
| 6,603,060 B1 | 8/2003 | Ohashi et al. |
| 6,603,237 B1 | 8/2003 | Caamano |
| 6,629,574 B2 | 10/2003 | Turner |
| 6,657,329 B2 | 12/2003 | Kastinger et al. |
| 6,664,704 B2 | 12/2003 | Calley |
| 6,700,271 B2 | 3/2004 | Detela |
| 6,707,208 B2 | 3/2004 | Durham et al. |
| 6,717,297 B2 | 4/2004 | Sadarangani et al. |
| 6,750,582 B1 | 6/2004 | Neet |
| 6,765,321 B2 | 7/2004 | Sakamoto |
| 6,774,512 B2 | 8/2004 | Takagi et al. |
| 6,791,225 B2 | 9/2004 | Campbell et al. |
| 6,794,791 B2 | 9/2004 | Ben Ahmed et al. |
| 6,806,602 B2 | 10/2004 | Hilzinger |
| 6,815,863 B1 | 11/2004 | Jack et al. |
| 6,835,941 B1 | 12/2004 | Tanaka |
| 6,841,908 B2 | 1/2005 | Hasegawa |
| 6,847,135 B2 | 1/2005 | Kastinger et al. |
| 6,849,985 B2 | 2/2005 | Jack et al. |
| 6,853,112 B2 | 2/2005 | Nakamura et al. |
| 6,866,111 B2 | 3/2005 | Dube |

(56) References Cited

U.S. PATENT DOCUMENTS

| | | |
|---|---|---|
| 6,867,530 B2 | 3/2005 | Gamm et al. |
| 6,879,080 B2 | 4/2005 | Caamano |
| 6,882,066 B2 | 4/2005 | Kastinger |
| 6,882,077 B2 | 4/2005 | Neet |
| 6,885,124 B2 | 4/2005 | Neet |
| 6,885,129 B1 | 4/2005 | Oohashi et al. |
| 6,888,272 B2 | 5/2005 | Kastinger |
| 6,924,576 B2 | 8/2005 | Zierer et al. |
| 6,924,579 B2 | 8/2005 | Calley |
| 6,940,197 B2 | 9/2005 | Fujita et al. |
| 6,949,855 B2 | 9/2005 | Dubois et al. |
| 6,952,068 B2 | 10/2005 | Gieras |
| 6,960,860 B1 | 11/2005 | DeChristofaro |
| 6,960,862 B2 | 11/2005 | Hill |
| 6,979,925 B2 | 12/2005 | Schwamm |
| 6,989,622 B1 | 1/2006 | Chen et al. |
| 7,015,603 B2 | 3/2006 | Barrho et al. |
| 7,026,737 B2 | 4/2006 | Angerer et al. |
| 7,030,529 B2 | 4/2006 | Dommsch et al. |
| 7,030,534 B2 | 4/2006 | Caamano |
| 7,034,425 B2 | 4/2006 | Detela |
| 7,064,469 B2 | 6/2006 | Jack et al. |
| 7,067,954 B2 | 6/2006 | Kuribayashi et al. |
| 7,071,593 B2 | 7/2006 | Matsushita et al. |
| 7,124,495 B2 | 10/2006 | Gieras |
| 7,126,313 B2 | 10/2006 | Dooley |
| 7,129,602 B2 | 10/2006 | Lange et al. |
| 7,135,802 B2 | 11/2006 | Seki et al. |
| 7,208,856 B2 | 4/2007 | Imai et al. |
| 7,211,922 B2 | 5/2007 | Isoda et al. |
| 7,216,732 B2 | 5/2007 | Angerer |
| 7,230,361 B2 | 6/2007 | Hirzel |
| 7,242,118 B2 | 7/2007 | Sakamoto |
| 7,245,055 B2 | 7/2007 | Jack |
| 7,250,704 B1 | 7/2007 | Sortore et al. |
| 7,259,483 B2 | 8/2007 | Komiya et al. |
| 7,261,186 B2 | 8/2007 | Deplazes |
| 7,265,472 B2 | 9/2007 | Mitcham |
| 7,268,456 B2 | 9/2007 | Harada et al. |
| 7,275,844 B2 | 10/2007 | Watanabe |
| 7,279,820 B2 | 10/2007 | Grundl et al. |
| 7,358,639 B2 | 4/2008 | Caamano |
| 7,385,329 B2 | 6/2008 | Hill |
| 7,385,330 B2 | 6/2008 | Trzynadlowski et al. |
| 7,420,312 B2 | 9/2008 | Kitamura et al. |
| 7,466,057 B2 | 12/2008 | Imai et al. |
| 7,474,030 B2 | 1/2009 | Mitcham |
| 7,560,840 B2 | 7/2009 | Lange |
| 7,568,714 B2 | 8/2009 | Sasnowski et al. |
| 7,579,742 B1 | 8/2009 | Rittenhouse |
| 7,585,258 B2 | 9/2009 | Watson et al. |
| 7,592,735 B2 | 9/2009 | Hamada |
| 7,602,095 B2 | 10/2009 | Kusase |
| 7,626,308 B2 | 12/2009 | Kang et al. |
| 7,638,919 B2 | 12/2009 | Pulnikov et al. |
| 7,679,253 B2 | 3/2010 | Neet |
| 7,719,156 B2 | 5/2010 | Muehlberger |
| 7,800,275 B2 | 9/2010 | Calley |
| 7,816,830 B2 | 10/2010 | Dickes |
| 7,851,965 B2 | 12/2010 | Calley |
| 7,859,141 B2 | 12/2010 | Sadarangani |
| 7,863,797 B2 | 1/2011 | Calley |
| 7,868,508 B2 | 1/2011 | Calley et al. |
| 7,868,511 B2 | 1/2011 | Calley |
| 7,876,019 B2 | 1/2011 | Calley |
| 7,923,886 B2 | 4/2011 | Calley et al. |
| 7,952,202 B2 | 5/2011 | Kang |
| 7,952,252 B2 * | 5/2011 | Kang et al. ............ 310/216.015 |
| 7,973,446 B2 | 7/2011 | Calley et al. |
| 2001/0001528 A1 | 5/2001 | Ragaly |
| 2001/0030479 A1 | 10/2001 | Mohler |
| 2001/0030486 A1 | 10/2001 | Pijanowski |
| 2001/0030487 A1 | 10/2001 | Higashino |
| 2002/0070627 A1 | 6/2002 | Ward et al. |
| 2002/0113520 A1 | 8/2002 | Kastinger et al. |
| 2002/0135242 A1 | 9/2002 | Kawai |
| 2002/0171315 A1 | 11/2002 | Kastinger |
| 2002/0190585 A1 | 12/2002 | Sakamoto |
| 2003/0048018 A1 | 3/2003 | Sadarangani |
| 2003/0102751 A1 | 6/2003 | Bryant |
| 2003/0122439 A1 | 7/2003 | Horst |
| 2003/0122440 A1 | 7/2003 | Horst |
| 2003/0122442 A1 | 7/2003 | Jack et al. |
| 2004/0027021 A1 | 2/2004 | Karrelmeyer et al. |
| 2004/0036370 A1 | 2/2004 | Hilzinger |
| 2004/0046478 A1 | 3/2004 | Zierer et al. |
| 2004/0061396 A1 | 4/2004 | Narita et al. |
| 2004/0140730 A1 | 7/2004 | Barrho et al. |
| 2004/0145269 A1 | 7/2004 | Barrho et al. |
| 2004/0150288 A1 | 8/2004 | Calley |
| 2004/0189138 A1 | 9/2004 | Jack |
| 2004/0191519 A1 | 9/2004 | Kejzelman et al. |
| 2004/0207281 A1 | 10/2004 | Detela |
| 2004/0207283 A1 | 10/2004 | Oohashi |
| 2004/0212267 A1 | 10/2004 | Jack et al. |
| 2004/0222706 A1 | 11/2004 | Ickinger |
| 2004/0232793 A1 | 11/2004 | Fujita et al. |
| 2004/0232799 A1 | 11/2004 | Chen et al. |
| 2004/0239207 A1 | 12/2004 | Kloepzig et al. |
| 2004/0251759 A1 | 12/2004 | Hirzel |
| 2004/0251761 A1 | 12/2004 | Hirzel |
| 2004/0262105 A1 | 12/2004 | Li et al. |
| 2005/0006978 A1 | 1/2005 | Bradfield |
| 2005/0012427 A1 | 1/2005 | Seki et al. |
| 2005/0029879 A1 | 2/2005 | Endo |
| 2005/0062348 A1 | 3/2005 | Ohnishi et al. |
| 2005/0062352 A1 | 3/2005 | Kastinger |
| 2005/0088056 A1 | 4/2005 | Kuribayashi |
| 2005/0121983 A1 | 6/2005 | Ehrhart |
| 2005/0139038 A1 | 6/2005 | Kjellen et al. |
| 2005/0156479 A1 | 7/2005 | Fujita et al. |
| 2005/0156480 A1 | 7/2005 | Imai |
| 2005/0212381 A1 | 9/2005 | Gilmour et al. |
| 2005/0242679 A1 | 11/2005 | Walter et al. |
| 2006/0012259 A1 | 1/2006 | Kerlin |
| 2006/0012263 A1 | 1/2006 | Smith et al. |
| 2006/0055280 A1 | 3/2006 | Isoda |
| 2006/0082237 A1 | 4/2006 | Kerlin |
| 2006/0087180 A1 | 4/2006 | Woo et al. |
| 2006/0091755 A1 | 5/2006 | Carlisle et al. |
| 2006/0131974 A1 | 6/2006 | Sadarangani et al. |
| 2006/0131986 A1 | 6/2006 | Hsu et al. |
| 2006/0186754 A1 | 8/2006 | Kitamura et al. |
| 2006/0192453 A1 | 8/2006 | Gieras et al. |
| 2006/0220477 A1 | 10/2006 | Okumoto et al. |
| 2006/0261688 A1 | 11/2006 | Akita et al. |
| 2007/0013253 A1 | 1/2007 | Dubois et al. |
| 2007/0046137 A1 | 3/2007 | Ooiwa |
| 2007/0046139 A1 | 3/2007 | Ishizuka |
| 2007/0075605 A1 | 4/2007 | Enomoto et al. |
| 2007/0138900 A1 | 6/2007 | Imai et al. |
| 2007/0152528 A1 | 7/2007 | Kang et al. |
| 2007/0176505 A1 | 8/2007 | Trzynadlowski et al. |
| 2007/0188037 A1 | 8/2007 | Lau |
| 2008/0007126 A1 | 1/2008 | Popov et al. |
| 2008/0042507 A1 | 2/2008 | Edelson |
| 2008/0169776 A1 | 7/2008 | Acker |
| 2008/0179982 A1 | 7/2008 | Kramer |
| 2008/0211326 A1 | 9/2008 | Kang et al. |
| 2008/0211336 A1 | 9/2008 | Sadarangani |
| 2008/0238237 A1 | 10/2008 | Nishihama et al. |
| 2008/0246362 A1 | 10/2008 | Hirzel |
| 2008/0265707 A1 | 10/2008 | Bradfield |
| 2008/0309188 A1 | 12/2008 | Calley |
| 2008/0315700 A1 | 12/2008 | Ishikawa et al. |
| 2009/0021099 A1 | 1/2009 | Shkondin |
| 2009/0026853 A1 | 1/2009 | Groening |
| 2009/0026866 A1 | 1/2009 | Groening et al. |
| 2009/0042051 A1 | 2/2009 | Skarman et al. |
| 2009/0085415 A1 | 4/2009 | Ionel et al. |
| 2009/0127942 A1 | 5/2009 | Rahman et al. |
| 2009/0140597 A1 * | 6/2009 | LeFlem ........................ 310/217 |
| 2009/0152489 A1 | 6/2009 | Kjellen et al. |
| 2009/0206693 A1 | 8/2009 | Calley et al. |

(56) References Cited

U.S. PATENT DOCUMENTS

| | | |
|---|---|---|
| 2009/0208771 A1 | 8/2009 | Janecek |
| 2009/0243406 A1 | 10/2009 | Jack et al. |
| 2009/0255924 A1 | 10/2009 | Lovens |
| 2009/0284253 A1 | 11/2009 | Finkler et al. |
| 2009/0295237 A1 | 12/2009 | Gloor |
| 2009/0322165 A1 | 12/2009 | Rittenhouse |
| 2010/0013341 A1 | 1/2010 | Vollmer |
| 2010/0013343 A1 | 1/2010 | Bi |
| 2010/0015432 A1 | 1/2010 | Bergmark et al. |
| 2010/0026135 A1 | 2/2010 | Hussey |
| 2010/0038580 A1 | 2/2010 | Ye et al. |
| 2010/0052467 A1 | 3/2010 | Gieras |
| 2010/0109452 A1 | 5/2010 | Calley et al. |
| 2011/0025140 A1 | 2/2011 | Pennander et al. |
| 2011/0025141 A1 | 2/2011 | Nord et al. |
| 2011/0037329 A1 | 2/2011 | Nord et al. |
| 2011/0050010 A1 | 3/2011 | Calley et al. |
| 2011/0062723 A1 | 3/2011 | Calley et al. |
| 2011/0133485 A1 | 6/2011 | Gieras |
| 2011/0169357 A1 | 7/2011 | Gieras |

FOREIGN PATENT DOCUMENTS

| | | |
|---|---|---|
| DE | 3602687 | 8/1987 |
| DE | 8711725 | 8/1987 |
| DE | 3904516 | 6/1990 |
| DE | 3927453 | 2/1991 |
| DE | 4132340 | 3/1993 |
| DE | 19639670 | 4/1998 |
| DE | 19634949 | 5/1998 |
| DE | 19650572 | 6/1998 |
| DE | 19753261 | 6/1998 |
| DE | 19753320 | 6/1998 |
| DE | 199650697 | 6/1998 |
| DE | 19704392 | 8/1998 |
| DE | 19743906 | 4/1999 |
| DE | 19960737 | 7/2001 |
| DE | 10047675 | 4/2002 |
| DE | 10053265 | 5/2002 |
| DE | 10062073 | 6/2002 |
| DE | 10128646 | 1/2003 |
| DE | 10130702 | 1/2003 |
| DE | 10145820 | 4/2003 |
| DE | 102006026719 | 6/2006 |
| DE | 102005020952 | 11/2006 |
| DE | 102006048561 | 4/2008 |
| DE | 102006051234 | 5/2008 |
| DE | 102007018930 | 10/2008 |
| DE | 102008054381 | 6/2010 |
| DE | 102009060955 | 7/2011 |
| DE | 102009060956 | 7/2011 |
| DE | 102009060959 | 7/2011 |
| EP | 0544200 | 11/1992 |
| EP | 0707374 | 4/1996 |
| EP | 0718959 | 6/1996 |
| EP | 0796758 | 9/1997 |
| EP | 0833429 | 4/1998 |
| EP | 0998010 | 3/2000 |
| EP | 1063754 | 12/2000 |
| EP | 1117168 | 7/2001 |
| EP | 1227566 | 7/2002 |
| EP | 1921730 | 5/2008 |
| EP | 1923683 | 5/2008 |
| GB | 518298 | 9/1938 |
| GB | 2052176 | 1/1986 |
| JP | 60241758 | 11/1985 |
| JP | 61042248 | 2/1986 |
| JP | 2001025197 | 1/2001 |
| KR | 1007577330000 | 9/2007 |
| KR | 10-2008-0061415 | 9/2008 |
| WO | WO 93/14551 | 7/1993 |
| WO | WO 99/34497 | 7/1999 |
| WO | 0130643 | 5/2001 |
| WO | 03003548 | 1/2002 |
| WO | WO 02/075895 | 9/2002 |
| WO | 2004111591 | 12/2004 |
| WO | WO 2005/091475 | 9/2005 |
| WO | 2006117210 | 5/2006 |
| WO | 2006091089 | 8/2006 |
| WO | WO 2007024184 | 3/2007 |
| WO | 2008128659 | 10/2008 |
| WO | 2009027938 | 3/2009 |
| WO | WO 2009116935 | 9/2009 |
| WO | WO 2009116936 | 9/2009 |
| WO | WO 2009116937 | 9/2009 |
| WO | 2009133295 | 11/2009 |
| WO | 2009156297 | 12/2009 |
| WO | 2010036221 | 4/2010 |
| WO | 2010048928 | 5/2010 |
| WO | 2010076081 | 7/2010 |
| WO | 2010094515 | 8/2010 |
| WO | 2011080285 | 7/2011 |
| WO | 2011080293 | 7/2011 |
| WO | 2011080294 | 7/2011 |

OTHER PUBLICATIONS

Office Action dated Jul. 27, 2010 for U.S. Appl. No. 12/149,936.
Office Action dated Aug. 9, 2010 for U.S. Appl. No. 12/611,733.
Notice of Allowance dated Aug. 12, 2010 for U.S. Appl. No. 12/611,728.
Notice of Allowance dated Aug. 19, 2010 for U.S. Appl. No. 12/611,737.
Notice of Allowance dated Sep. 8, 2010 for U.S. Appl. No. 12/149,934.
Notice of Allowance dated Oct. 6, 2010 for U.S. Appl. No. 12/149,935.
Restriction Requirement dated Dec. 20, 2010 for U.S. Appl. No. 12/149,933.
Final Office Action dated Jan. 4, 2011 for U.S. Appl. No. 12/149,936.
Restriction Requirement dated Feb. 24, 2011 for U.S. Appl. No. 12/942,495.
Notice of Allowance dated Feb. 28, 2011 for U.S. Appl. No. 12/149,936.
"Two Dimensional Finite Analysis of Passive Rotor Transverse Flux Motors with Slanted Rotor Design" by B.E. Hasubek, et al., May 1999.
Notice of Allowance dated Nov. 2, 2010 for U.S. Appl. No. 12/847,991.
Notice of Allowance dated Dec. 9, 2010 for U.S. Appl. No. 12/611,733.
International Preliminary Report on Patentability dated May 3, 2011, PCT/US2009/063142.
International Preliminary Report on Patentability dated May 3, 2011, PCT/US2009/063145.
International Preliminary Report on Patentability dated May 3, 2011, PCT/US2009/063147.
Notice of Allowance dated May 23, 2011, U.S. Appl. No. 13/039,837.
Notice of Allowance dated Jul. 8, 2011, U.S. Appl. No. 12/772,958.
Restriction Requirement dated Jul. 7, 2011, U.S. Appl. No. 12/772,959.
Restriction Requirement dated Jul. 7, 2011 for U.S. Appl. No. 12/772,962.
Notice of Allowance dated May 24, 2011 for U.S. Appl. No. 12/149,933.
Office Action dated Sep. 12, 2011 for U.S. Appl. No. 12/772,962.
Office Action dated Sep. 14, 2011 for U.S. Appl. No. 12/772,959.
Office Action dated Sep. 20, 2011 for U.S. Appl. No. 13/112,619.
Taiwan Office Action dated Nov. 6, 2013 of Taiwan Appl. No. 100141580 (14 pages including translation).
Notice of Allowance dated Mar. 29, 2005 for U.S. Appl. No. 10/721,765.
Notice of Allowance dated Feb. 13, 2008 for U.S. Appl. No. 11/679,806.
Notice of Allowance dated May 30, 2003 for U.S. Appl. No. 10/273,238.
Notice of Allowance dated Nov. 3, 2009 for U.S. Appl. No. 12/149,931.

(56) References Cited

OTHER PUBLICATIONS

Notice of Allowance dated Dec. 30, 2009 for U.S. Appl. No. 12/149,931.
Office Action dated Sep. 28, 2007 for U.S. Appl. No. 11/679,806.
Office Action dated Nov. 30, 2009 for U.S. Appl. No. 12/149,935.
Office Action dated Sep. 13, 2004 for U.S. Appl. No. 10/721,765.
International Search Report and Written Opinion dated Aug. 15, 2008 for International Patent Application No. PCT/US2008/063301.
International Preliminary Report on Patentability dated Nov. 10, 2009 for International Patent Application No. PCT/US2008/063301.
International Search Report and Written Opinion dated Aug. 20, 2008 for International Patent Application No. PCT/US2008/063236.
International Preliminary Report on Patentability dated Nov. 17, 2009 for International Patent Application No. PCT/US2008/063236.
International Search Report and Written Opinion dated Oct. 24, 2008 for International Patent Application No. PCT/US2008/063336.
International Preliminary Report on Patentability dated Nov. 17, 2009 for International Patent Application No. PCT/US2008/063336.
International Search Report and Written Opinion dated Aug. 15, 2008 for International Patent Application No. PCT/US2008/063287.
International Preliminary Report on Patentability dated Nov. 10, 2009 for International Patent Application No. PCT/US2008/063287.
International Search Report and Written Opinion dated Nov. 10, 2009 for International Patent Application No. PCT/US2008/063268.
International Preliminary Report on Patentability dated Nov. 10, 2009 for International Patent Application No. PCT/US2008/063268.
Technical Project Presentation—Development of a High-Performance Generator for Wind Turbines—by Andrzej M. Trzynadlowski, PhD, University of Nevada, Reno, FIEEE, Aug. 2007.
Technical Project Presentation—Development of a High-Performance Generator for Wind Turbines—Final Report—University of Nevada, Reno—Feb. 2004.
"Magnetic Field Calculation of Claw Pole Permanent Magnet Machines Using Magnetic Network Method", by Y.G. Guo et al., Faculty of Engineering, University of Technology, Sydney, 2003.
"Applications of Power Electronics in Automotive Power Generation",—by David J. Perreault et al., Laboratory for Electromagnetic and Electronic Systems, Massachusetts Institute of Technology, Jun. 21-22, 2006—Paris.
"Thermal Modeling of Lundell Alternators", IEEE Transactions on Energy Conversion, vol. 20, No. 1, Mar. 2005.
"Iron Loss Calculation in a Claw-Pole Structure", by A. Reinap et al., Lund University, Jun. 2004.
"Permanent Magnet Assisted Synchronous Reluctance Motor Design and Performance Improvement",—A Dissertation by Peyman Niazi, Texas A&M University, Dec. 2005.
"New Design of Hybrid-Type Self-Bearing Motor for Small, High-Speed Spindle",—by Hideki Kanebako et al., IEEE/ASME Transactions on Mechatronics, vol. 8, No. 1, Mar. 2003, retrieved Jan. 8, 2010.
"Evaluation of Rotor Conducting Screens on the Single-Phase Switched Reluctance Machine",—by M.M. Mahmoud et al., School of Engineering and Physical Sciences, Heriot-Watt University, Riccarton, Edinburgh, Scotland, United Kingdom, May 3, 2005.
"Analytical Interpretation and Quantification of Rotational Losses in Stator Cores of Induction Motors",—IEEE Transactions on Magnetics, vol. 43, No. 10, Oct. 2007, retrieved Jan. 8, 2010.
Hasubek, B.E. et al.; "Design Limitations of Reduced Magnet Material Passive Rotor Transverse Flux Motors Investigated Using 3D Finite Element Analysis"; 2000; pp. 365-369, retrieved Oct. 24, 2008.
Dubois, Maxine R. et al.; "Clawpole Transverse-Flux Machine with Hybrid Stator"; pp. 1-6, Jul. 15, 2006.
Henneberger, G. et al.; "On the Parameters Computation of a Single Sided Transverse Flux Motor"; Workshop on Electrical Machines' Parameters, Technical University of Cluj-Napoca, May 26, 2001; pp. 35-40.
Woolmer, MD, T.J., et al., "Analysis of the Yokeless and Segmented Armature Machine", Electric Machines & Drives Conference, 2007. IEMDC apos; 07. IEEE International, May 3-5, 2007, pp. 704-708, vol. 1, Oxford University, Engineering Department, Parks Road, Oxford, UK.
Husband, S.M. et al.; "The Rolls-Royce Transverse Flux Motor Development"; Electric Machines and Drives Conference, vol. 3, pp. 1435-1440, IEEE, 2003.
Theory of SR Motor Operation (Power Point Presentation), copyright 2002 by George Holling and Rocky Mountain Technologies Inc.
Development of a PM Transverse Flux Motor With Soft Magnetic Composite Core—IEEE Transactions on Energy Conversion, vol. 21, No. 2., Jun. 2006.
Fundamental Modeling for Optimal Design of Transverse Flux Motors—Genevieve Patterson et al., University of Tokyo, 2008.
www.higenmotor.com/eng/aboutus/about06read.asp?id=notice &no=87 dated Jan. 15, 2010.
Lyng Eltorque QT 800—2.0 User Manual, version 1.0—dated Jul. 3, 2007.
Motors: Emerging Concepts by George Holling, Apr. 2007.
www.iem.rwth-aachen.de/index.pl/new materials and machines?makePrintable=1; retrieved Jan. 15, 2010.
Raser Technologies Company Brochure, 2005.
Response to Office Action filed Jan. 15, 2010 for Japanese Patent Application No. JPPA-2003-548374.
Office Action dated Mar. 2, 2010 for U.S. Appl. No. 12/149,931.
Restriction Requirement dated Apr. 5, 2010 for U.S. Appl. No. 12/149,934.
Restriction Requirement dated Apr. 22, 2010 for U.S. Appl. No. 12/149,936.
Office Action dated Apr. 28, 2010 for U.S. Appl. No. 12/149,935.
Notice of Allowance dated May 4, 2010 for U.S. Appl. No. 12/149,931.
International Search Report and Written Opinion dated Jun. 10, 2010 for International Application No. PCT/US2009/063145.
International Search Report and Written Opinion dated Jun. 10, 2010 for International Application No. PCT/US2009/063142.
International Search Report and Written Opinion dated Jun. 18, 2010 for International Application No. PCT/US2009/063147.

* cited by examiner

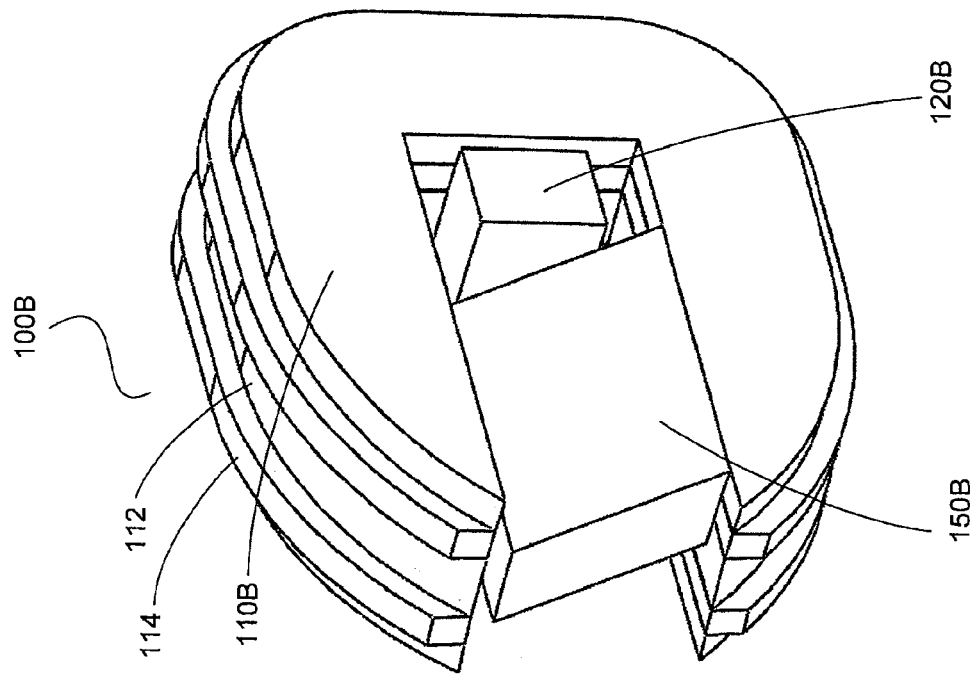
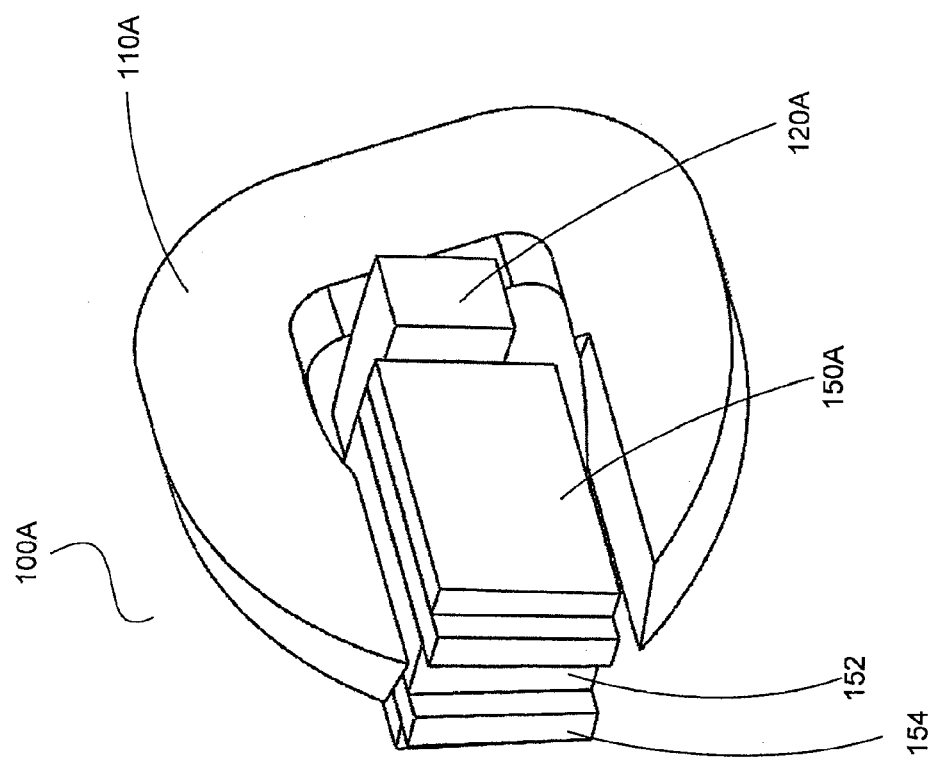
FIG. 1B
FIG. 1A

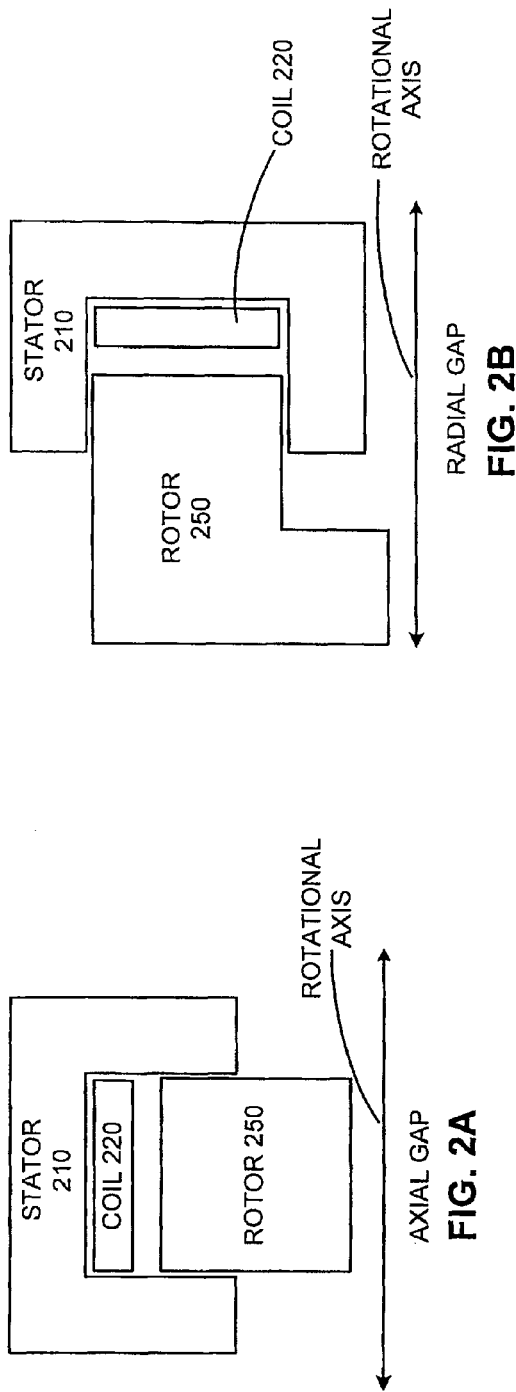
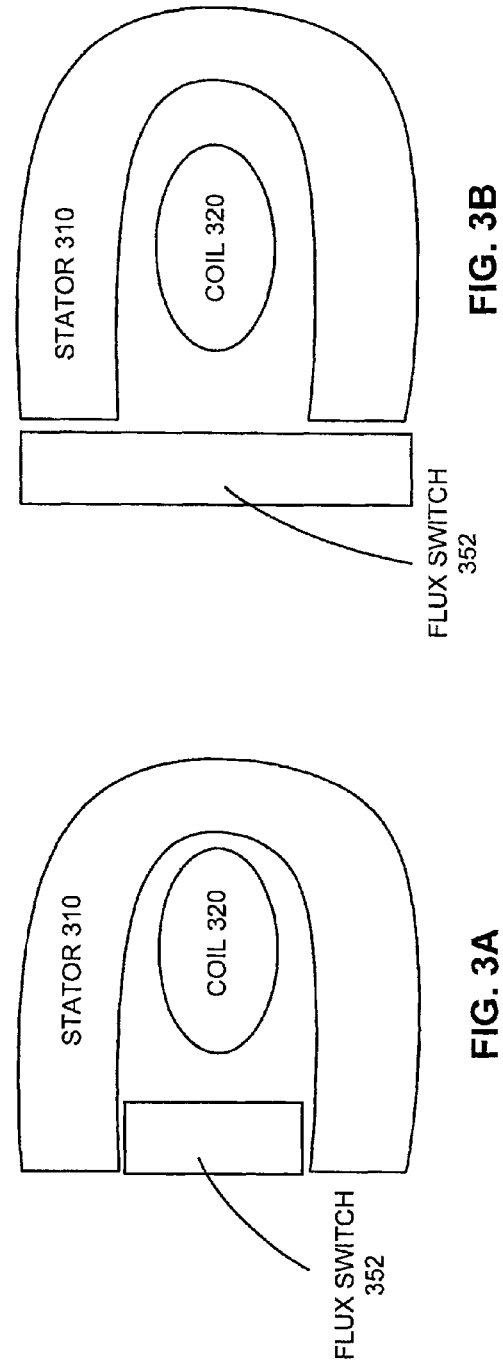

TRANSVERSE AND/OR COMMUTATED FLUX SYSTEMS HAVING SEGMENTED STATOR LAMINATIONS

CROSS REFERENCE TO RELATED APPLICATIONS

This application is a divisional of U.S. patent application Ser. No. 13/291,373 filed Nov. 8, 2011 (issuing as U.S. Pat. No. 8,405,275 on Mar. 26, 2013), which claims the benefit of U.S. Provisional Application No. 61/414,769 filed on Nov. 17, 2010, U.S. Provisional Application No. 61/414,774 filed on Nov. 17, 2010 U.S. Provisional Application No. 61/414,781 filed on Nov. 17, 2010; and U.S. Provisional Application No. 61/453,075 filed on Mar. 15, 2011. The entire contents of each of the foregoing applications are hereby incorporated in their entireties by reference.

TECHNICAL FIELD

The present disclosure relates to electrical systems, and in particular to transverse flux machines and commutated flux machines.

BACKGROUND

Electric motors and generators are utilized in a wide variety of applications. Many prior approaches to electric motors and generators have been attempted. However, performance of such motors and generators is often limited, and consequently, performance of electric vehicles or other devices utilizing such motors and/or generators is also limited. Additionally, electric bicycles ("e-bikes") and other light electric vehicles ("LEVs"), for example electric scooters, motorcycles, golf carts, and/or the like, continue to increase in popularity. Such devices provide convenient transportation, particularly in congested urban areas. It remains desirable to provide improved electric motors and/or generators, for example electric motors and/or generators configured as transverse flux machines and/or commutated flux machines, and particularly for use in light electric vehicles, electric automobiles, and the like.

BRIEF DESCRIPTION OF THE DRAWINGS

With reference to the following description, appended claims, and accompanying drawings:

FIG. 1A illustrates an exemplary transverse flux machine in accordance with an exemplary embodiment;

FIG. 1B illustrates an exemplary commutated flux machine in accordance with an exemplary embodiment;

FIG. 2A illustrates an exemplary axial gap configuration in accordance with an exemplary embodiment;

FIG. 2B illustrates an exemplary radial gap configuration in accordance with an exemplary embodiment;

FIG. 3A illustrates an exemplary cavity engaged configuration in accordance with an exemplary embodiment;

FIG. 3B illustrates an exemplary face engaged configuration in accordance with an exemplary embodiment;

DETAILED DESCRIPTION

Figure 3C:
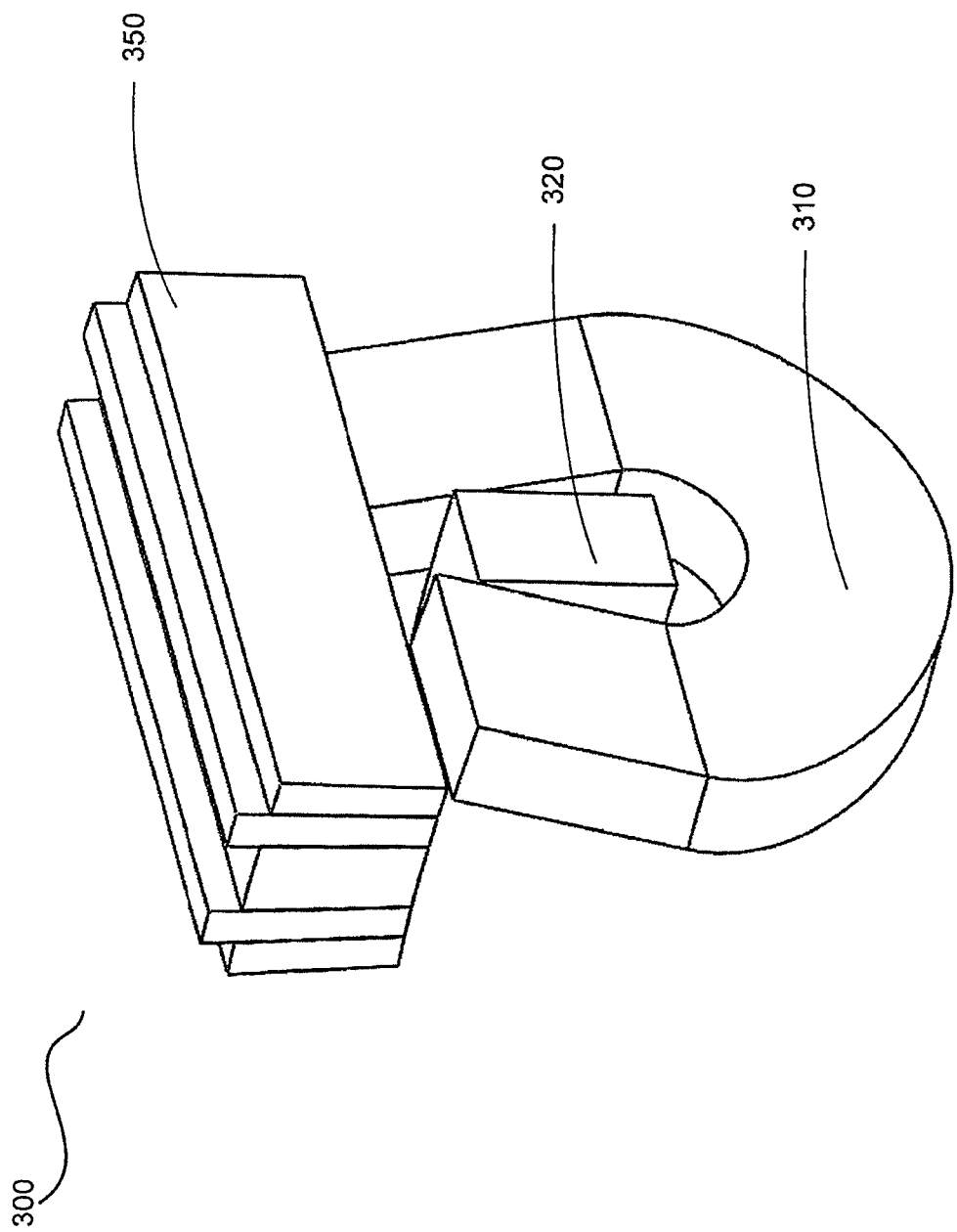
FIG. 3C illustrates an exemplary face engaged transverse flux configuration in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for electrical system construction, management, operation, measurement, optimization, and/or control, as well as conventional techniques for magnetic flux utilization, concentration, control, and/or management, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical electrical system, for example an AC synchronous electric motor.

Prior electric motors, for example brushless DC motors, synchronous AC motors, and/or the like, may suffer from various deficiencies. For example, many prior electric motors and associated motor controllers as utilized in light electric vehicles have combined efficiencies of only up to about 80%. Additionally, the efficiency may fall off sharply as torque output and/or RPM increases. Thus, range of the light electric vehicle is reduced, due to the power lost to inefficiencies of the system. Additionally, such motors often offer only limited power output in order to maintain efficiency, resulting in reduced performance under demanding loads such as hill climbing.

Yet further, many prior electric motors have offered limited torque density. As used herein, "torque density" refers to Newton-meters of continuous torque produced per kilogram of active electrical and magnetic materials in the motor. In an exemplary embodiment, continuous torque is defined as a level of output torque that produces a maximum (spatial) equilibrium temperature of 100 degrees Celsius in the motor stator, responsive to a load of duty type S1 as defined in International Electrotechnical Commission (IEC) standard 60034-1, given ambient temperature of 25 degrees Celsius and airflow of 8 kilometers per hour around the motor.

For example, many prior electric motors are configured with a torque density of between about 0.5 Newton-meters per kilogram and about 3 Newton-meters per kilogram. Consequently, a motor of sufficient torque and/or power for a particular application may be difficult or even impossible to fit in an available area, for example when a motor sized to produce sufficient torque becomes too massive to fit in a confined space. In the case of e-bikes, the associated space constraints (for example, the limited space available in a bicycle wheel hub) often result in inclusion of comparatively underpowered and/or overweight motors, for example motors having a maximum power output of about 500 to about 900 watts.

In contrast, efficient, compact, and/or torque-dense electric motors, including motors for e-bikes and other LEVs, may be achieved by utilizing a transverse flux machine and/or commutated flux machine configured in accordance with principles of the present disclosure. As used herein, a "transverse flux machine" and/or "commutated flux machine" may be any electrical machine wherein magnetic flux paths have sections where the flux is generally transverse to a rotational plane of the machine. In an exemplary embodiment, when a magnet and/or flux concentrating components are on a rotor and/or are moved as the electrical machine operates, the electrical machine may be a pure "transverse" flux machine. In another exemplary embodiment, when a magnet and/or flux concentrating components are on a stator and/or are held stationary as the electrical machine operates, the electrical machine may be a pure "commutated" flux machine. As is readily apparent, in certain configurations a "transverse flux machine" may be considered to be a "commutated flux machine" by fixing the rotor and moving the stator, and vice versa. Moreover, a coil may be fixed to a stator; alternatively, a coil may be fixed to a rotor.

Moreover, there is a spectrum of functionality and device designs bridging the gap between a commutated flux machine and a transverse flux machine. Certain designs may rightly fall between these two categories, or be considered to belong to both simultaneously. Therefore, as will be apparent to one skilled in the art, in this disclosure a reference to a "transverse flux machine" may be equally applicable to a "commutated flux machine" and vice versa.

In accordance with an exemplary embodiment, and with reference to FIG. 1A, an electrical machine, for example transverse flux machine (TFM) 100A, generally comprises a rotor 150A, a stator 110A, and a coil 120A. Rotor 150A comprises a plurality of interleaved magnets 154 and flux concentrators 152. Rotor 150A is configured to interact with stator 110A in order to facilitate switching of magnetic flux. Stator 110A is configured to be magnetically coupled to rotor 150A, and is configured to facilitate flow of magnetic flux via interaction with rotor 150A. Stator 110A at least partially encloses coil 120A. Coil 120A is configured to generate a current output responsive to flux switching and/or accept a current input configured to drive rotor 150A. Transverse flux machine 100A may also comprise various structural components, for example components configured to facilitate operation of transverse flux machine 100A. Moreover, transverse flux machine 100A may comprise any suitable components configured to support, guide, modify, and/or otherwise manage and/or control operation of transverse flux machine 100A and/or components thereof.

In accordance with an exemplary embodiment, and with reference to FIG. 1B, an electrical machine, for example commutated flux machine (CFM) 100B, generally comprises a stator 110B, a rotor 150B, and a coil 120B. Stator 110B comprises a plurality of interleaved magnets 114 and flux concentrators 112. Stator 110B at least partially encloses coil 120B. Stator 110B is configured to interact with rotor 150B in order to facilitate switching of magnetic flux. Stator 110B is configured to be magnetically coupled to rotor 150B, and is configured to facilitate flow of magnetic flux via interaction with rotor 150B. Coil 120B is configured to generate a current output responsive to flux switching and/or accept a current input configured to drive rotor 150B. Commutated flux machine 100B may also comprise various structural components, for example components configured to facilitate operation of commutated flux machine 100B. Moreover, commutated flux machine 100B may comprise any suitable components configured to support, guide, modify, and/or otherwise manage and/or control operation of commutated flux machine 100B and/or components thereof.

Moreover, transverse flux machines and/or commutated flux machines may be configured in multiple ways. For example, with reference to FIG. 2A, a commutated flux machine may be configured with a stator 210 at least partially surrounding a coil 220 and generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap."

With reference now to FIG. 3A, a flux switch 352 in a commutated flux machine may engage a stator 310 at least partially surrounding a coil 320 by extending at least partially into a cavity defined by stator 310. Such a configuration is referred to herein as "cavity engaged." Turning to FIG. 3B, flux switch 352 in a commutated flux machine may engage stator 310 by closely approaching two terminal faces of stator 310. Such a configuration is referred to herein as "face engaged." Similar engagement approaches may be followed in transverse flux machines and are referred to in a similar manner. In general, it should be noted that a particular electrical machine may be face engaged or cavity engaged, and may be an axial gap or radial gap configuration. For example, in an exemplary embodiment, with reference to FIG. 3C, a transverse flux machine 300 comprises a coil 320 at least partially surrounded by stator 310. Stator 310 is face engaged with rotor 350 in an axial gap configuration.

Figures 4A, 4B:
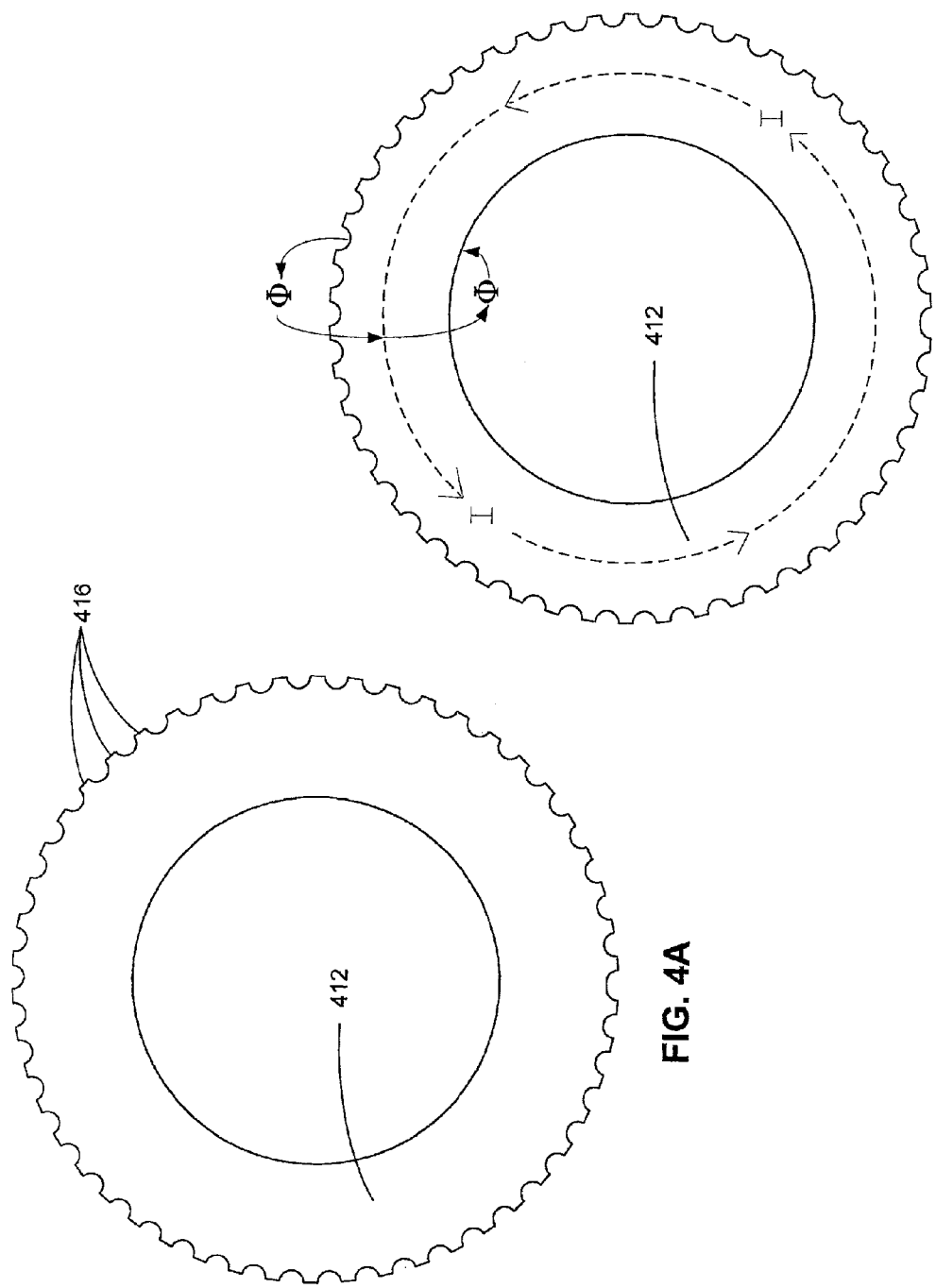
FIG. 4A illustrates a continuous side lamination in accordance with an exemplary embodiment.
FIG. 4B illustrates flux linking a continuous side lamination in accordance with an exemplary embodiment.

With reference now to FIG. 4A, in an exemplary embodiment a stator for an electrical machine, for example a transverse flux machine and/or commutated flux machine, comprises one or more side laminations 412 formed from a generally planar material configured to transmit magnetic flux.

Side lamination 412 may be any shape configured to facilitate transmission of magnetic flux in a desired manner and/or direction. In various exemplary embodiments, side lamination 412 comprises a generally ring-shaped structure. Moreover, side lamination 412 may be configured with one or more teeth 416. In an exemplary embodiment, teeth 416 are located on the outer edge of side lamination 412 and/or on the inner edge of side lamination 412. In various exemplary embodiments, teeth 416 may be disposed to generally face the radial interior of the ring (for example, in connection with the use of an "inner" rotor in an axial gap configuration), the radial exterior of the ring (for example, in connection with the use of an "outer" rotor in an axial gap configuration), and/or an axial side of the ring (for example, in connection with the use of a "side by side" rotor in a radial gap configuration).

Teeth 416 are configured as one or more regions configured for switching flux, for example across an air gap in a transverse flux machine. Teeth 416 may be configured with substantially flat outer surfaces having trenches therebetween, for example generally hemispherical trenches. Moreover, teeth 416 may be configured with any suitable shape. Teeth 416 may also be separated from one another by trenches comprising a cylindrical shape, an elliptical shape, a triangular shape, a rectangular shape, a trapezoidal shape, and/or any suitable shape(s).

The center to center distance between adjacent teeth 416 may be any suitable distance. The center to center distance may be the same between teeth 416 in side lamination 412, or the center to center distance between teeth 416 in side lamination 412 may be variable. In various exemplary embodiments, the center to center distance may be a function of a pole pitch in a transverse flux machine. The on-center spacing between adjacent teeth 416 may similarly be varied, for example in order to cause an on-center spacing between certain teeth 416 to align with an on-center spacing between flux concentrating rotor portions in a particular rotor. Moreover, in various exemplary embodiments, on side lamination 412, teeth 416 may be located, spaced, shaped, and/or otherwise configured in accordance with principles of phase offset in transverse flux machines and/or commutated flux machines as disclosed in U.S. patent application Ser. No. 12/772,962 filed on May 3, 2010, now U.S. Patent Application Publication No. 2011/0169366 entitled "TRANSVERSE AND/OR COMMUTATED SYSTEMS HAVING PHASE OFFSET". In this manner, side laminations 412 may be configured to reduce cogging torque, vibration, and/or other undesirable operational characteristics.

Side lamination 412 typically comprises a material suitable for transmission of magnetic flux. In various exemplary embodiments, side lamination 412 comprises silicon steel. In an exemplary embodiment, side lamination 412 comprises M19 silicon steel. Side lamination 412 may also comprise cold rolled grain oriented ("CRGO") silicon steel, nickel-based alloys (e.g., Carpenter brand high-permeability "49" alloy and/or the like), cobalt-based alloys (e.g., Carpenter brand "Hiperco" cobalt-based materials and/or the like), nickel-cobalt alloys, and/or the like. Moreover, side lamination 412 may comprise any suitable material having a desired electrical resistivity and/or magnetic permeability.

In an exemplary embodiment, side lamination 412 has a thickness of about 0.35 mm. In another exemplary embodiment, side lamination 412 has a thickness of between about 0.3 mm and about 0.4 mm. In various exemplary embodiments, side lamination 412 has a thickness between about 0.18 mm and about 0.65 mm.

In various exemplary embodiments, side lamination 412 is configured with an electrically insulating coating and/or finish on at least a portion of the exterior of side lamination 412. The insulating coating may comprise any suitable coating configured to provide a desired level of electrical insulation. For example, in one exemplary embodiment side lamination 412 is coated with an oxide finish. In another exemplary embodiment, side lamination 412 is coated with an organic-based varnish. In various exemplary embodiments, side lamination 412 is coated with one or more of oxidized silicon, a "C-5" coating, and/or a polyimide film (e.g., Kapton® brand film and/or the like). Moreover, side lamination 412 may be coated, covered, finished, and/or otherwise at least partially electrically insulated via any suitable method or process, and with any suitable material or combination of materials.

Figure 4C:
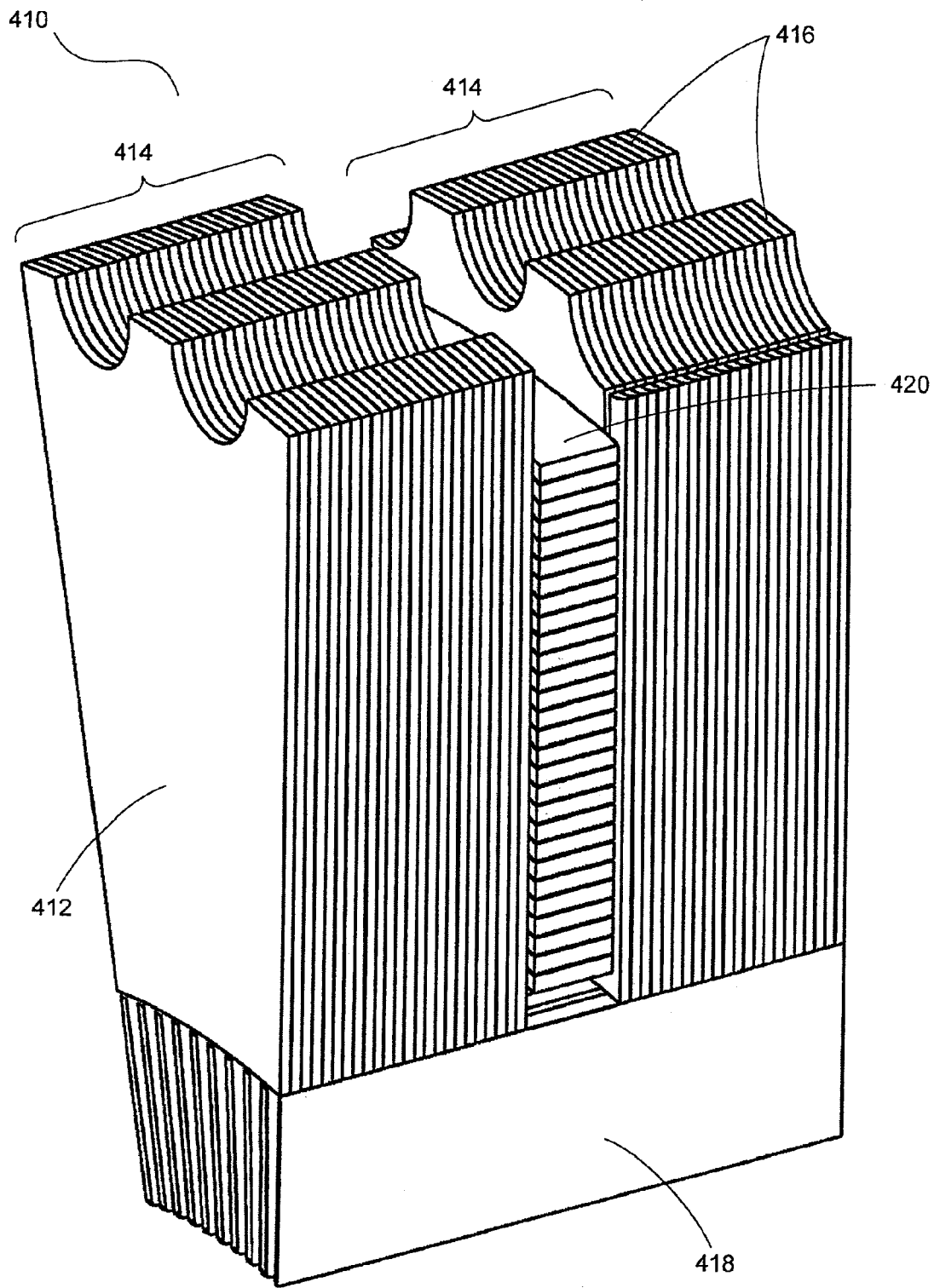
FIG. 4C illustrates two side lamination stacks and a plurality of back return laminations partially surrounding a coil in accordance with an exemplary embodiment.
Figure 4D:
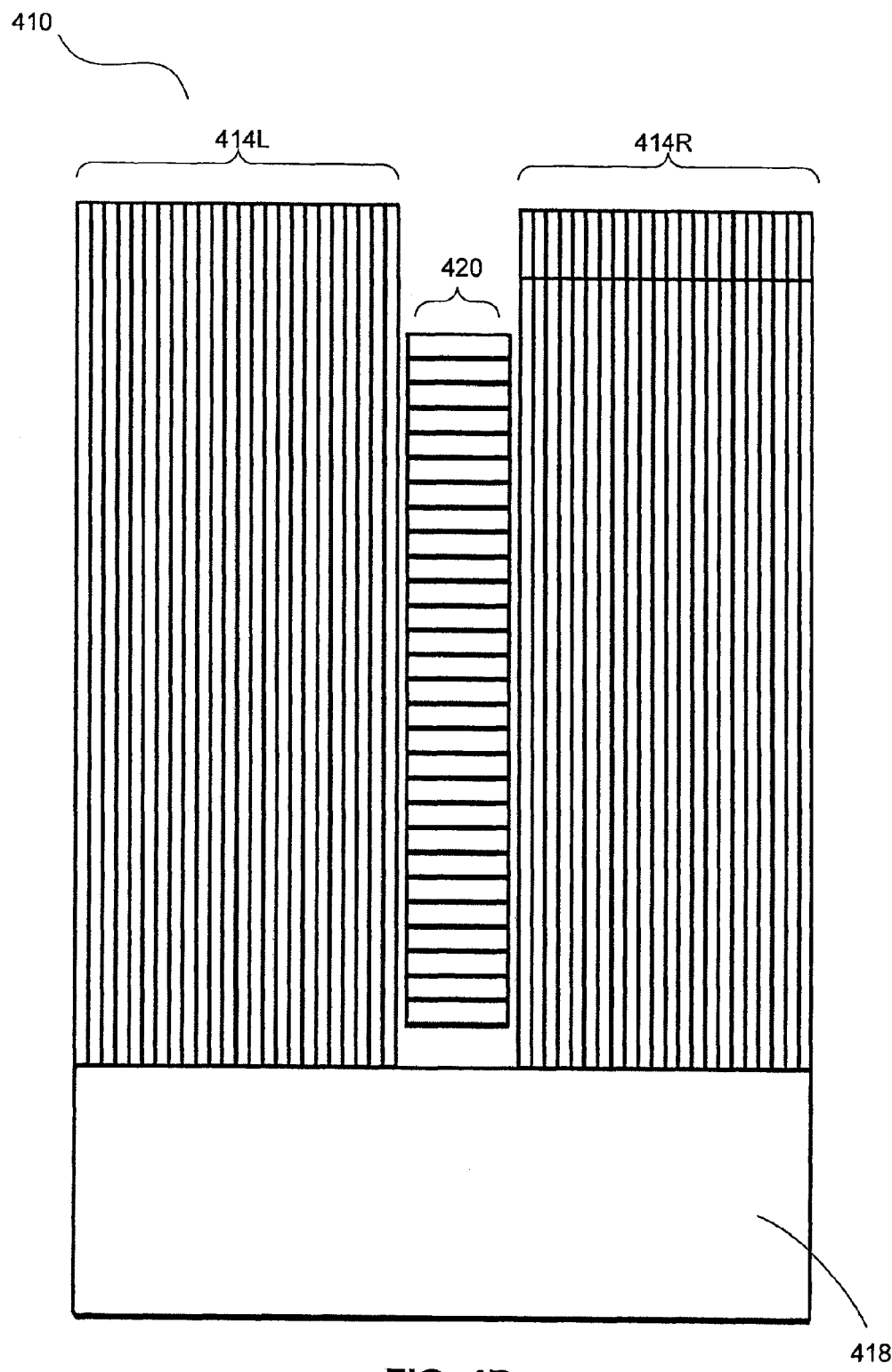
FIG. 4D illustrates an end-on view of elements of FIG. 4C in accordance with an exemplary embodiment.

In various exemplary embodiments, with reference now to FIGS. 4C and 4D, multiple side laminations may be joined together to form a lamination "stack" 414 made up of side laminations 412. Lamination stack 414 may be formed in any suitable manner, for example by stamping, pressing, gluing, and/or otherwise mechanically and/or chemically bonding two or more side laminations 412 together. Side laminations 412 may be pre-shaped, and then joined to one another to form lamination stack 414. Side laminations 412 may also be formed from a sheet of material at the same time the side laminations 412 are formed into lamination stack 414. For example, multiple sheets of lamination material may be placed atop one another, and then stamped by a die corresponding to the desired shape of a side lamination 412. In this manner, lamination stack 414 may be shaped and joined in a single process.

Lamination stack 414 may comprise any suitable number of side laminations 412. In an exemplary embodiment, lamination stack 414 comprises three side laminations 412. In another exemplary embodiment, lamination stack 414 comprises ten side laminations 412. In various exemplary embodiments, lamination stack 414 may comprise 17 side laminations 412, 25 side laminations 412, 40 side laminations 412, and/or more side laminations 412. Moreover, lamination stack 414 may comprise a number of side laminations 412 selected based at least in part on a desired thickness of lamination stack 414, the thickness of one or more side laminations 412, a space available in an electrical machine, and/or the like.

With reference now to FIG. 4D, in various exemplary embodiments a lamination stack 414, for example lamination stack 414L, forms one side of a stator 410 in a transverse flux machine. Another lamination stack 414, for example lamination stack 414R, forms another side of stator 410. Lamination stacks 414L and 414R are coupled by one or more back laminations 418 to provide a flux path around coil 420. It will be appreciated that in various exemplary embodiments, lamination stacks 414L and 414R are separable by a plane passing through coil 420, for example a plane generally perpendicular to the rotational axis of a transverse flux machine.

By providing electrically insulating material on the exterior of side lamination 412, lamination stack 414 may be configured with very high electrical resistivity between layers, reducing unwanted currents between layers and thus reducing associated losses.

However, when utilized in certain electrical machines, continuous (for example, ring-shaped) side laminations 412 and/or lamination stacks 414 can suffer from undesirable losses due to flux linking of certain side laminations 412 as explained in more detail below. Stated generally, in certain electrical machines, including in transverse flux machines and/or commutated flux machines, any component or combination of components which provide a closed electrical circuit passing through a magnetic flux loop will have an electric current induced therein responsive to variations in the magnetic field. Typically, it is desirable to induce an electrical current in a conductive coil of an electrical machine (i.e. a portion of the electrical machine intended to supply an output current and/or provide an input current), but undesirable to induce an electrical current in other portions of the machine (e.g., portions of the rotor and/or stator intended to facilitate switching of magnetic flux). Such currents induced outside a conductive coil can lead to unwanted eddy currents, thermal losses, and even device failure.

For example, returning to FIG. 4B, if side lamination 412 is linked by varying magnetic flux Φ, an electrical current I will be induced to flow around side lamination 412 responsive to the varying magnetic flux Φ. Passage of electrical current I through side lamination 412 can lead to resistive heating of side lamination 412, alteration of the electrical and/or magnetic properties of side lamination 412, and/or other undesirable effects. Moreover, current I induced in side lamination 412 reduces the amount of current induced in a conductive coil, for example coil 420, thus reducing the efficiency of the electrical machine.

Figure 4E:
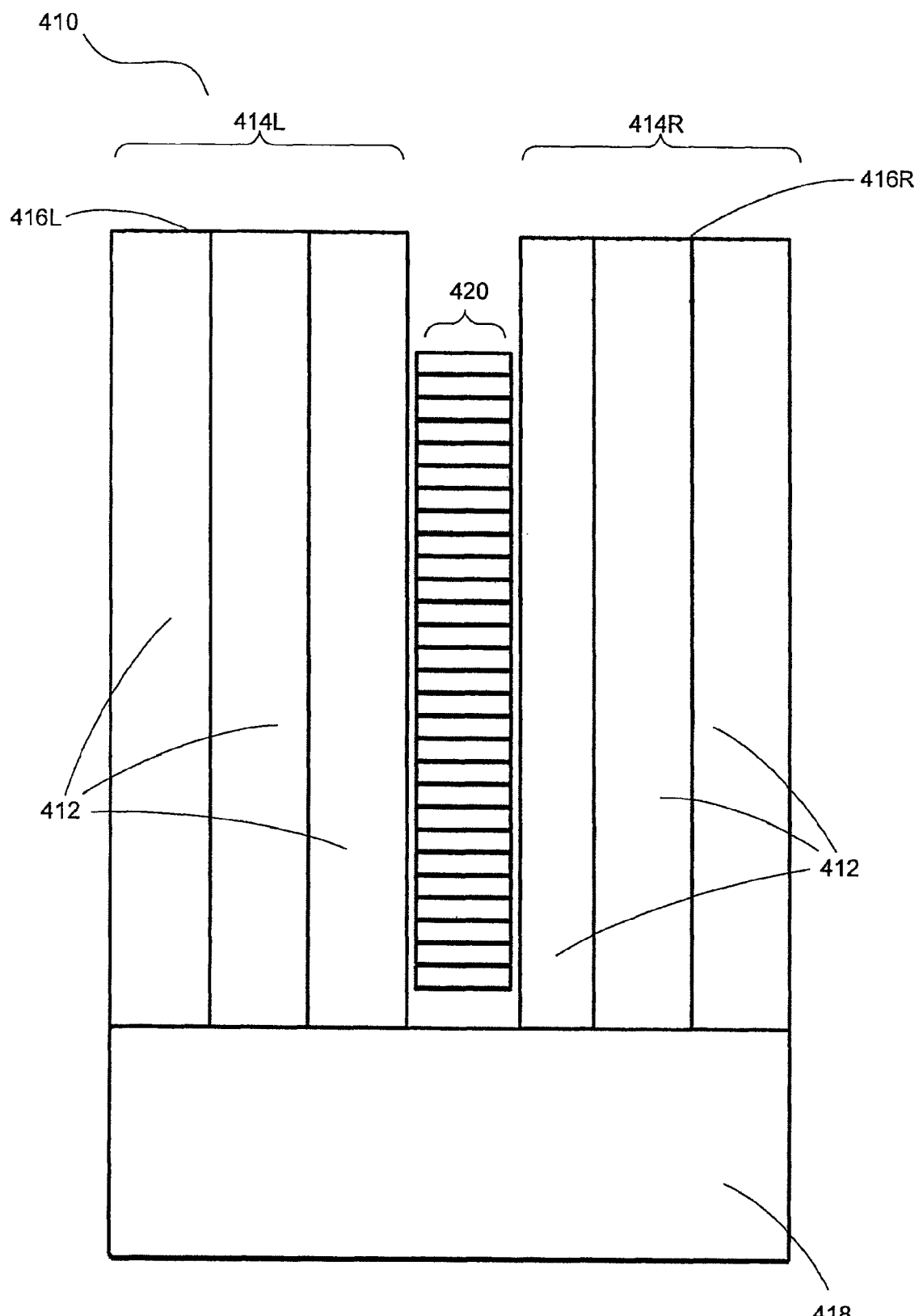
FIG. 4E illustrates two side lamination stacks, each having three side laminations, and a back return lamination partially surrounding a coil in accordance with an exemplary embodiment.
Figure 4F:
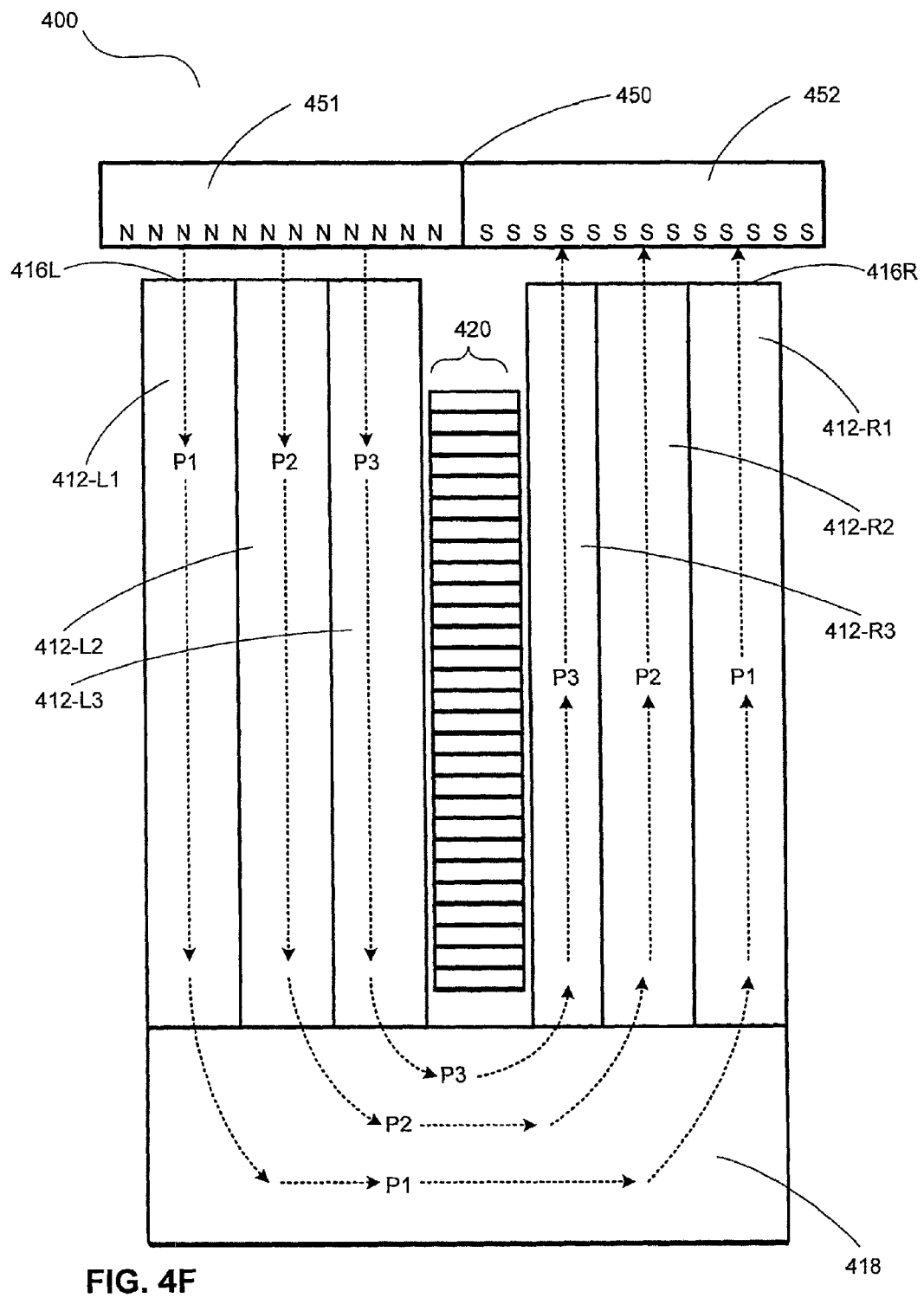
FIG. 4F illustrates flux linking of side laminations in accordance with an exemplary embodiment.

Turning now to FIGS. 4E and 4F, when side laminations 412 provide a closed electrical circuit (for example, due to a continuous ring-like shape), unwanted losses due to linking of certain side laminations 412 can occur. Certain side laminations 412 in a lamination stack 414 may be linked by flux passing through other side laminations 412.

For ease of illustration, lamination stack 414 as illustrated in FIGS. 4E and 4F comprises three side laminations 412. In an exemplary embodiment, lamination stack 414L comprises three side laminations 412, for example side laminations 412-L1, 412-L2, and 412-L3. Lamination stack 414R comprises three side laminations 412, for example side laminations 412-R1, 412-R2, and 412-R3. Lamination stacks 414L and 414R are coupled to one or more back return laminations 418 to provide flux paths around coil 420.

In various exemplary embodiments, a varying magnetic field is provided by rotor 450. Rotor 450 comprises one or more portions having a first magnetic polarity (for example, rotor portion 451), and one or more portions having the opposite magnetic polarity (for example, rotor portion 452). Rotor 450 may comprise various permanent magnets, electromagnets, flux concentrators, and/or the like, as desired.

As illustrated in FIGS. 4E and 4F, at a particular position of rotor 450, a certain amount of flux takes flux path P1 out of rotor 450, across the air gap to tooth 416L and into side lamination 412-L1, "down" (i.e., away from rotor 450) through side lamination 412-L1 into back return lamination 418, through back return lamination 418 into side lamination 412-R1, "up" (i.e., toward rotor 450) through side lamination 412-R1, out of tooth 416R, and across the air gap into rotor 450.

Similarly, a certain amount of flux takes flux path P2 out of rotor 450, across the air gap to tooth 416L and into side lamination 412-L2, down through side lamination 412-L2 into back return lamination 418, through back return lamination 418 into side lamination 412-R2, up through side lamination 412-R2, out of tooth 416R, and across the air gap into rotor 450.

Likewise, a certain amount of flux takes flux path P3 out of rotor 450, across the air gap to tooth 416L and into side lamination 412-L3, down through side lamination 412-L3 into back return lamination 418, through back return lamination 418 into side lamination 412-R3, up through side lamination 412-R3, out of tooth 416R and across the air gap into rotor 450.

Flux taking path P1 links side laminations 412-L2, 412-L3, 412-R2, and 412-R3, as these side laminations 412 are inside the flux loop defined by path P1. Similarly, flux taking path P2 links side laminations 412-L3 and 412-R3. Because flux path P3 is the innermost path, flux taking path P3 does not link any side laminations 412 exterior to flux path P3. Stated generally, flux passing through a particular side lamination 412 links all other side laminations 412 that are "inside" (i.e., closer to coil 420) that particular side lamination 412.

Moreover, the voltage induced in a particular side lamination 412 as a result of flux linking varies depending on the position of that side lamination 412 in lamination stack 414. For example, innermost side laminations 412-L3 and 412-R3 are linked by flux passing through all other side laminations 412, so the voltage induced in side laminations 412-L3 and 412-R3 is higher than in other side laminations 412. The voltage induced in a particular side lamination 412 decreases as the position of side lamination 412 moves outward in lamination stack 414. At the edge of lamination stack 414, side laminations 412-L1 and 412-L2 are linked by no other side laminations 412, so the voltage in side laminations 412-L1 and 412-L2 are lower than in other side laminations 412.

Voltages induced in side laminations 412 may vary based upon a voltage constant of a transverse flux machine, an RPM of a transverse flux machine, the number of poles in a transverse flux machine, and/or the like. In an exemplary embodiment, a voltage of approximately 1 volt AC is induced in the innermost side lamination 412 when rotor 450 rotates at about 300 RPM. In other exemplary embodiments, a voltage of between about 0.5 volts AC and about 2 volts AC is induced in the innermost side lamination 412 when rotor 450 rotates at about 300 RPM.

Moreover, the voltage induced in a particular side lamination 412 in a lamination stack may vary in a generally stepwise linear fashion based on the position of side lamination 412 in the lamination stack. Stated another way, for example, when a voltage of about 1 volt is induced in an innermost side lamination 412, and a voltage of about 0 volts is induced in an outermost side lamination 412, a voltage of about 0.5 volts is induced in a side lamination 412 located halfway between the inner and outer edges of lamination stack 414.

Moreover, because differing voltages are induced in different side laminations 412 in lamination stack 414 responsive to rotation of rotor 450, a voltage exists between adjacent side laminations 412 in lamination stack 414. For example, in a lamination stack 414 comprising 20 side laminations 412, when a voltage of about 1 volt is induced in an innermost side lamination 412, and a voltage of about 0 volts is induced in an outermost side lamination 412, adjacent side laminations 412 may have a voltage therebetween of about 0.05 volts (i.e., about one-twentieth of the voltage difference between the innermost side lamination 412 and the outermost side lamination 412). Such voltages induced in side laminations 412 may be high enough to generate appreciable currents between side laminations 412 in lamination stack 414, despite the presence of insulating material.

In an exemplary embodiment, losses associated with voltages induced in side laminations 412 may result in about 2 Newton-meters of effective drag at 100 RPM. In another exemplary embodiment, losses associated with voltages induced in side laminations 412 may exceed 50 watts at 100 RPM. In various exemplary embodiments, losses associated with voltages induced in side laminations 412 may comprise between about 10% to about 70% of all losses in a particular transverse flux machine, for example transverse flux machine 400.

Figure 5A:
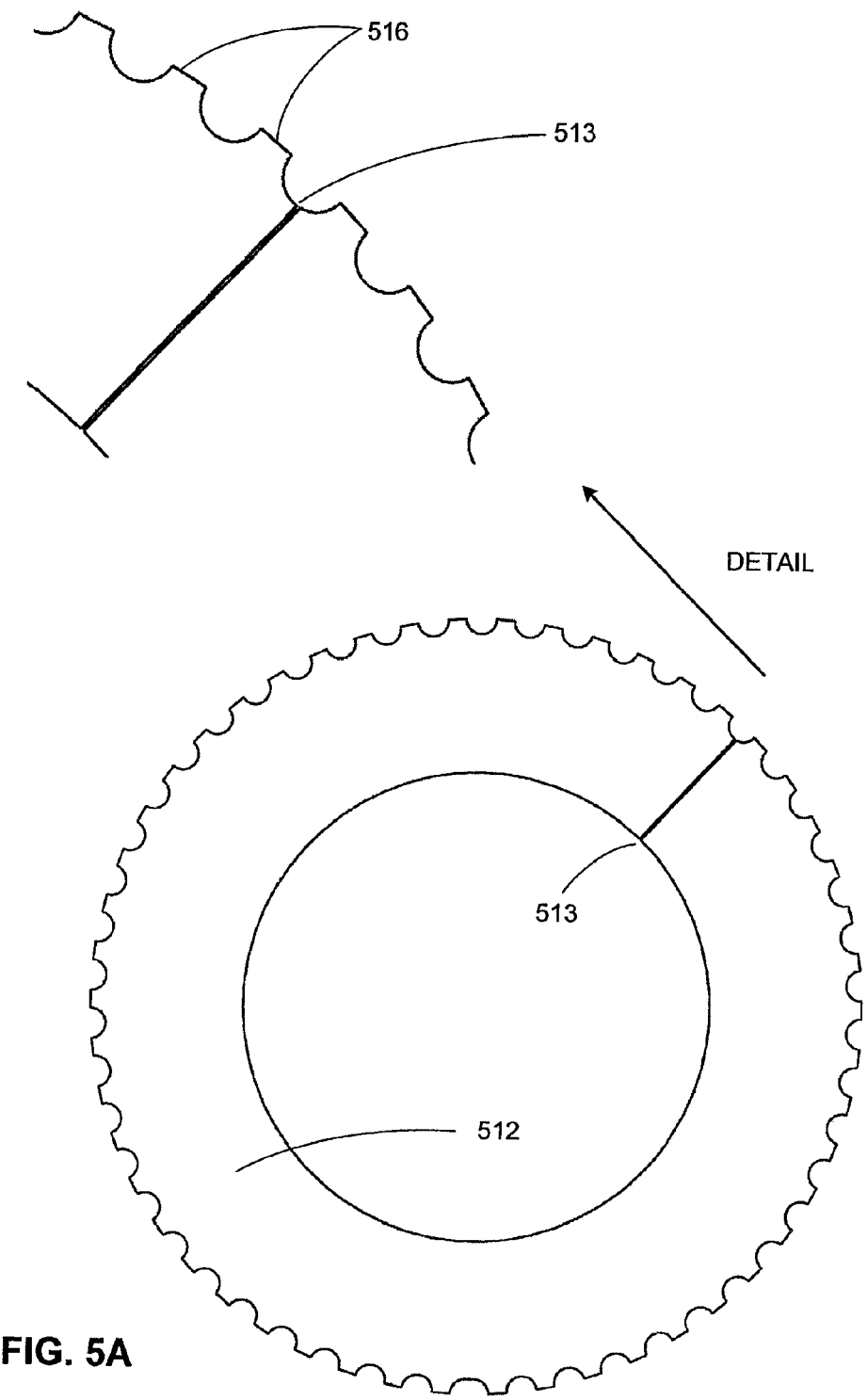
FIG. 5A illustrates an exemplary side lamination having a cut therethrough in accordance with an exemplary embodiment.
Figure 5C:
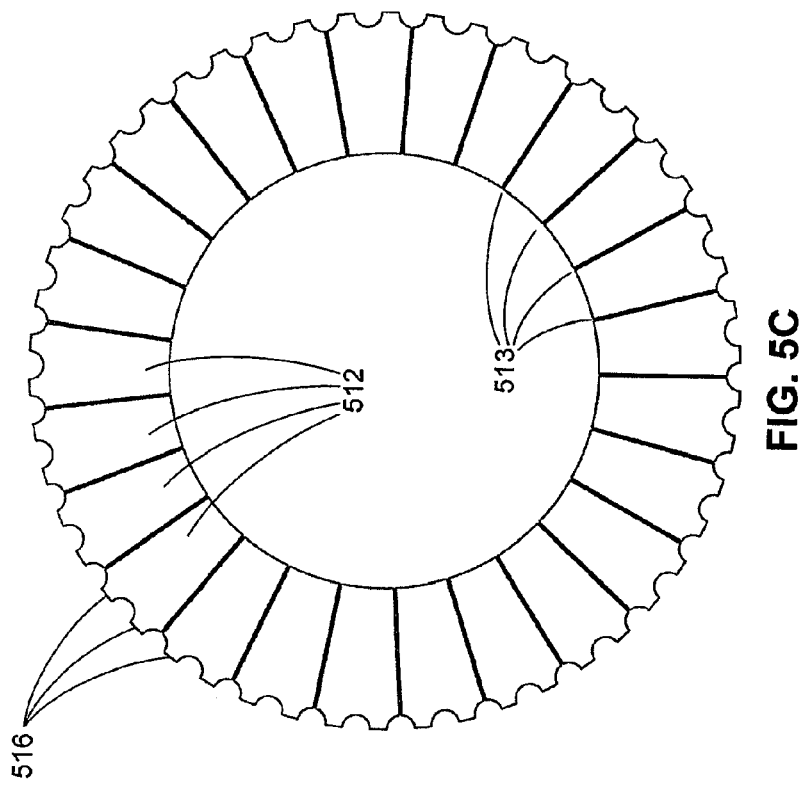
FIGS. 5B and 5C illustrate side laminations having multiple cuts therethrough in accordance with an exemplary embodiment.
Figure 5B:
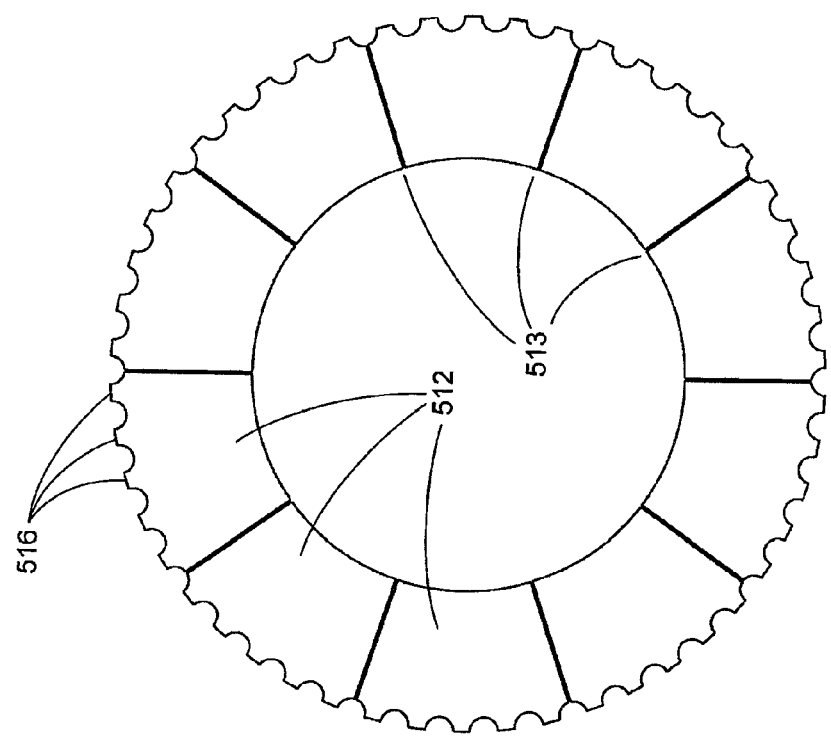

Turning now to FIGS. 5A-5C, in various exemplary embodiments currents induced in side laminations 412, for example side laminations 512 having teeth 516 thereon, may be reduced and/or eliminated by modifying side laminations 512 to interrupt a continuous electrical circuit therein. In an exemplary embodiment, side lamination 512 is configured with a narrow cut 513 completely therethrough, breaking the electrical circuit. In one exemplary embodiment, cut 513 is about 0.02" thick. In another exemplary embodiment, cut 513 is about 0.04" thick. Moreover, cut 513 may be any suitable width, as desired.

In various exemplary embodiments multiple cuts 513 may be made in side lamination 512. In an exemplary embodiment, side lamination 512 is configured with 2 cuts 513. In another exemplary embodiment, side lamination 512 is configured with 10 cuts 513. Side lamination 512 may be configured with 3 cuts, 12 cuts, 25 cuts, and/or any other suitable number of cuts, as desired. Considered another way, a generally ring-shaped structure in a transverse flux machine may be considered to be made up of a plurality of side lamination 512 as "segments" or portions thereof, each least partially electrically and/or physically separated from one another by one or more cuts 513. Stated generally, while the word "cut" is often used herein, it will be appreciated that various approaches for forming gaps, voids, spaces, segments, and/or the like are all contemplated in accordance with principles of the present disclosure.

Figure 5D:
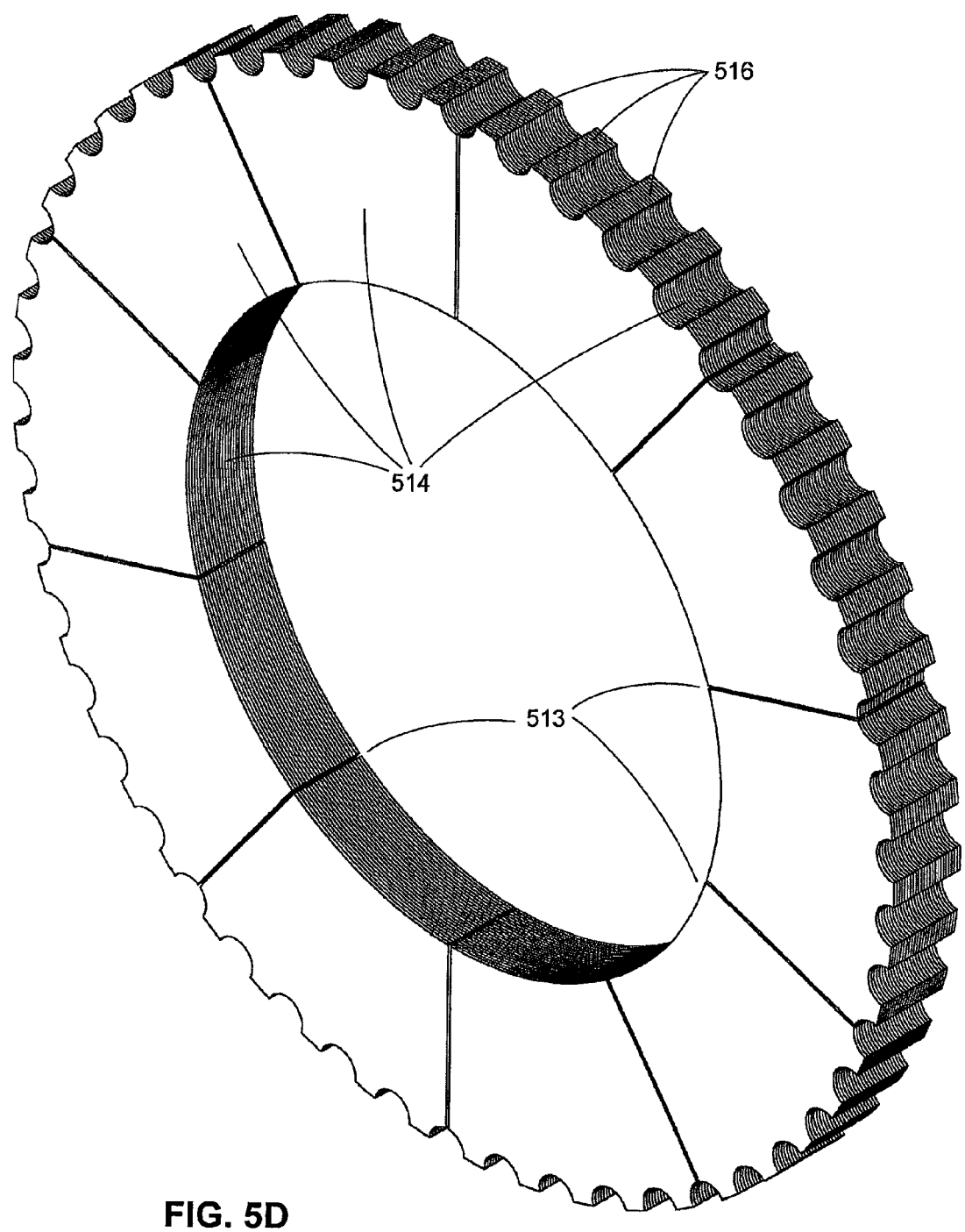
FIG. 5D illustrates a side lamination stack having multiple cuts therethrough in accordance with an exemplary embodiment.

Similarly, with reference now to FIG. 5D, in various exemplary embodiments a lamination stack 514 may be configured with one or more cuts 513 therethrough. Lamination stack 514 may be formed as a continuous ring, and then cuts 513 may be made therein. Alternatively, lamination stack 514 may be formed from side laminations 512 which were pre-cut prior to forming lamination stack 514. Yet further, lamination stack 514 may be formed from side laminations 512 fashioned in any suitable manner prior to forming lamination stack 514.

In an exemplary embodiment, creation of a single cut 513 in a lamination stack 514 reduced losses associated with that lamination stack 514 by about 50% (compared to a lamination stack 514 lacking a cut 513) when the cut lamination stack 514 was utilized in a transverse flux machine. In another exemplary embodiment, creation of a single cut 513 in a lamination stack 514 reduced losses associated with that lamination stack 514 by about 70% (compared to a lamination stack 514 lacking a cut 513) when utilized in a transverse flux machine. In various exemplary embodiments, creation of a single cut 513 in a lamination stack 514 reduced losses associated with that lamination stack 514 by between about 10% and about 90% (compared to a lamination stack 514 lacking a cut 513) when utilized in a transverse flux machine. Moreover, the effect of a single cut 513 varies with the effectiveness of electrically insulating material on the exterior of side laminations 512. In general, the more effective the insulator, the more losses are reduced by a single cut. Generally stated, a larger number of cuts 513 more effectively interrupt electrical paths around lamination stack 514; however, as the number of cuts 513 grows, the complexity associated with manufacturing lamination stacks 514 and/or integrating cut laminations stacks 514 into a functional electrical machine may also grow. Additionally, as the number of cuts grows, the voltages induced in side laminations 512 of lamination stacks 514 are reduced, as lamination stack 514 extends a shorter angular distance around a transverse flux machine and is thus linked by less magnetic flux.

In various exemplary embodiments, a side lamination 512 and/or lamination stack 514 may be formed from oriented materials. Stated generally, the shorter angular distance a particular side lamination 512 and/or lamination stack 514 extends around a transverse flux machine, the greater the benefit in using oriented materials in that side lamination 512 and/or lamination stack 514. This can be seen due to the fact that as a side lamination 512 and/or lamination stack 514 extends a shorter angular distance, flux in that side lamination 512 and/or lamination stack 514 can travel more closely in a single direction (e.g., a radial direction), which can be configured to be generally parallel to the grain of the oriented material.

Figure 5E:
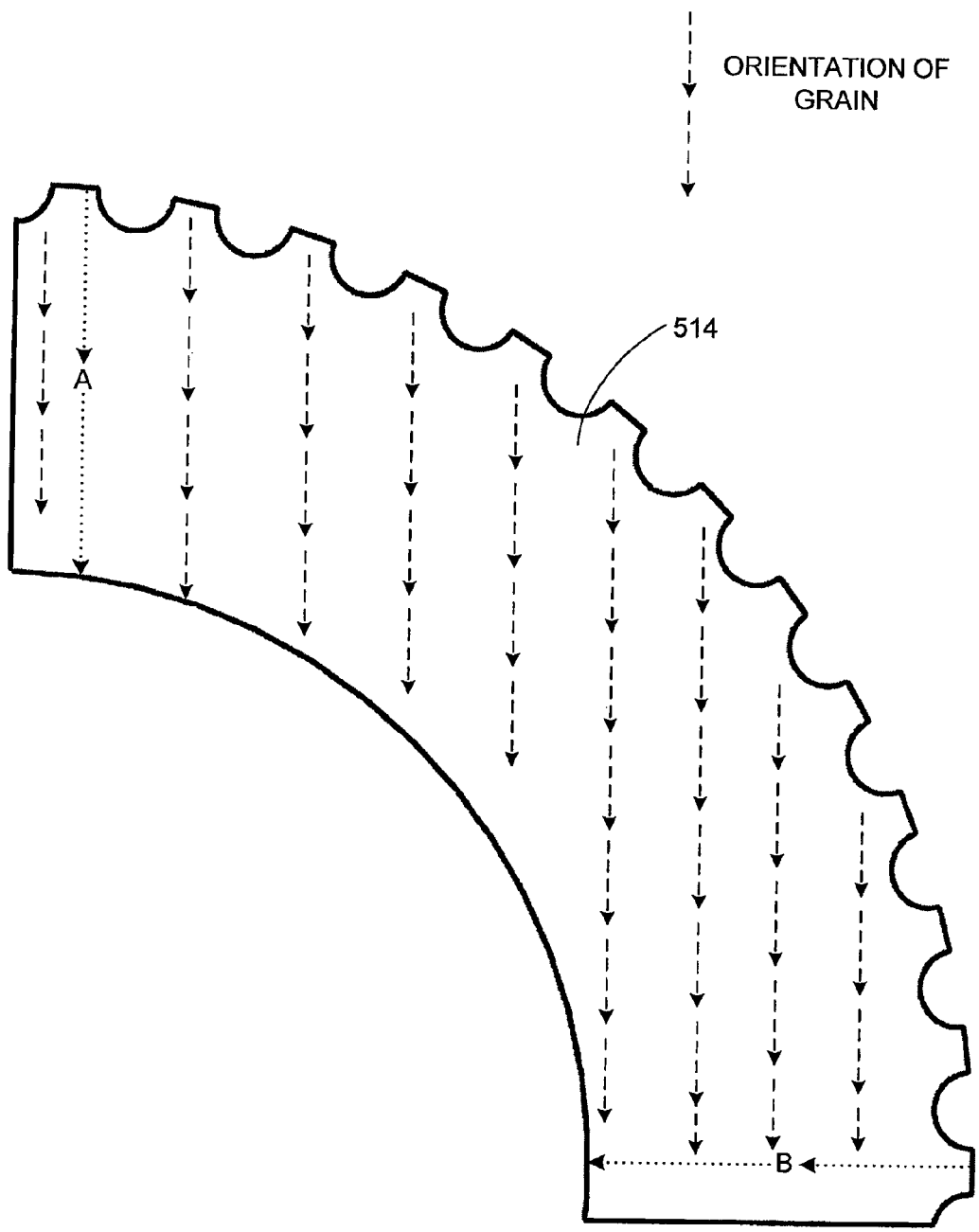
FIG. 5E illustrates flux flow in a side lamination comprising oriented materials in accordance with an exemplary embodiment.

For example, with reference now to FIG. 5E, in an exemplary embodiment a particular lamination stack 514 extends about 90 degrees around a transverse flux machine (i.e., about one-quarter of the angular distance around a transverse flux machine). This lamination stack 514 comprises side laminations each formed from an oriented material, for example CRGO steel. When flux passes through lamination stack 514 along path A, the flux travel through lamination stack 514 in a direction generally parallel to the grain orientation in lamination stack 514. However, when flux passes through lamination stack 514 along path B, the flux travels nearly perpendicular to the grain orientation in lamination stack 514, increasing losses.

In an exemplary embodiment, oriented materials are utilized in lamination stack 514 when lamination stack 514 extends an angular distance of up to about 60 degrees around a transverse flux machine. Stated another way, oriented materials are utilized in lamination stack 514 when six or more similarly sized lamination stacks 514 are utilized to form a generally ring-shaped structure in a transverse flux machine. In another exemplary embodiment, oriented materials are utilized in lamination stack 514 when lamination stack 514 extends an angular distance of up to about 30 degrees around a transverse flux machine. In various exemplary embodiments, oriented materials are utilized in lamination stack 514 when lamination stack 514 extends an angular distance of between about 10 degrees and about 60 degrees around a transverse flux machine. Moreover, oriented materials may be utilized in any suitable configuration of lamination stack 514.

In various exemplary embodiments, oriented materials are utilized in lamination stacks 514 such that the orientation direction near the middle of a lamination stack 514 is generally parallel to the radial direction. Stated another way, in various exemplary embodiments, lamination stacks 514 are configured to reduce the degree to which flux flow in lamination stacks 514 is out of alignment with the grain orientation. For example, in an exemplary embodiment wherein lamination stack 514 extends an angular distance of about 60 degrees around a transverse flux machine, and wherein the grain orientation is about parallel to the radial direction at about the middle of lamination stack 514, flux flow in lamination stack 514 is thus within about +/−30 degrees of the grain orientation. In various exemplary embodiments, lamination stack 514 is configured such that the grain orientation in lamination stack 514 is never more than 30 degrees out of alignment with the radial direction. In other exemplary embodiments, lamination stack 514 is configured such that the grain orientation in lamination stack 514 is never more than 15 degrees out of alignment with the radial direction. Moreover, lamination stack 514 may be configured to cause the grain orientation to be within any suitable specified number of degrees of the radial direction, as desired.

Figure 5F:
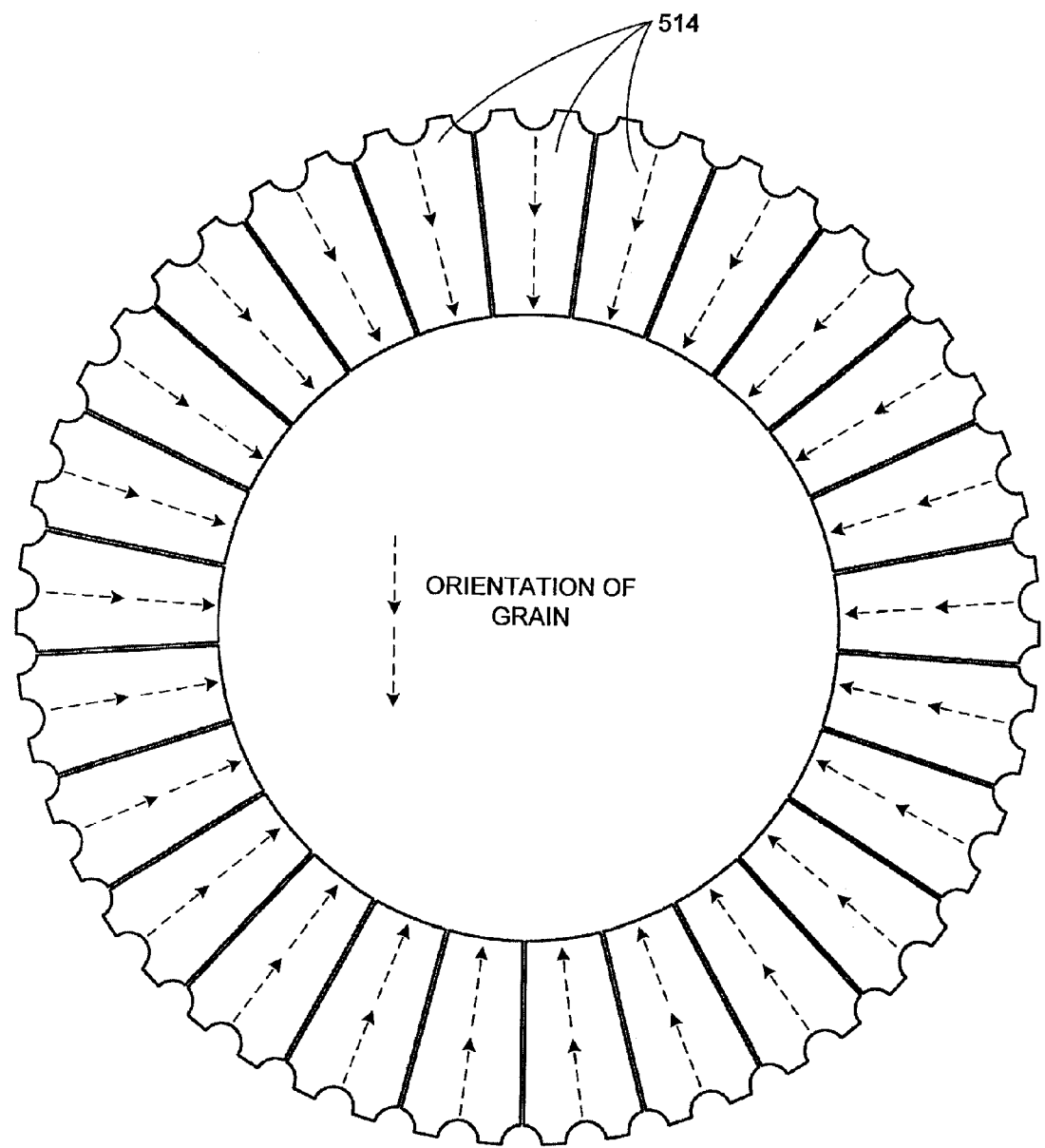
FIG. 5F illustrates a generally ring-shaped structure comprising side laminations made of oriented materials in accordance with an exemplary embodiment.

In an exemplary embodiment, with reference now to FIG. 5F, a ring-shaped structure in a transverse flux machine comprises 25 lamination stacks 514. Lamination stacks 514 each comprise oriented materials, and each lamination stack 514 is configured such that the grain orientation is in a generally radial direction in the transverse flux machine.

Figure 6A:
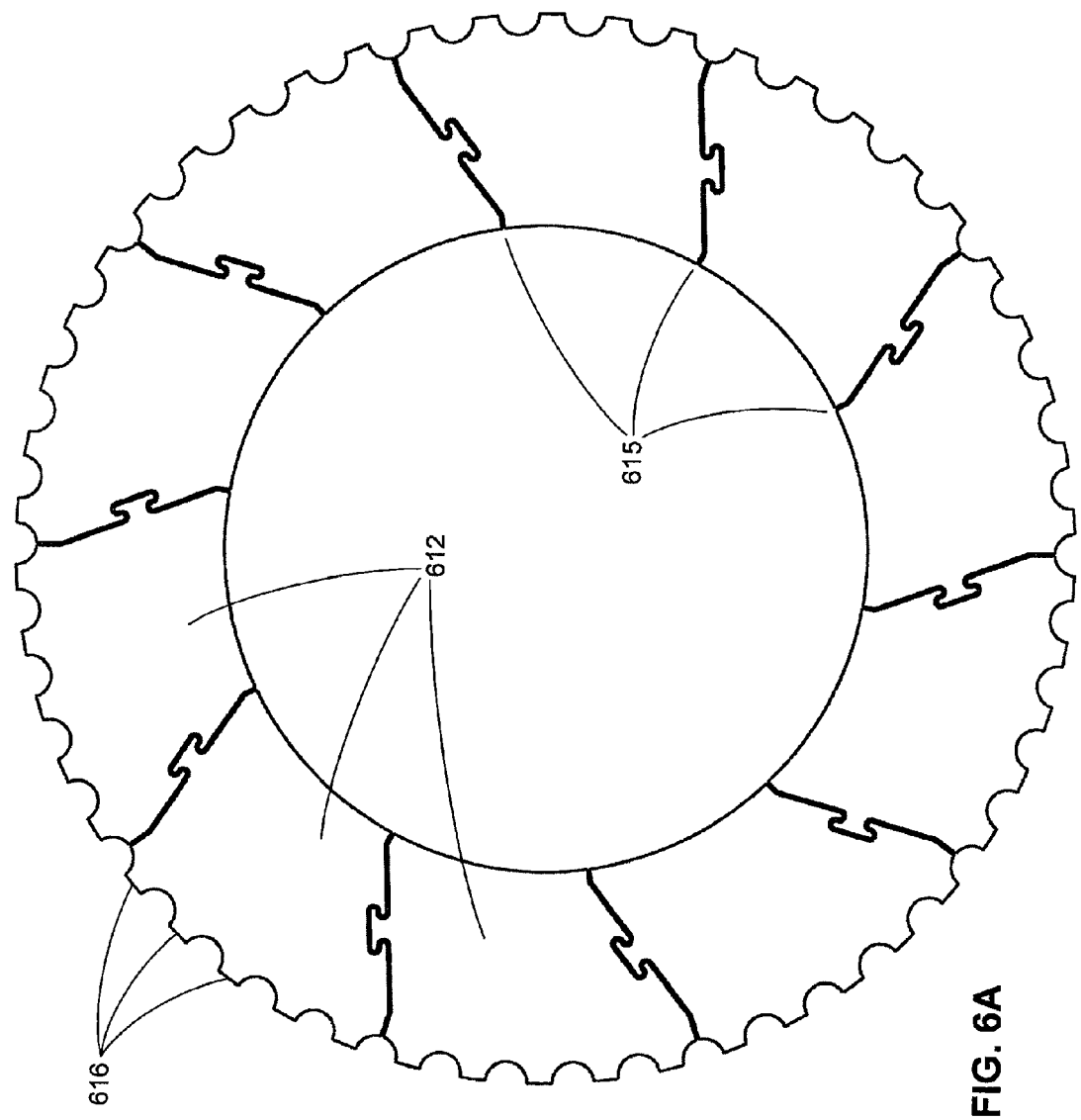
FIG. 6A illustrates a side lamination having multiple interlocking cuts therethrough in accordance with an exemplary embodiment.

Cuts and/or segmentation in a transverse flux machine and/or commutated flux machine may be configured to provide electrical separation while also providing and/or maintaining desirable mechanical properties. Turning now to FIG. 6A, in an exemplary embodiment a generally ring-shaped piece of planar material having teeth 616 thereon may be segmented into various side laminations 612 via two or more cuts 615. Additionally, cuts 615 may be configured to provide mechanical coupling between side laminations 612, for example by forming portions of side laminations 612 into "puzzle-piece" shapes. Side laminations 612 may thus be configured to interlock with one another.

Moreover, multiple cuts 615 may be made. In an exemplary embodiment, one ring-shaped side lamination 612 may be divided into ten side laminations 612 via ten cuts 615. The ten resulting side laminations 612 may be interlocked with one another to form a generally ring-shaped structure. The ring-shaped structure may be dimensionally similar to a ring-shaped side lamination 612 lacking cuts 615. Stated another way, multiple side laminations 612 configured with cuts 615 may be used in place of a single ring-shaped side lamination 612 lacking a cut 615. As will be appreciated, side laminations 612 may also be individually formed via stamping, die cutting, laser cutting, water jet cutting, electrical discharge machining, and/or the like, and examples provided herein are by way of illustration and not of limitation.

Similarly, a lamination stack 614 may be configured with one or more cuts 615 therethrough. Lamination stack 614 may be formed as a continuous ring, and then cuts 615 may be made therein. Alternatively, a lamination stack 614 may be formed from side laminations 615 which were pre-cut or otherwise pre-shaped or configured prior to forming lamination stack 614. Multiple lamination stacks 614 may be interlocked with one another to form a generally ring-shaped structure.

Figure 6B:
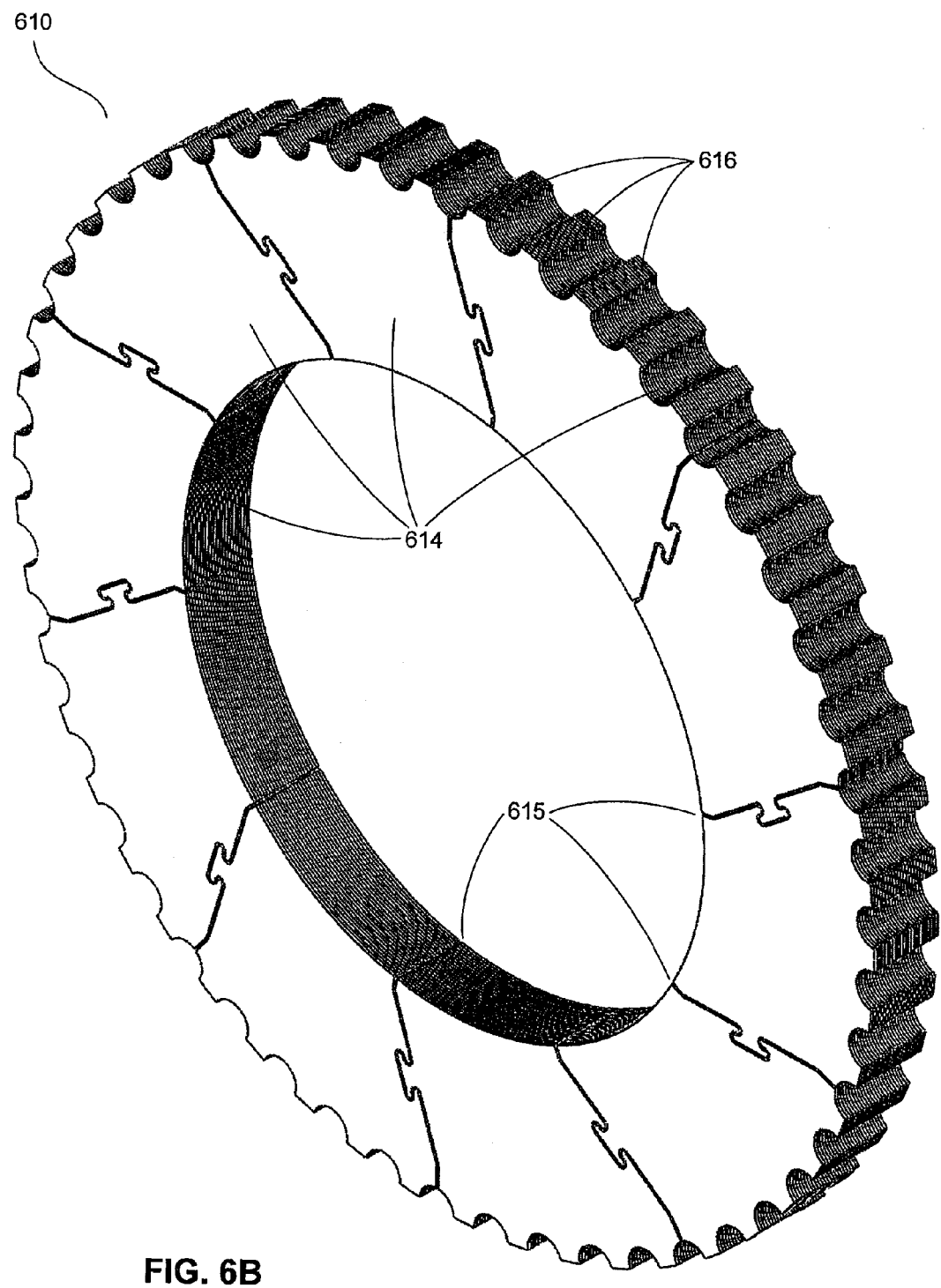
FIG. 6B illustrates a side lamination stack having multiple interlocking cuts therethrough in accordance with an exemplary embodiment.

In various exemplary embodiments, cuts 615 may be configured to interlock portions of adjacent lamination stacks 614, for example as illustrated in FIG. 6B. In other exemplary embodiments, with reference now to FIGS. 6C and 6D, cuts 615 may be configured to allow portions of a lamination stack 614 to at least partially interlock with other components, for example components configured to couple laminations stacks 614 together. Stated differently, in various exemplary embodiments, lamination stacks 614 may at least partially interlock or couple to one another; in other exemplary embodiments, lamination stacks 614 may at least partially interlock or couple to other components disposed between and/or linking lamination stacks 614.

Figure 6C:
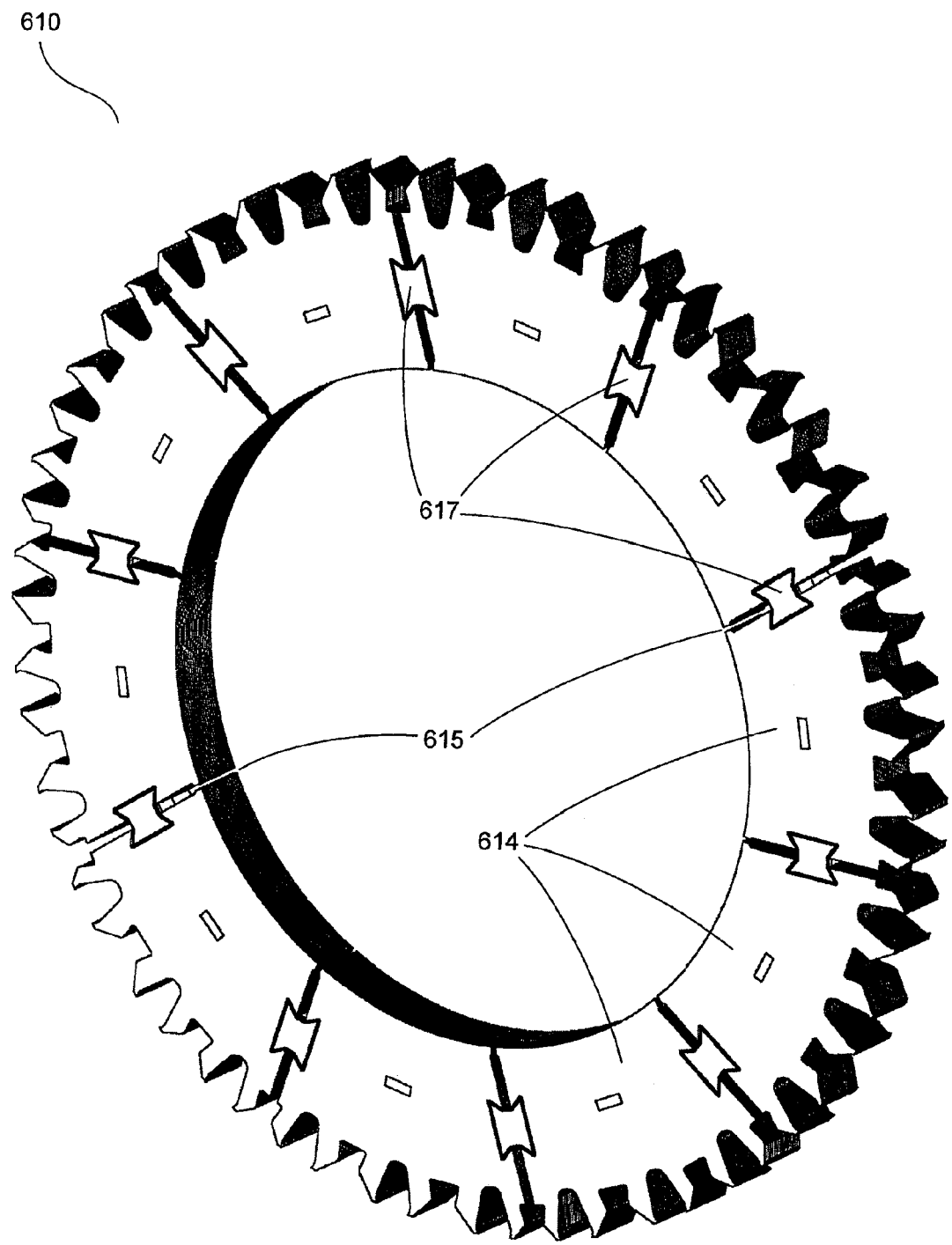
FIGS. 6C and 6D illustrate side lamination stacks configured with cuts providing features for mechanical connection between side lamination stacks in accordance with an exemplary embodiment.
Figure 6D:
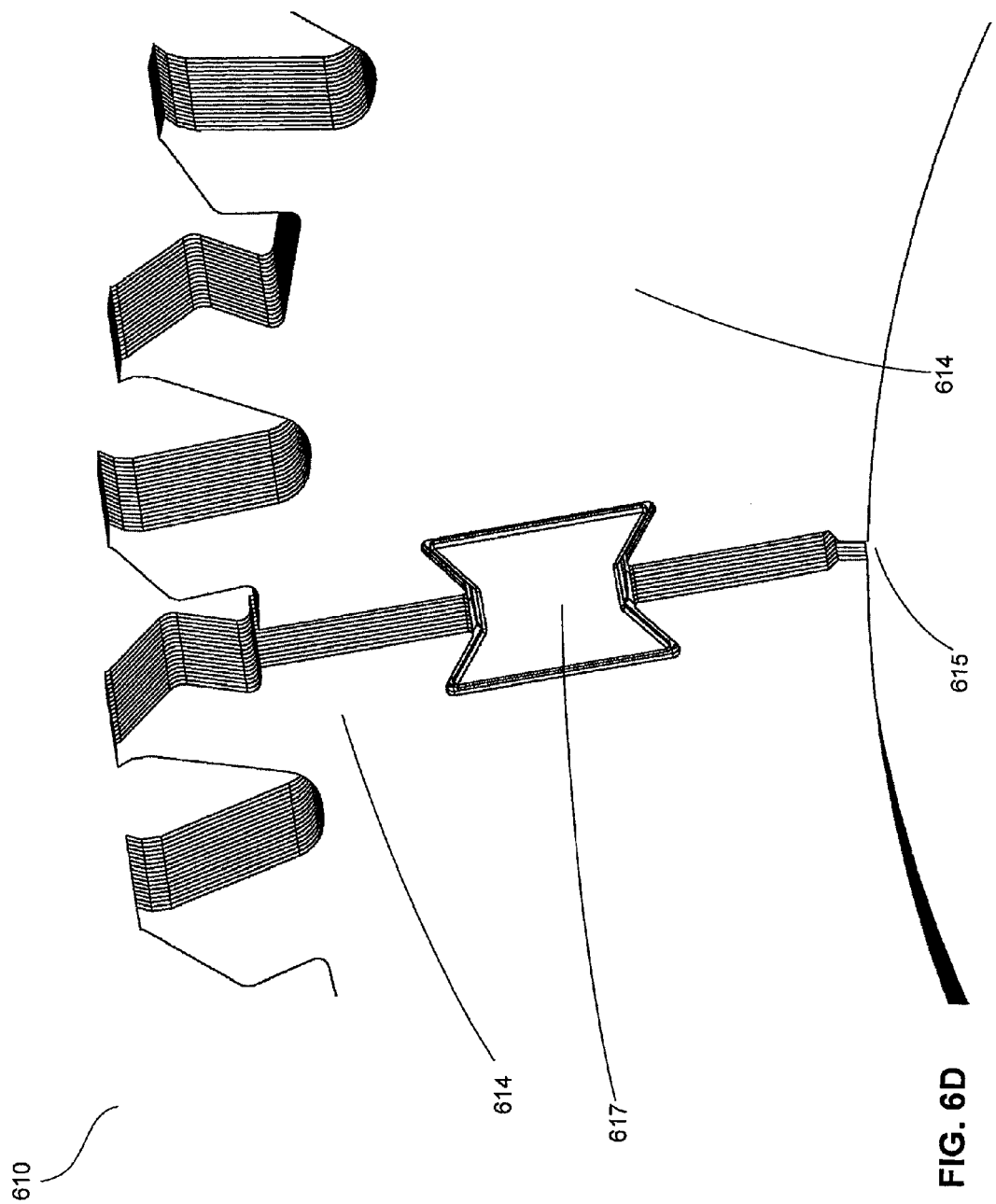

In an exemplary embodiment, portions of cuts 615 in lamination stack 614 define generally "female" portions of lamination stack 614. A non-magnetic coupling component, for example a "double dovetail"-like insert 617 configured with two "male" portions, may then be coupled to the corresponding female portions of adjacent lamination stacks 614 order to couple adjacent lamination stacks 614. It will be appreciated that the respective location of male and female portions on lamination stack 614 and inserts 617 may also be reversed, as suitable. While a dovetail-like interlocking is illustrated in FIGS. 6C and 6D, it will be appreciated that various other otherlocking and/or partially interlocking configurations and shapes may be utilized, as suitable. Moreover, inserts 617 may be formed from liquid crystal polymer, glass-filled engineering plastic, ceramic, electrically insulated and/or coated metal, and/or other suitable structural materials or combinations thereof.

Multiple lamination stacks 614 may be coupled together via the use of various non-magnetic coupling components such as inserts 617, for example in order to form a generally ring-shaped structure. Stated generally, cuts 615 may be configured to provide features for mechanical connection between lamination stacks 614, and/or between lamination stacks 614 and other components of a transverse flux machine and/or commutated flux machine, for example inserts 617.

Figure 6E:
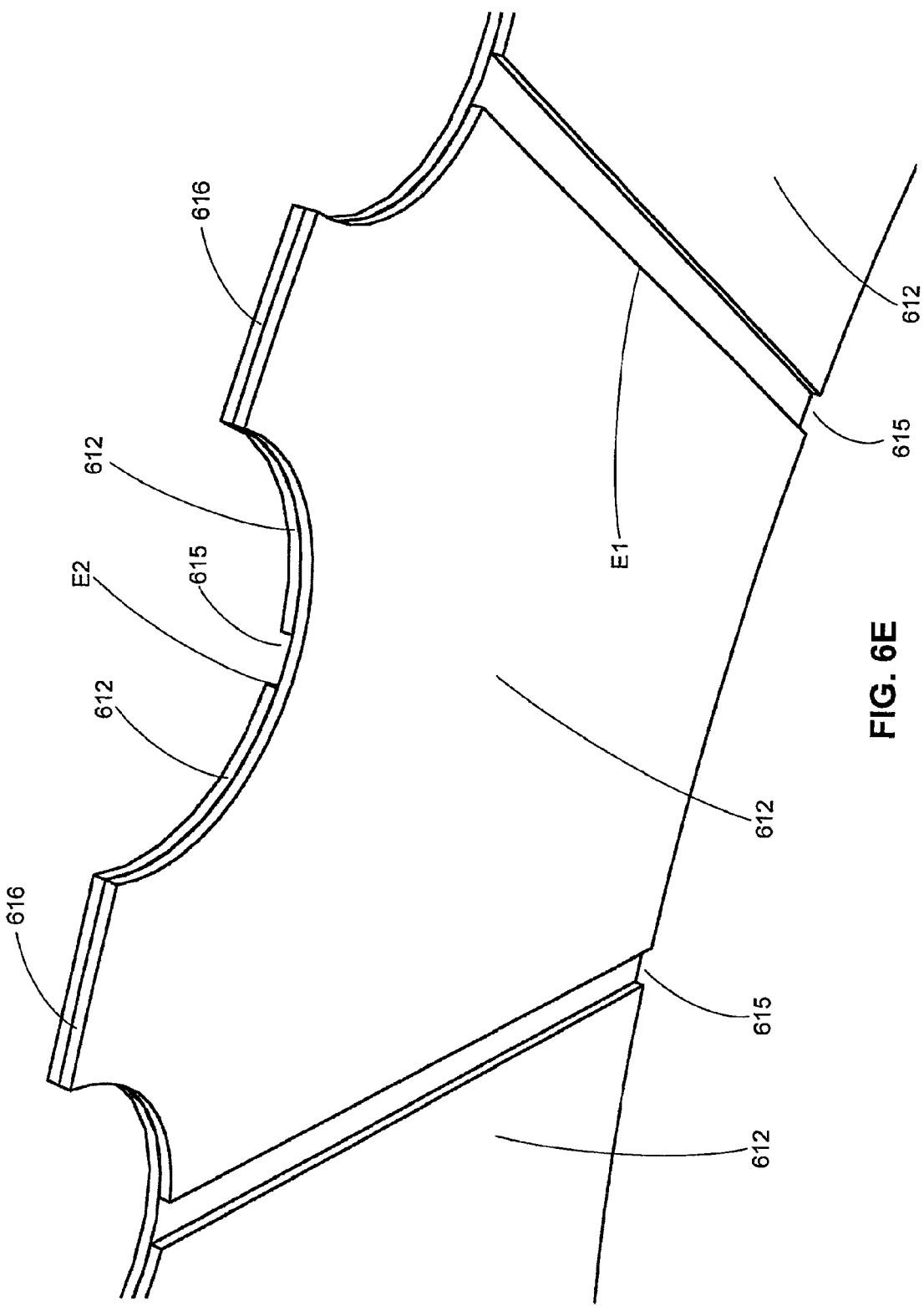
FIGS. 6E and 6F illustrate side laminations stacked in an offset manner in accordance with an exemplary embodiment.
Figure 6F:
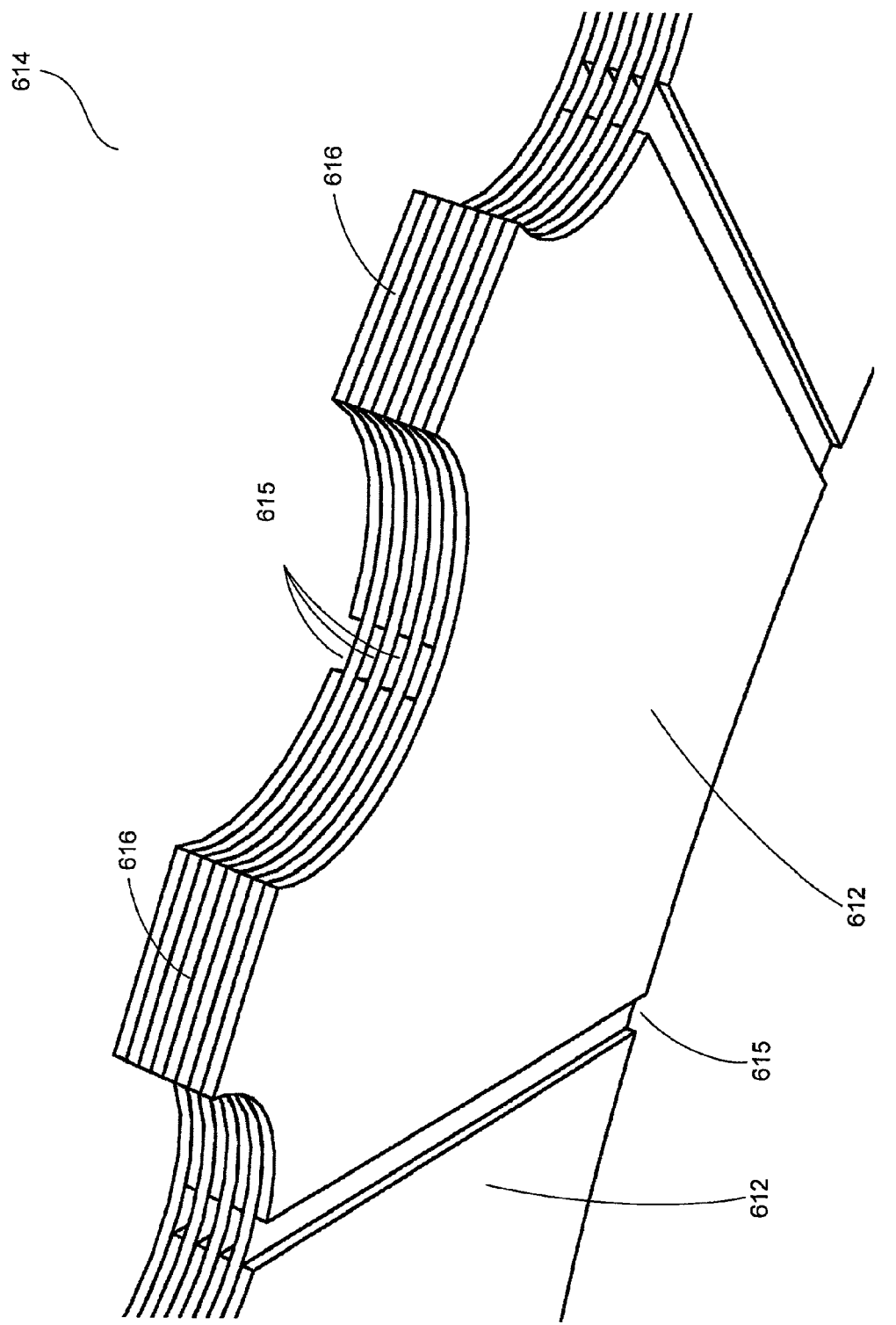

Turning now to FIGS. 6E and 6F, in various exemplary embodiments multiple layers of side laminations 612 may be utilized to form a generally ring-shaped structure. In certain exemplary embodiments, side laminations 612 may be stacked in an offsetting and/or "bricklaying"-like manner between layers. In these exemplary embodiments, side laminations 612 are disposed such that side laminations 612 in adjacent layers in a lamination stack 614 are at least partially displaced from one another in a rotational direction. Stated another way, as between layers of laminated material in a lamination stack 614, cuts 615 (or any other suitable gap and/or segmentation between side laminations 612 in a particular layer) are disposed in different and/or alternating locations, layer-to-layer. Stated yet another way, an edge of a first side lamination 612 (for example, edge E1 illustrated in FIG. 6E) is not aligned with an edge of a second side lamination 612 (for example, edge E2 illustrated in FIG. 6E), even though first side lamination 612 and second side lamination 612 are in adjacent layers in lamination stack 614, and even though first side lamination 612 and second side lamination 612 cover at least partially overlapping angular distances in an electrical machine.

By configuring side laminations 612 in an at least partially offset and/or overlapping manner between layers, side laminations 612 in adjacent layers may each be least partially electrically and/or physically separated and/or insulated from one another. This reduces electrical currents induced in side laminations 612, for example responsive to switching of magnetic flux around side laminations 612.

In various exemplary embodiments, side laminations 612 in adjacent layers may be disposed with an offset of approximately one-half of the width of a single side lamination 612 (e.g., in a manner similar to a "stretcher bond" brickwork pattern). In other exemplary embodiments, side laminations 612 in adjacent layers may be disposed with an offset of between about 10% and about 49% of the width of a single side lamination 612 (e.g., in a manner similar to a "raking stretcher bond" brickwork pattern). Moreover, any suitable offset may be utilized.

In various exemplary embodiments, side laminations 612 in adjacent layers have identical shapes. In other exemplary embodiments, side laminations 612 in adjacent layers differ in shape from one another. In this manner, side laminations 612 may be offset from one another, as desired, while still causing teeth 616 in side laminations 612 in adjacent layers to align with one another to form a flux switch.

Moreover, in various exemplary embodiments, multiple layers of side laminations 612 may be stacked together to form a lamination stack 614, and thereafter teeth 616 may be formed on lamination stack 614 (for example via embossing, laser cutting, and/or any other suitable technique, machinery, or procedure). In these exemplary embodiments, improved manufacturability of teeth 616 is facilitated, as the need to precisely align side laminations 612 (and corresponding previously formed teeth 616) in successive layers is reduced and/or eliminated. Rather, multiple layers of side laminations 612 may be roughly aligned and/or coupled to one another, and then teeth 616 may be precisely formed and located via embossing and/or cutting of multiple layers of side laminations 612 simultaneously.

Any suitable number of layers of side laminations 612 may be utilized to form a structure. In an exemplary embodiment, multiple layers of side laminations 612 are utilized to form a lamination stack 614, for example a lamination stack 614 having a generally ring-shaped structure. In an exemplary embodiment, 8 layers of side laminations 612 are utilized (for example, as illustrated in FIG. 6F). In other exemplary embodiments, 10 layers, 20 layers, 30 layers, 100 layers, and/or more layers of side laminations 612 may be utilized, for example depending on the thickness of the planar material forming side laminations 612, the space available in an electrical machine, and/or the like. Side laminations 612 in adjacent layers may be formed from similar materials; moreover, side laminations 612 in adjacent layers may comprise differing materials and/or coatings.

By utilizing a stator comprising one or more "cut" or "segmented" lamination stacks, for example lamination stacks 514, 614, and/or the like, a transverse flux machine and/or commutated flux machine may be configured to achieve higher output torque, higher efficiency, lower temperature operation, reduced thermal losses, reduced eddy currents, and/or other similar operational improvements. Additionally, a transverse flux machine and/or commutated flux machine may be configured with improved manufacturability, improved mechanical and/or structural properties, and/or the like.

In addition to principles of segmented side laminations in transverse flux machines and/or commutated flux machines, principles of the present disclosure contemplate use of laminated materials as "back iron". In these configurations, laminated materials provide magnetic flux paths from one side of a stator to another, generally on the "back" side of the stator (e.g., the side of the stator opposite the rotor). For example, laminated materials may be utilized to provide flux paths from a lamination stack on a first side of a stator to a lamination stack on an opposing side of a stator. Moreover, in addition to laminated materials, principles of the present disclosure contemplate the use of powdered metal and/or other suitable magnetic material as "back iron".

Figure 7B:
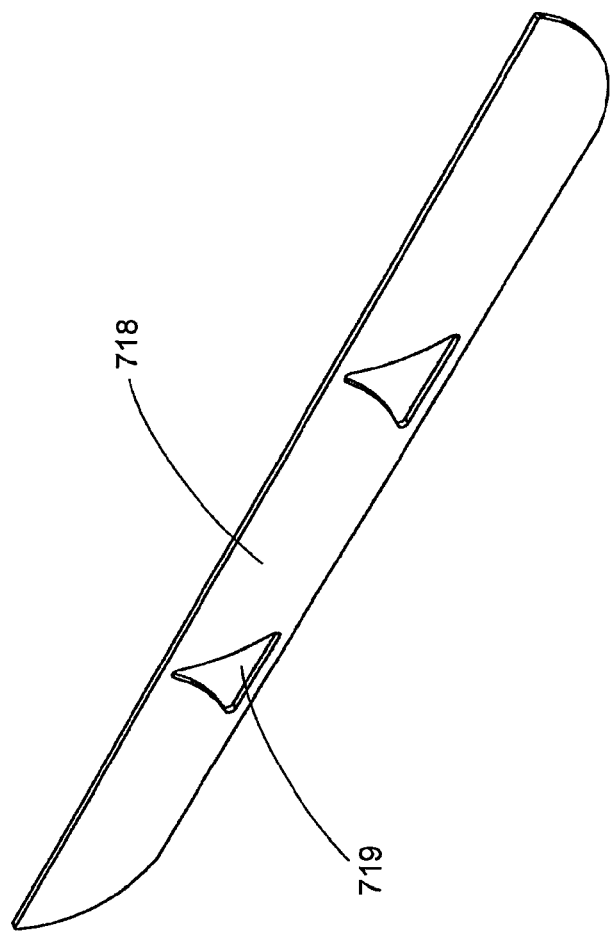
FIG. 7B illustrates a back return lamination having holes therein in accordance with an exemplary embodiment.
Figure 7A:
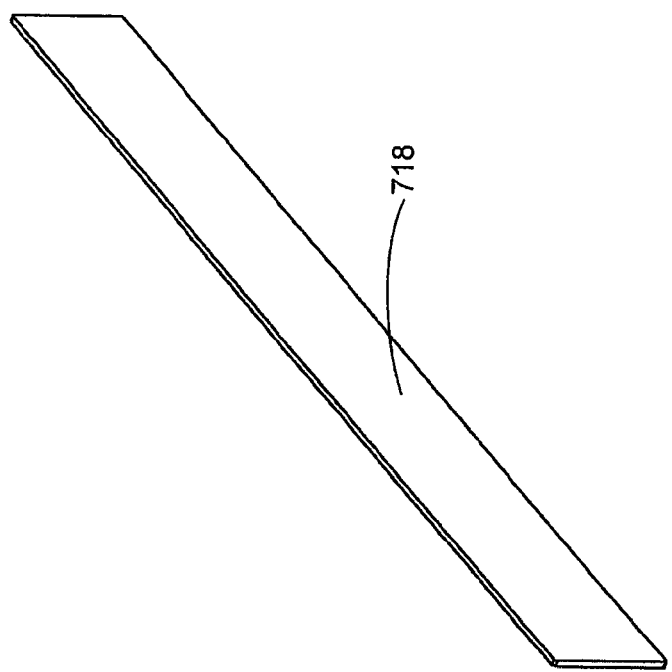
FIG. 7A illustrates a back return lamination in accordance with an exemplary embodiment.

Turning now to FIGS. 7A and 7B, in various exemplary embodiments, a back return lamination 718 comprises a generally planar piece of material configured to conduct magnetic flux. Back return lamination 718 may comprise materials similar to side return lamination 412. The exterior of back return lamination 718 may also be similarly electrically insulated. In an exemplary embodiment, back return lamination 718 comprises M19 silicon steel having a polyimide electrically insulating coating.

Back return lamination 718 is sized and/or shaped to extend at least partway in an axial direction in a transverse flux machine and/or commutated flux machine. In an exemplary embodiment, back return lamination 718 comprises a generally rectangular shape having a length of about 62 mm, a width of about 6.5 mm, and a thickness of about 0.35 mm. In various exemplary embodiments, back return lamination 718 is configured with a length of between about 20 mm and about 120 mm, a width of between about 2.5 mm and about 15 mm, and a thickness of between about 0.18 mm and about 0.65 mm. Moreover, back return lamination 718 may be configured with any suitable dimensions and/or geometries, for example depending on the size of a particular transverse flux machine and/or commutated flux machine.

In various exemplary embodiments, with momentary reference to FIG. 7A, back return lamination 718 may be configured as a generally rectangular portion of material. In other exemplary embodiments, with momentary reference to FIG. 7B, back return lamination 718 may be configured with various curved edges, straight edges, and/or with one or more holes 719 therethrough. Moreover, back return lamination 718 may comprise multiple segments coupled together. For example, back return lamination 718 may comprise three generally rectangular portions coupled end to end in an axial direction in a transverse flux machine.

Holes 719 may be generally triangular, rectangular, circular, oval, irregular, and/or any other suitable shape. Holes 719 may be configured to reduce the mass of a particular electrical machine; moreover, holes 719 may also be configured to reduce, guide, and/or modify flux sharing between phases of a polyphase transverse flux machine as discussed below.

Figure 7C:
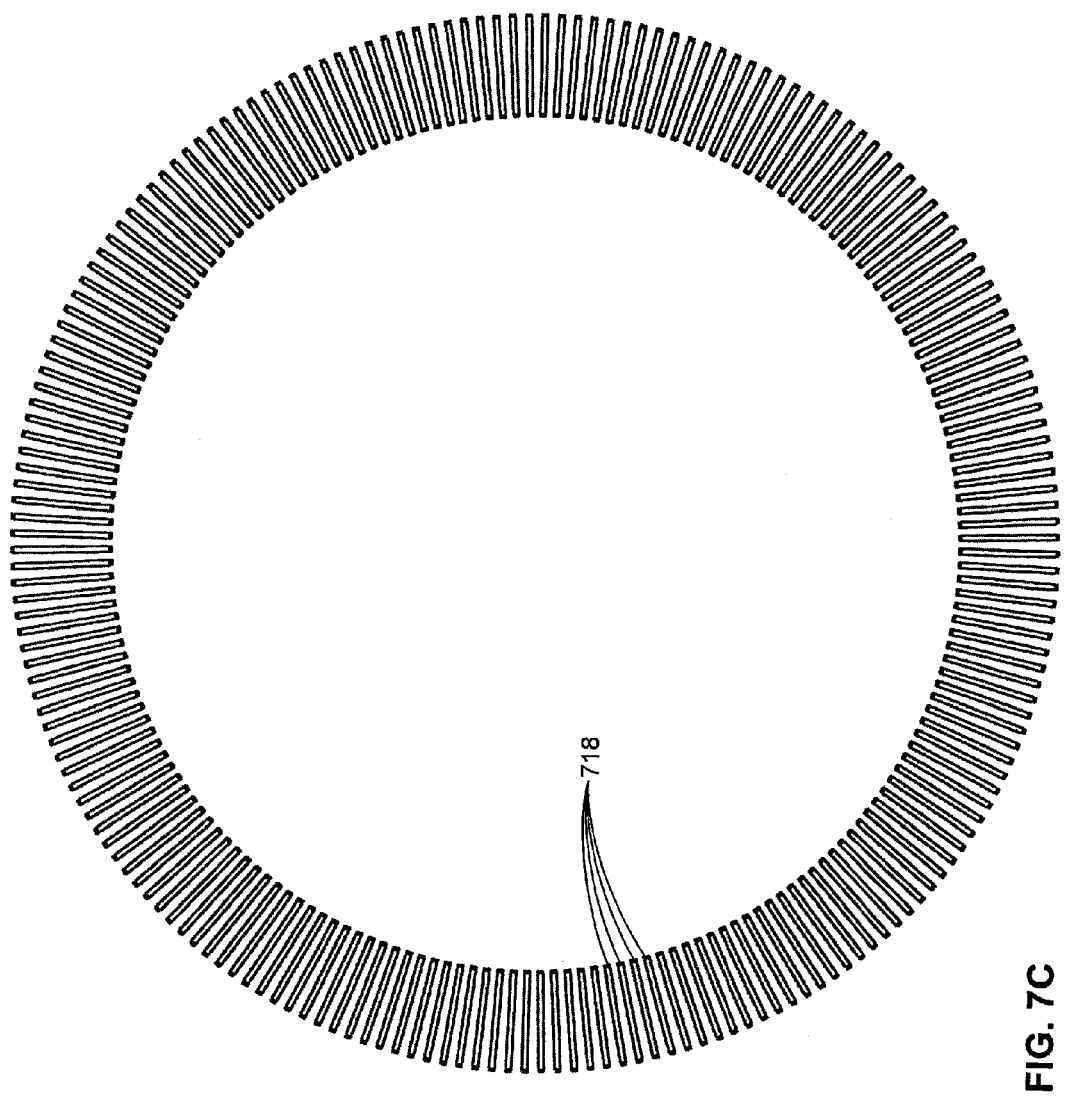
FIG. 7C illustrates a side view of a plurality of back return laminations in accordance with an exemplary embodiment.
Figure 7D:
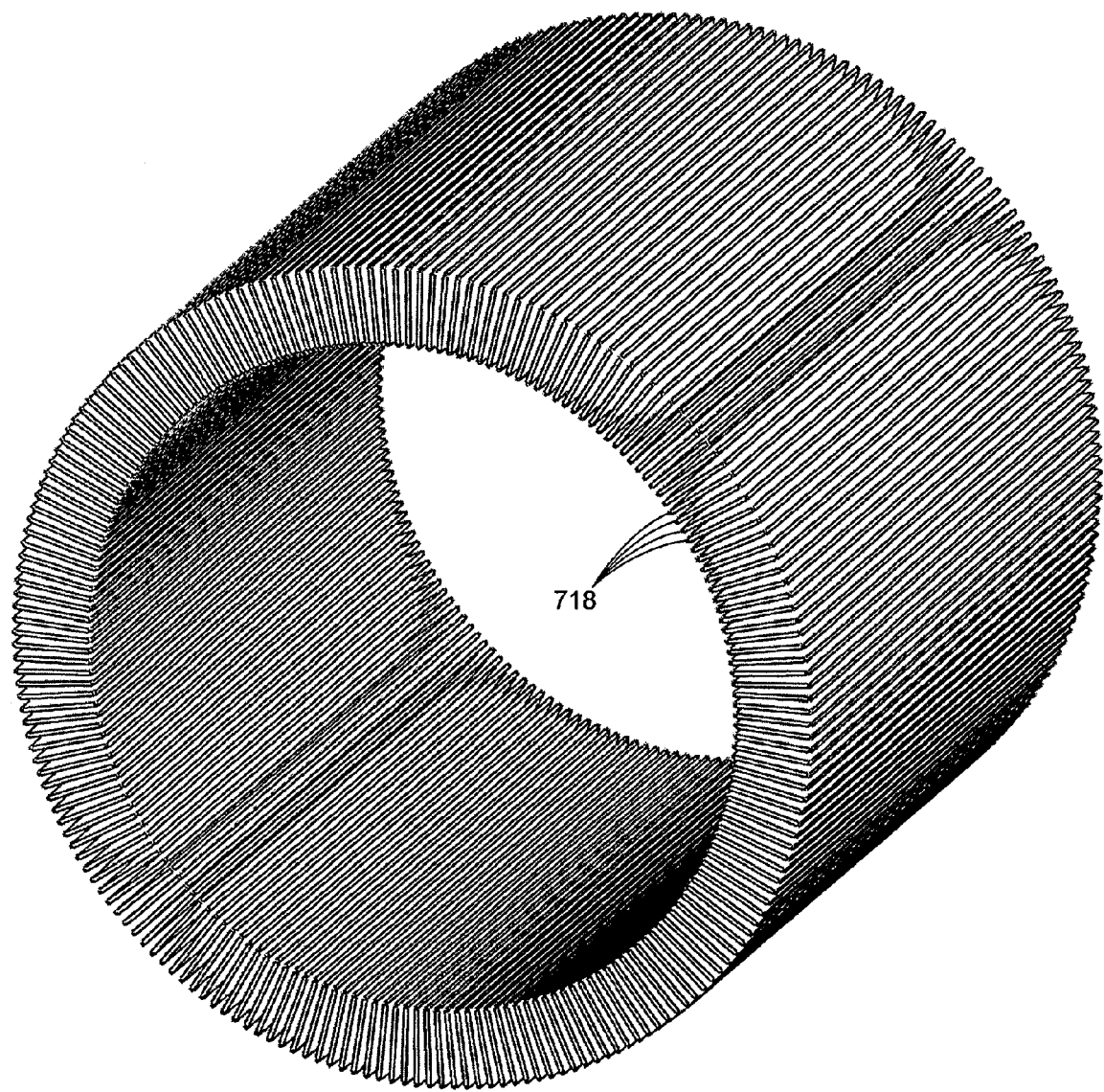
FIG. 7D illustrates a perspective view of a plurality of back return laminations in accordance with an exemplary embodiment.
Figure 7E:
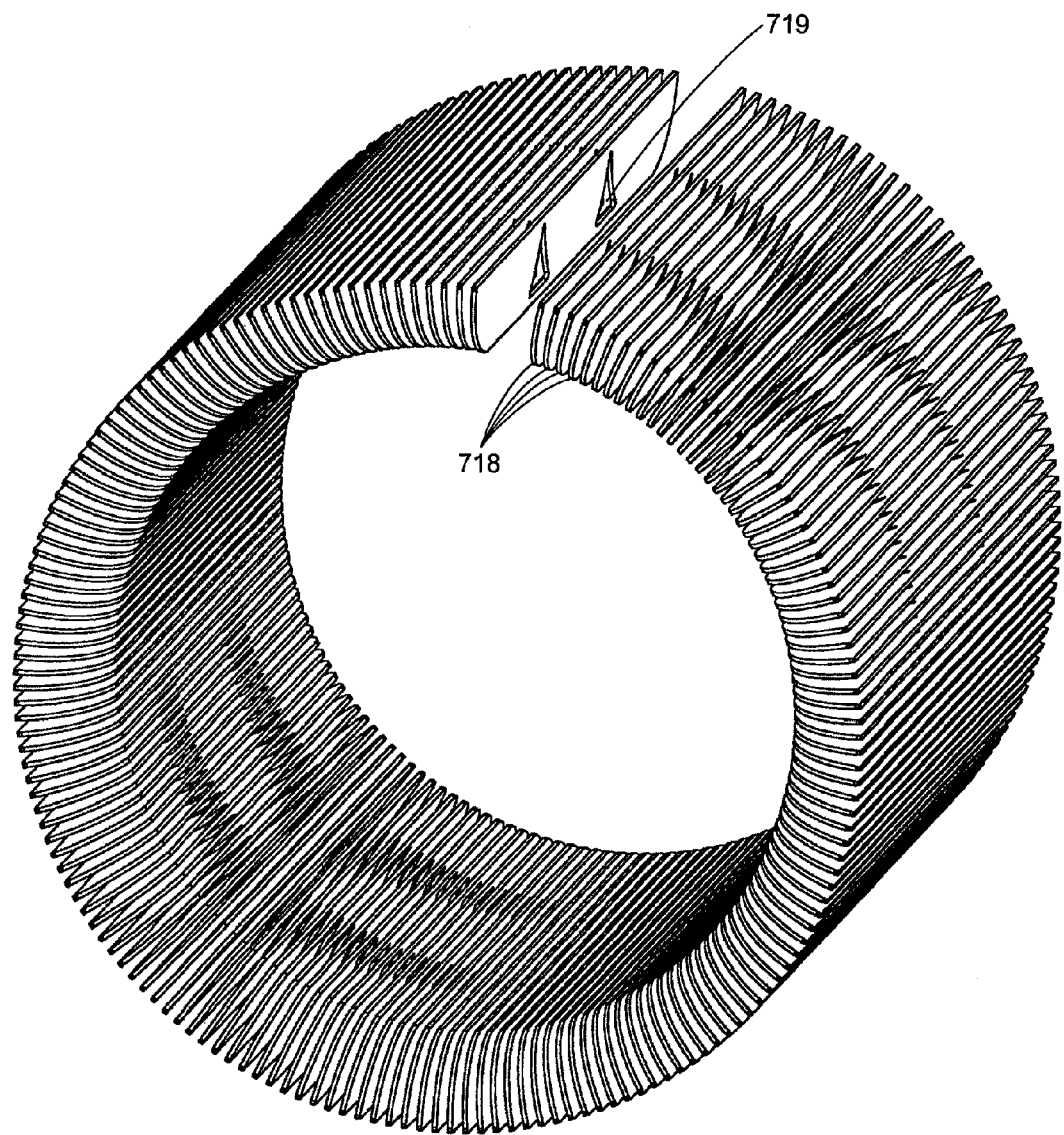
FIG. 7E illustrates a perspective view of a plurality of back return laminations having holes therein in accordance with an exemplary embodiment.

In various exemplary embodiments, with reference now to FIGS. 7C-7E, in various exemplary embodiments multiple back return laminations 718 may be disposed in a "rainbow"-like arctuate and/or circular configuration within an electrical machine, for example a transverse flux machine. As used herein, a "rainbow" or "rainbow lamination" configuration may be understood to mean a group of back return laminations 718, wherein each back return lamination extends generally in a direction parallel to the rotational axis of a transverse flux machine and/or commutated flux machine, and wherein the group of back return laminations is distributed over an arc around at least a portion of the rotational axis of the transverse flux machine and/or commutated flux machine. Moreover, a plurality of back return laminations 718 may be stamped, bonded, and/or coupled to one another, for example in a similar manner to side laminations 412.

In an exemplary transverse flux machine having a rotor interior to a stator, the "rainbow" of back return laminations 718 may be disposed generally toward the outside of the transverse flux machine (i.e., generally on the opposite side of the stator from the rotor). In another exemplary transverse flux machine having a rotor exterior to a stator, the "rainbow" of back return laminations 718 may be disposed generally toward the inside of the transverse flux machine (again, generally on the opposite side of the stator from the rotor).

Any suitable number of back return laminations 718 may be arranged in a rainbow configuration. In an exemplary embodiment, a particular transverse flux machine is configured with 200 back return laminations 718 in a rainbow configuration. In another exemplary embodiment, a transverse flux machine is configured with 150 back return laminations 718 in a rainbow configuration. In various exemplary embodiments, a transverse flux machine is configured with between about 50 back return laminations 718 and about 500 back return laminations 718 in a rainbow configuration.

In various exemplary embodiments, a transverse flux machine and/or commutated flux machine may comprise a rainbow of back return laminations 718 made from differing materials. For example, back return laminations 718 made from a first material may be interleaved with back return laminations 718 made from a second material. In this manner, improved mechanical, electrical, thermal, and/or magnetic characteristics and/or performance may be achieved.

For example, back return laminations 718 having a highly insulated coating may be interleaved with back return laminations 718 having a less electrically insulating and/or less expensive coating. Overall, the combined back return laminations 718 may thus achieve similar electrically insulative properties at a potentially reduced cost.

In another example, back return laminations 718 having a first set of magnetic characteristics may be interleaved with back return laminations 718 having a second set of magnetic characteristics. In this manner, the combined back return laminations 718 may achieve improved high-frequency flux switching performance, reduced hysteresis losses, and/or the like.

Figure 7F:
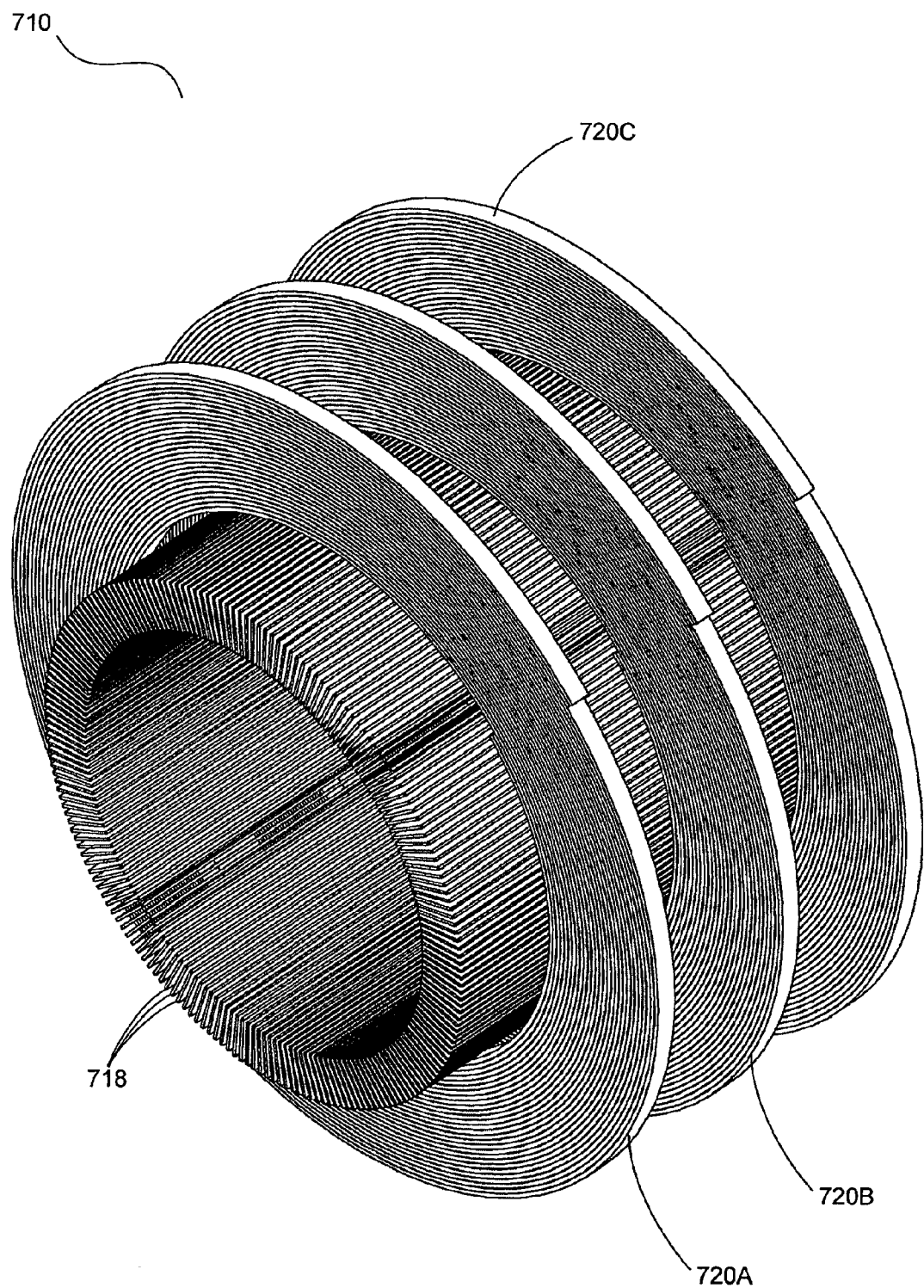
FIG. 7F illustrates a plurality of back return laminations disposed within a plurality of conductive coils in accordance with an exemplary embodiment.

Turning now to FIG. 7F, in various exemplary embodiments back return laminations 718 may form a rainbow-like shape extending a full 360 degrees around the rotational axis of a transverse flux machine and/or commutated flux machine. Moreover, the rainbow-like shape may be configured with a suitable length along a rotational axis to provide a flux return path around multiple conductive coils 720, for example coils 720A, 720B, and 720C.

Figure 7G:
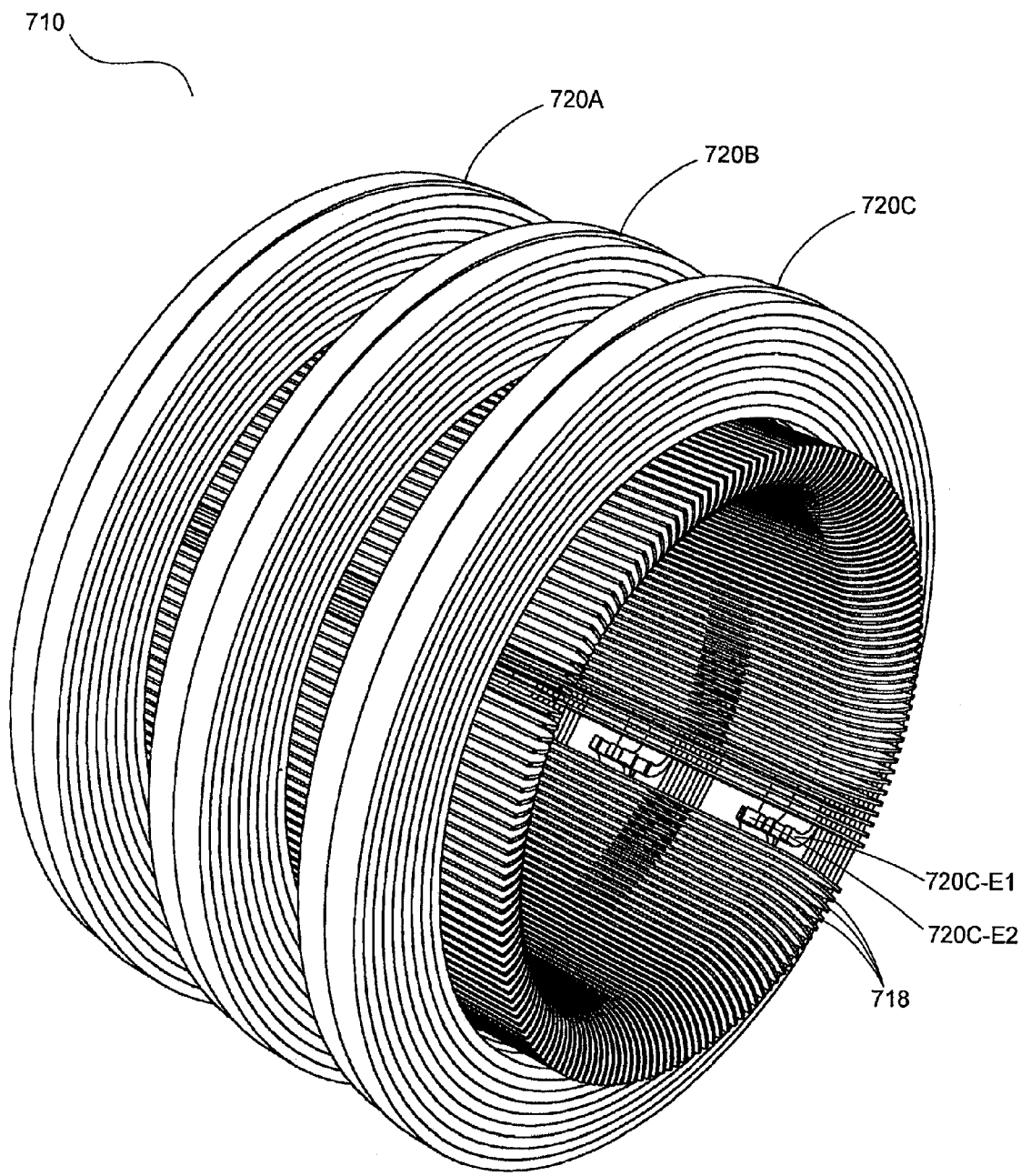
FIG. 7G illustrates a plurality of dual wound conductive coils, and a plurality of back return laminations having a gap for passing portions of the conductive coils therethrough in accordance with an exemplary embodiment.

With reference now to FIG. 7G, in various exemplary embodiments back return laminations 718 may form a rainbow-like shape extending only most of the way around the rotational axis of a transverse flux machine and/or commutated flux machine. For example, in polyphase stator assembly 710, a gap in a rainbow-like shape may be provided in order to facilitate electrical connections to coils 720A, 720B, and 720C.

In various exemplary embodiments, when a dual wound coil is utilized in polyphase stator assembly 710, for example as illustrated in FIG. 7G, a gap in a group of back return laminations 718 provides a point of entry for the ends of a coil 720 (e.g., coil end 720C-E1 and coil end 720C-E2 of coil 720C) into the interior of polyphase stator assembly 710. In this manner, electrical connections to one or more coils 720 may be made in a simplified manner. Additionally, a gap in a group of back return laminations 718 utilized in connection with a dual Wound coil eliminates the need for a bus bar or other external wiring, because both coil ends of a dual wound coil are located on the same side of the coil and can thus pass through the gap in the group of back return laminations 718 into the interior of polyphase stator assembly 710. This configuration enables more flux switching area on the exterior of polyphase stator assembly 710.

Additional details regarding principles of dual wound coils and low resistance coils are disclosed in U.S. patent application Ser. No. 13/291,385 entitled "TRANSVERSE AND/OR COMMUTATED FLUX SYSTEM COIL CONCEPTS" having the same filing date as the present application, the contents of which are hereby incorporated by reference in their entirety.

In various exemplary embodiments, back return laminations 718 comprise laminated and/or generally planar materials. In other exemplary embodiments, back return laminations 718 may comprise powdered metal, metallic glasses, and/or the like. In certain exemplary embodiments, back return laminations 718 may be configured as one or more portions of powdered metal forming a generally rainbow-like shape. Stated differently, one or more back return laminations 718 may be considered to be functionally similar to and/or interchangeable with a powdered metal component having a similar shape (or shape approximating that of a group of back return laminations 718). It will be appreciated that any suitable shape extending at least partially in an axial direction may be utilized, for example in order to provide a back return path for magnetic flux in a transverse flux machine and/or commutated flux machine.

Figure 8A:
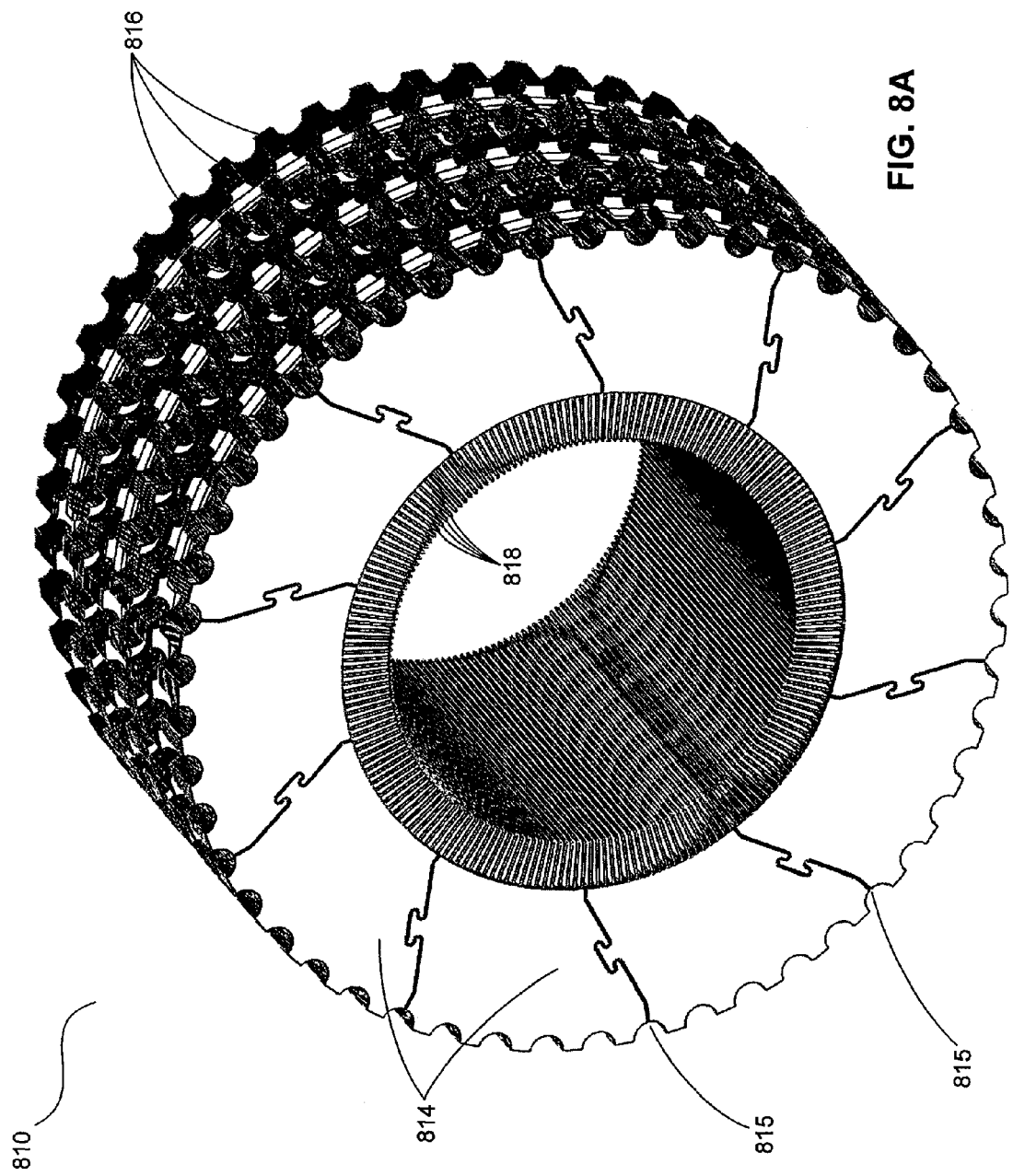
FIG. 8A illustrates a polyphase stator assembly comprising stacked side laminations having multiple interlocking cuts therethrough, a plurality of back return laminations, and multiple conductive coils in accordance with an exemplary embodiment.
Figure 8B:
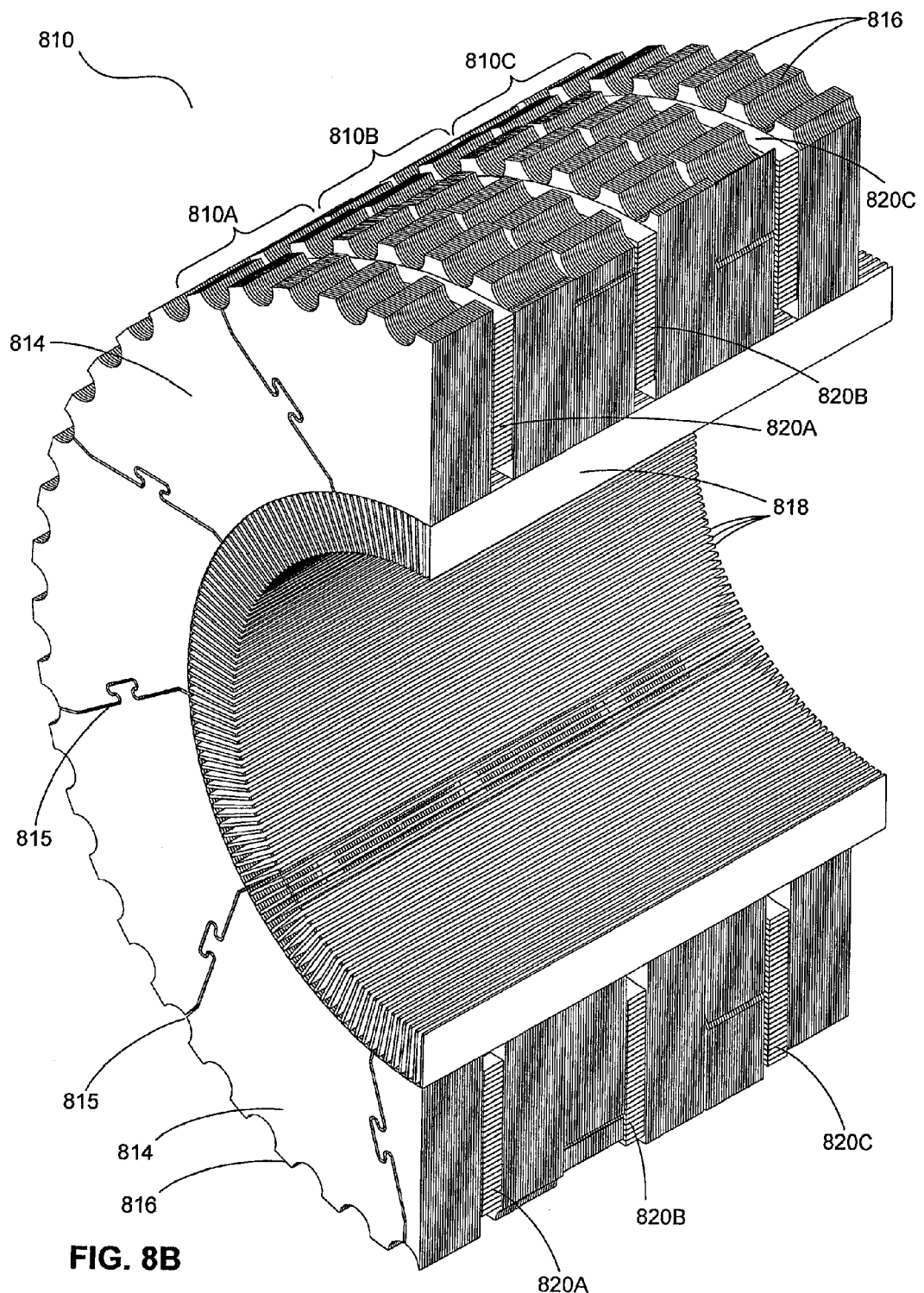
FIGS. 8B and 8C illustrate a cutaway view of a polyphase stator assembly in accordance with an exemplary embodiment.
Figure 8C:
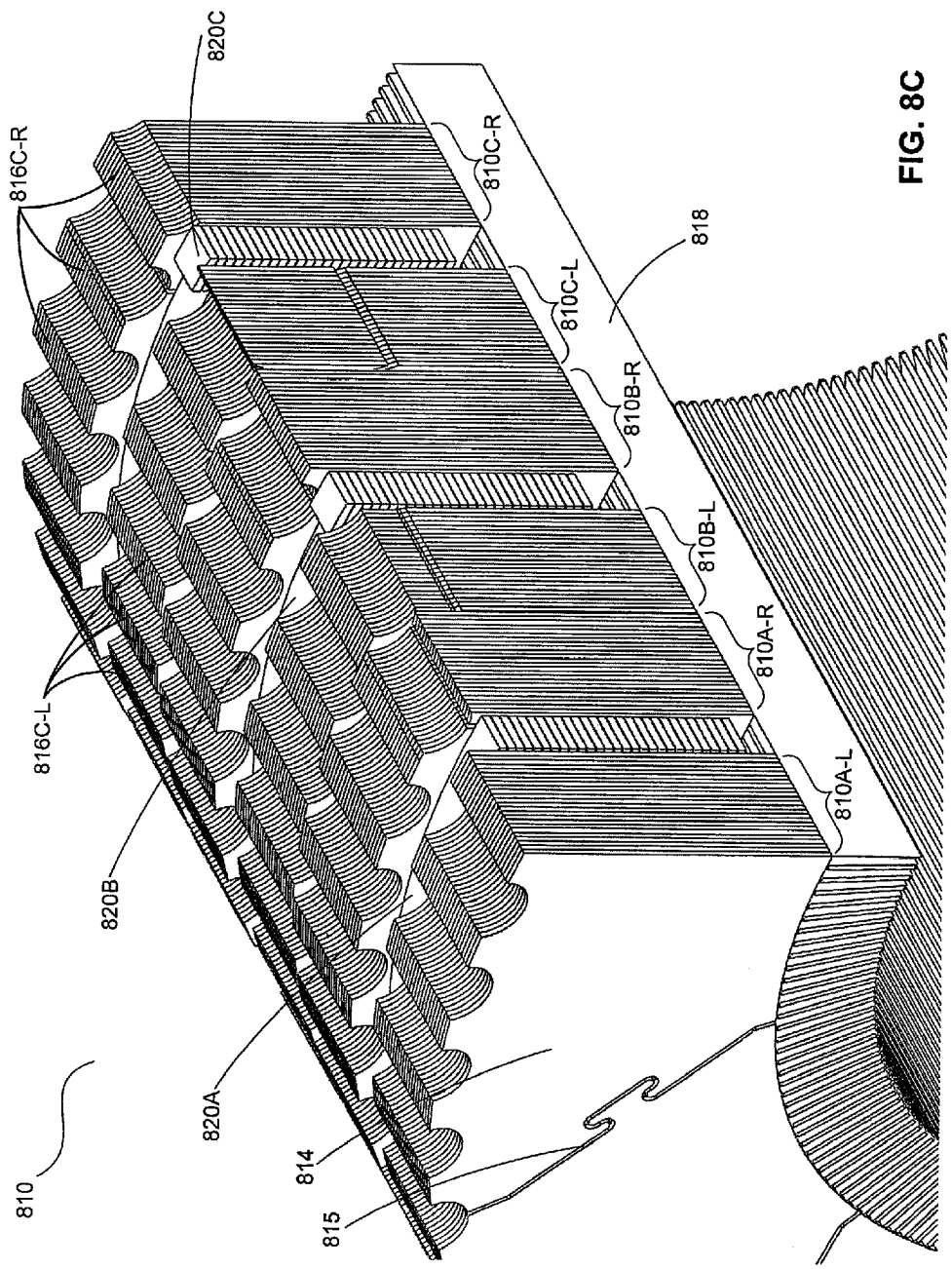

Principles of the present disclosure may be applied in single-phase electrical machines, dual-phase electrical machines, and/or electrical machines having three or more phases. Turning now to FIGS. 8A-8C, in various exemplary embodiments a polyphase stator assembly 810 comprises three stator phases 810A, 810B, and 810C sharing a common group of back return laminations 818 configured in a rainbow-like shape. Each of stator phases 810A, 810B, and 810C comprises multiple lamination stacks 814 having interlocking cuts 815. In each stator phase, the multiple lamination stacks 814 form generally ring-shaped structures.

In an exemplary embodiment, stator phases 810A, 810B, and 810C are configured to be about 120 degrees out of phase from one another. In other exemplary embodiments, stator phases 810A, 810B, and 810C may be configured with phase offsets greater than and/or less than 120 degrees. In an exemplary embodiment, stator phases 810A, 810B, and 810C are about in phase with one another.

When operated as a generator, stator assembly 810 interfaces with a rotor driven by an external force, causing magnetic flux to be conducted around coils 820A, 820B, and 820C, and thus inducing a current in coils 820A, 820B, and 820C. When stator assembly 810 is operated as a motor, an input current is provided to coils 820A, 820B, and 820C, resulting in movement of a coupled rotor.

In certain exemplary embodiments, with reference now to FIG. 8C, magnetic flux may be "shared" among stator phases 810A, 810B, and 810C during operation of stator assembly 810. For example, some magnetic flux passing "down" (i.e., away from a rotor) through the left side of stator phase 810C (i.e., side 810C-L) into back return lamination 818 may then travel through back return lamination 818 and "up" (i.e., toward the rotor) into the right side of stator phase 810B (i.e., side 810B-R), instead of through back return lamination 818 into the right side of stator phase 810C (i.e., side 810C-R).

In certain exemplary embodiments, flux sharing may be reduced by increasing the spacing between stator phases, for example by providing a gap of between about 0.05 mm and about 2 mm between stator phases along the rotational axis. Additionally, flux sharing may be reduced by configuring stator phases 810A, 810B, and 810C to differ in phase from one another, for example differing in phase by about 120 degrees. Flux sharing may also be reduced by modifying the size and/or configuration of holes 719 in back return laminations 718, for example by reducing the volume of back return laminations 718 located generally near the border of stator phases 810A, 810B, and 810C.

Yet further, flux sharing may be reduced by configuring back return laminations 718 as multiple pieces of generally planar material stacked end to end, with portions of material having a low magnetic permeability therebetween. The portions of low magnetic permeability may be configured to generally align with the edges of stator phases 810A, 810B, and 810C. In this manner, magnetic flux may be hindered from flowing between stator phases 810A, 810B, and 810C through back return laminations 718.

In various exemplary embodiments, flux sharing may be increased by decreasing the spacing between stator phases, for example by placing stator phases within about 1.5 mm of one another along the rotational axis. Flux sharing may also be increased by aligning stator phases 810A, 810B, and/or 810C more closely in phase with one another, and/or by providing sufficient volume of back return laminations 718 located generally near the border of stator phases 810A, 810B, and 810C.

In various exemplary embodiments, stator phases 810A, 810B, and/or 810C may be at least partially electrically and/or magnetically insulated and/or isolated from one another. For example, an electrically insulating coating, film, sheet, or other suitable material may be disposed between stator phases 810A and 810B and between stator phases 810B and 810C. In this manner, resistive and other losses in polyphase stator assembly 810 can be further reduced. Moreover, stator phases 810A, 810B, and/or 810C may be physically spaced apart and/or separated from one another. The spacing may be accomplished by disposing an insulating material between stator phases, for example as disclosed above; alternatively, the spacing may be implemented simply as an air gap. In various exemplary embodiments, the spacing between adjacent stator phases in polyphase stator assembly 810 (for example, stator phase 810-A and 810B) may be a distance of between about 0.002 inches (0.05 mm) and about 0.0787 inches (2 mm).

In various exemplary embodiments, teeth 816 in stator phases 810A, 810B, and/or 810C are configured to modify, control, and/or otherwise configure the timing of flux switching in an electrical machine. For example, teeth 816 in stator phases 810A, 810B, and/or 810C may be configured to implement a phase offset, for example a sixth phase offset. In an exemplary embodiment, teeth 816 on the right side of stator phase 810C (i.e., teeth 816C-R) and/or teeth 816 on the left side of stator phase 810C (i.e., teeth 816C-L) are configured to implement a sixth phase offset over the circumference of stator phase 810C. In another exemplary embodiment, teeth 816C-R and/or 816C-L are configured to implement a double sixth phase offset over the circumference of stator phase 810C.

In various exemplary embodiments, teeth 816 on one lamination stack 814 are configured to implement a sixth phase offset. In other exemplary embodiments, teeth 816 on a lamination stack 814 are configured to implement a sixth phase offset when two such lamination stacks 814 are coupled together. Stated another way, in these exemplary embodiments a sixth phase offset is distributed across the teeth 816 of two lamination stacks 814. Moreover, a sixth phase offset may be implemented in and/or distributed across three lamination stacks 814, four laminations stacks 814, and/or any suitable number of lamination stacks 814 or any suitable portion of stator assembly 810, as desired. Additional details regarding principles of phase offset in transverse flux machines and/or commutated flux machines are disclosed in U.S. patent application Ser. No. 12/772,962 filed on May 3, 2010, now U.S. Patent Application Publication No. 2011/0169366 entitled "TRANSVERSE AND/OR COMMUTATED SYSTEMS HAVING PHASE OFFSET", the contents of which are hereby incorporated by reference in their entirety.

Figure 8D:
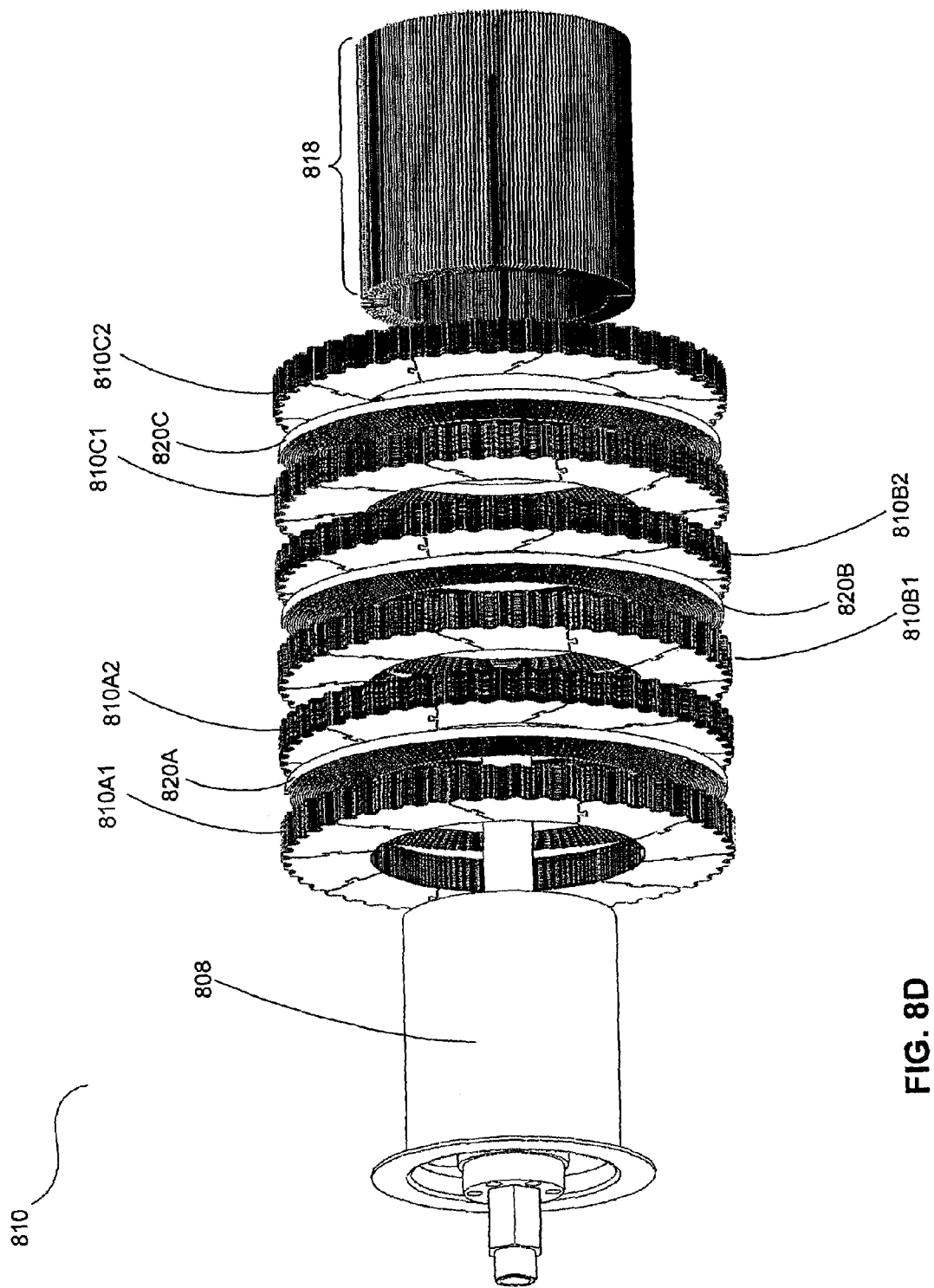
FIG. 8D illustrates an exploded view of a polyphase stator assembly in accordance with an exemplary embodiment.
Figure 8E:
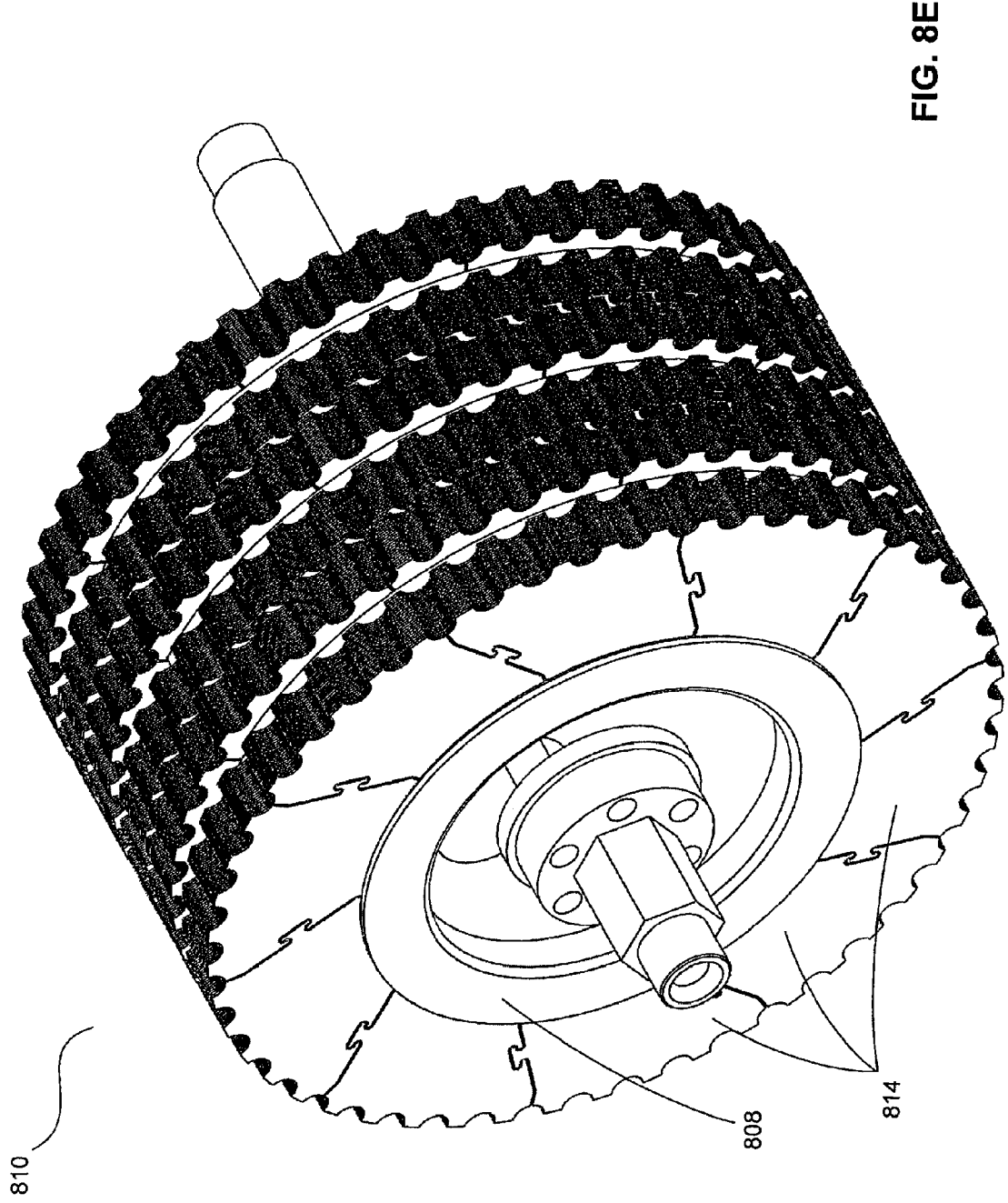
FIG. 8E illustrates an assembled view of a polyphase stator assembly in accordance with an exemplary embodiment.

With reference now to FIGS. 8D-8E, in various exemplary embodiments polyphase stator assembly 810 may comprise various electrical and/or magnetic components coupled to a hub 808. For example, polyphase stator assembly 810 may comprise three conductive coils 820A, 820B, and 820C, disposed between stator portions 810A1, 810A2, 810B1, 810B2, 810C1, and 810C2, respectively. Back return laminations 818 and hub 808 are located generally on the interior of stator assembly 810.

Figure 8F:
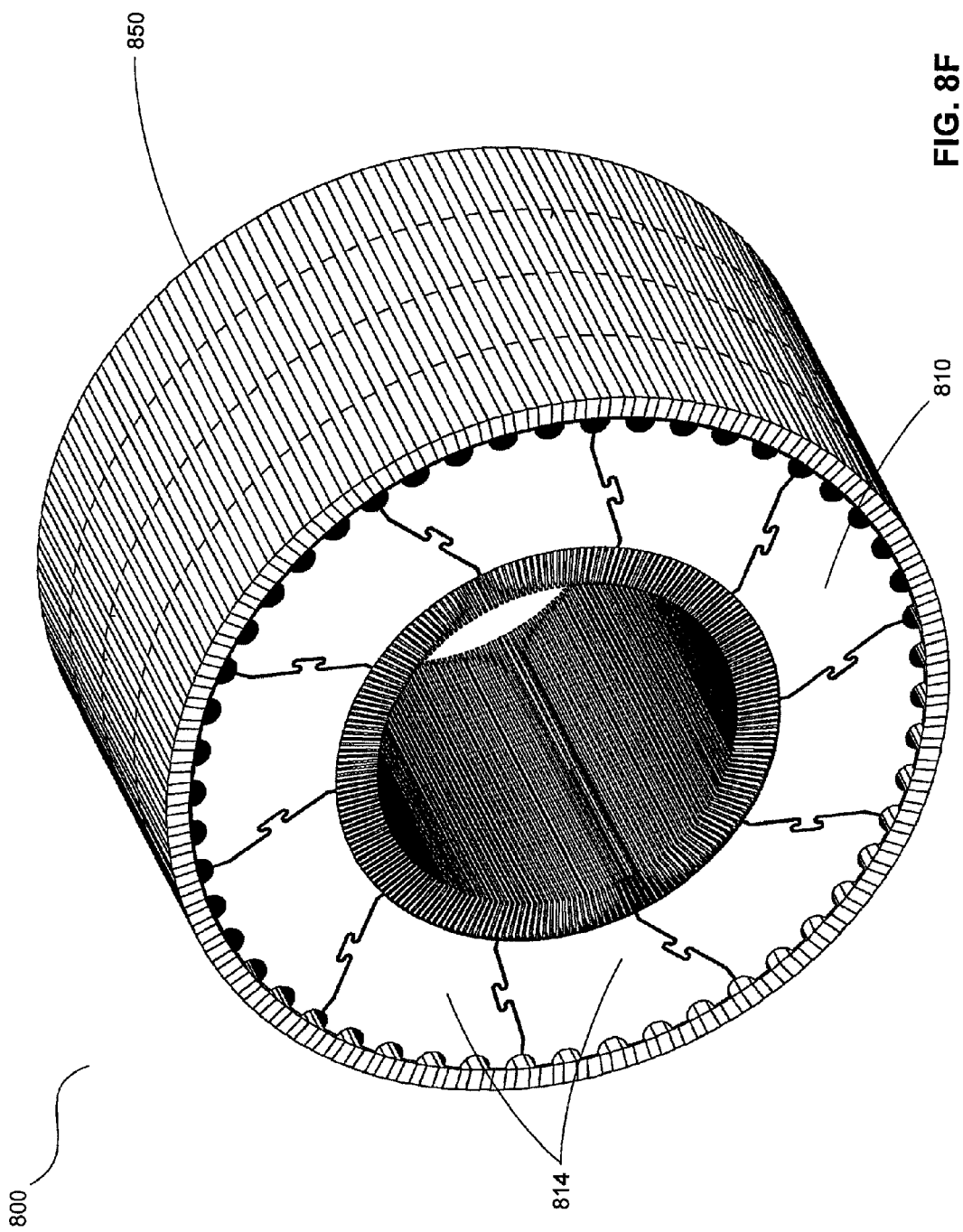
FIG. 8F illustrates an exemplary transverse flux machine in accordance with an exemplary embodiment.
Figure 8G:
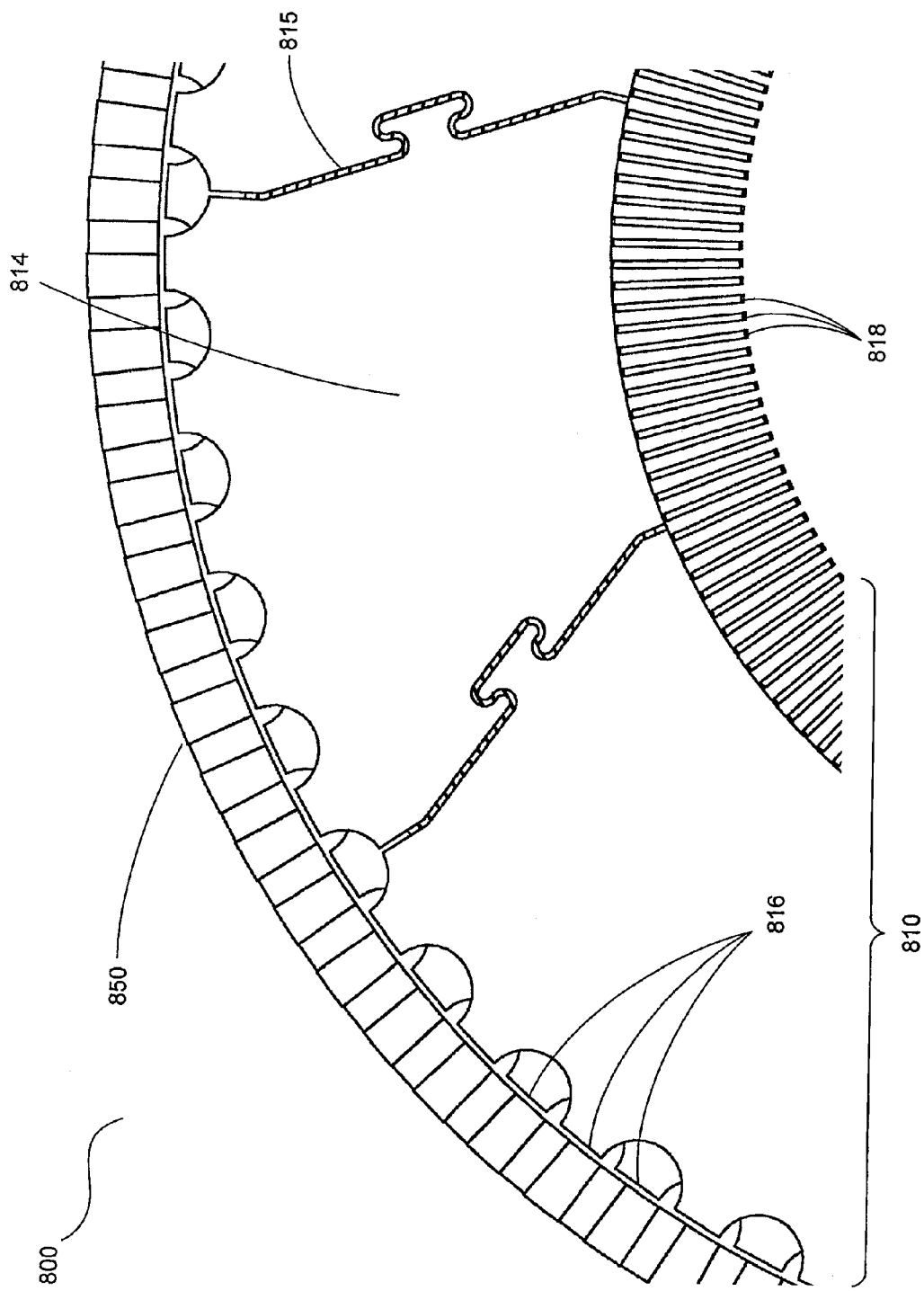
FIG. 8G illustrates a side view of an exemplary transverse flux machine in accordance with an exemplary embodiment.
Figure 8H:
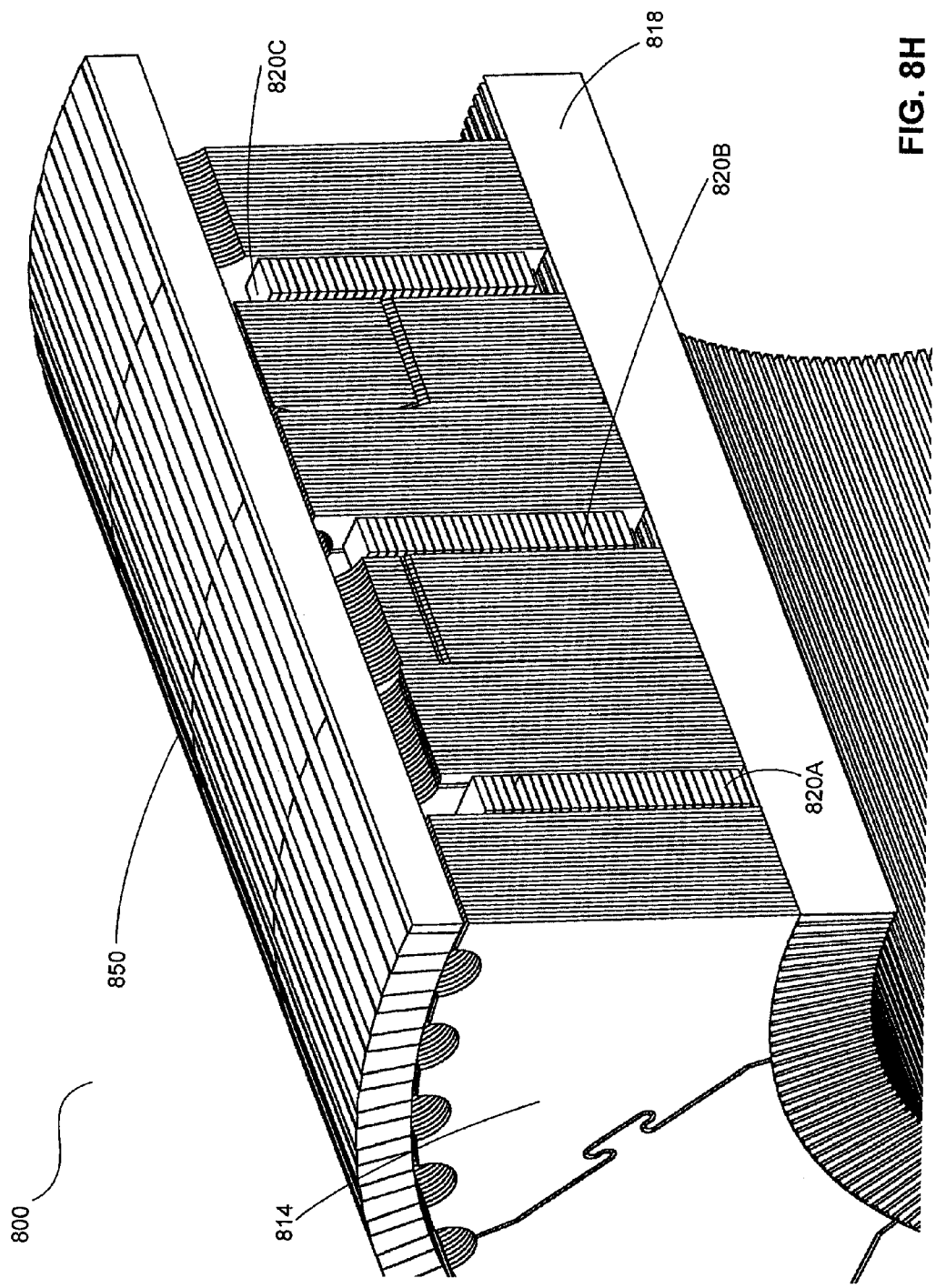
FIG. 8H illustrates a cutaway view of an exemplary transverse flux machine in accordance with an exemplary embodiment.

In an exemplary embodiment, turning to FIGS. 8F-8H, a polyphase transverse flux machine 800 comprises a rotor 850 engaged with a stator assembly 810. Stator assembly 810 comprises multiple lamination stacks 814 configured with teeth 816 and interlocking cuts 815. Responsive to rotation of rotor 850, flux is switched around coils 820A, 820B, and 820C, creating an output current in coils 820A, 820B, and 820C. Alternatively, responsive to an input current in one or more of coils 820A, 820B, or 820C, rotor 850 is driven to rotate.

Electrical machines configured in accordance with principles of the present disclosure may be configured to operate at any suitable voltage and/or voltages. For example, in an exemplary embodiment, transverse flux machine 800 is configured to operate at a voltage of about 24 volts in each of coils 820A, 820B, and 820C. In another exemplary embodiment, transverse flux machine 800 is configured to operate at a voltage of about 48 volts in each of coils 820A, 820B, and 820C. In another exemplary embodiment, transverse flux machine 800 is configured to operate at a voltage of about 160 volts in each of coils 820A, 820B, and 820C. In another exemplary embodiment, transverse flux machine 800 is configured to operate at a voltage of about 600 volts in each of coils 820A, 820B, and 820C. Moreover, transverse flux machine 800 may be configured to operate at any suitable voltage and/or voltages, as desired.

Electrical machines configured in accordance with principles of the present disclosure may be configured to operate in connection with any suitable controller and/or controllers. For example, in an exemplary embodiment, transverse flux machine 800 is configured to operate in connection with a pulse width modulation (PWM) controller. In various exemplary embodiments, transverse flux machine 800 is configured to operate in connection with a sinusoidal drive, a trapezoidal drive, and/or the like. Moreover, transverse flux machine 800 may be configured to operate in connection with field-oriented control, block commutation, and/or the like.

Principles of the present disclosure may suitably be combined with various other principles related to transverse flux machines and/or commutated flux machines. For example, principles of the present disclosure may suitably be combined with principles for stators in transverse flux machines and commutated flux machines, for example principles for partial stators and/or gapped stators, as disclosed in U.S. patent application Ser. No. 12/611,728 filed on Nov. 3, 2009, now U.S. Pat. No. 7,851,965 entitled "TRANSVERSE AND/OR COMMUTATED FLUX SYSTEM STATOR CONCEPTS", the contents of which are hereby incorporated by reference in their entirety.

Principles of the present disclosure may also suitably be combined with principles for rotors in transverse flux machines and/or commutated flux machines, for example tape wound rotors and/or multipath rotors, as disclosed in U.S. patent application Ser. No. 12/611,733 filed on Nov. 3, 2009, now U.S. Pat. No. 7,923,886 entitled "TRANSVERSE AND/OR COMMUTATED FLUX SYSTEM ROTOR CONCEPTS", the contents of which are hereby incorporated by reference in their entirety.

Principles of the present disclosure may also suitably be combined with principles of polyphase transverse flux machines and/or polyphase commutated flux machines as disclosed in U.S. patent application Ser. No. 12/611,737 filed on Nov. 3, 2009, now U.S. Pat. No. 7,868,508 entitled "POLYPHASE TRANSVERSE AND/OR COMMUTATED FLUX SYSTEMS", the contents of which are hereby incorporated by reference in their entirety.

Principles of the present disclosure may also suitably be combined with principles of extended magnets, overhung rotors, and/or stator tooth overlap in transverse flux machines and/or commutated flux machines as disclosed in U.S. patent application Ser. No. 12/772,958 filed on May 3, 2010, now U.S. Pat. No. 8,053,944 entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING", the contents of which are hereby incorporated by reference in their entirety.

Principles of the present disclosure may also suitably be combined with principles of utilization of transverse flux machines and/or commutated flux machines in electric bicycles as disclosed in U.S. patent application Ser. No. 12/772,959 filed on May 3, 2010, now U.S. Patent Application Publication No. 2011/0169381 entitled "TRANSVERSE AND/OR COMMUTATED FLUX SYSTEMS FOR ELECTRIC BICYCLES", the contents of which are hereby incorporated by reference in their entirety.

Principles of the present disclosure may also suitably be combined with principles of phase offset in transverse flux machines and/or commutated flux machines as disclosed in U.S. patent application Ser. No. 12/772,962 filed on May 3, 2010, now U.S. Patent Application Publication No. 2011/0169366 entitled "TRANSVERSE AND/OR COMMUTATED SYSTEMS HAVING PHASE OFFSET", the contents of which are hereby incorporated by reference in their entirety.

Principles of the present disclosure may also suitably be combined with principles of coils, including dual wound coils in transverse flux machines and for commutated flux machines as disclosed in U.S. patent application Ser. No. 13/291,385 entitled "TRANSVERSE AND/OR COMMUTATED FLUX SYSTEM COIL CONCEPTS" having the same filing date as the present application, the contents of which are hereby incorporated by reference in their entirety.

Principles of the present disclosure may also suitably be combined with principles of laminations combined with powdered metal portions in transverse flux machines and/or commutated flux machines as disclosed in U.S. patent application Ser. No. 13/291,392 entitled "TRANSVERSE AND/OR COMMUTATED FLUX SYSTEMS HAVING LAMINATED AND POWDERED METAL PORTIONS" having the same filing date as the present application, the contents of which are hereby incorporated by reference in their entirety.

Principles of the present disclosure may also suitably be combined with principles of isolated torque sensing systems as disclosed in U.S. Provisional Patent Application No. 61/453,000 filed Mar. 15, 2011 entitled "ISOLATED TORQUE SENSOR", the contents of which are hereby incorporated by reference in their entirety.

Principles of the present disclosure may also suitably be combined with principles of adjustable Hall effect sensor systems as disclosed in U.S. Provisional Patent Application No. 61/453,006 filed Mar. 15, 2011 and entitled "ADJUSTABLE HALL EFFECT SENSOR SYSTEM", the contents of which are hereby incorporated by reference in their entirety.

Moreover, principles of the present disclosure may suitably be combined with any number of principles disclosed in any one of and/or all of the U.S. Patents and/or patent applications incorporated by reference herein. Thus, for example, a particular transverse flux machine and/or commutated flux machine may incorporate use of segmented stator laminations, use of rainbow-like back return laminations, use of a dual wound coil, use of a lamination stack with powdered metal teeth, use of a sixth-phase offset, use of extended magnets, use of an overhung rotor, use of stator tooth overlap, use of a tape wound rotor, use of a multipath rotor, use of a partial stator, use of a polyphase design, and/or the like. All such combinations, permutations, and/or other interrelationships are considered to be within the scope of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method for reducing losses in an electrical machine, the method comprising:
   forming a first stator portion from a first lamination stack and a second lamination stack, the first lamination stack and the second lamination stack having a gap therebetween, the first lamination stack and the second lamination stack being arranged circumferentially with respect to a rotational axis for the electrical machine;
   forming a second stator portion from a third lamination stack and a fourth lamination stack, the third lamination stack and the fourth lamination stack having a gap therebetween, the third lamination stack and the fourth lamination stack being arranged circumferentially with respect to the rotational axis for the electrical machine; and
   coupling the first stator portion to the second stator portion by at least one back return lamination to provide a flux path at least partially around a coil arranged circumferentially with respect to and fully encircling the rotational axis, wherein the first stator portion is positioned on a first side of the coil, and the second stator portion is positioned on a second side of the coil;
   wherein the electrical machine is at least one of a transverse flux machine or a commutated flux machine.

2. The method of claim 1, wherein the first lamination stack and the second lamination stack are separable by a plane perpendicular to the rotational axis of the electrical machine.

3. The method of claim 1, wherein the gaps are configured to provide features for mechanical connection between at least two of the multiple lamination stacks.

4. The method of claim 1, wherein the first stator portion has at least one gap therethrough configured to reduce losses from flux linking within the first stator portion.

5. The method of claim 1, wherein the electrical machine is configured with a torque density in excess of 20 Newton-meters per kilogram of active magnetic and electrical materials in the electrical machine.

6. The method of claim 1, wherein the coil is configured with a resistance of less than 0.1 ohm.

7. The method of claim 1, wherein the electrical machine is configured for use in an e-bike.

8. The method of claim 1, further comprising multiple back return laminations, wherein the multiple back return laminations extend more than 330 degrees around the rotational axis of the electrical machine.

9. The method of claim 1, wherein the back return lamination is configured with a least two holes therethrough in order to reduce flux sharing in the electrical machine.

10. The method of claim 1, wherein the first lamination stack and the second lamination stack are interlocking.

11. The method of claim 1, wherein the first lamination stack and the second lamination stack are coupled together via a non-magnetic component interlocking with the first lamination stack and the second lamination stack.

12. The method of claim 1, wherein the gap between the first lamination stack and the second lamination stack reduces losses in the first stator portion.

13. The method of claim 1, wherein the first stator portion comprises multiple lamination stacks interlocked to form a generally ring-shaped structure.

14. A method for reducing losses in an electrical machine, the method comprising:
   forming a first stator portion from a first lamination stack and a second lamination stack, the first lamination stack and the second lamination stack having a gap therebetween;
   forming a second stator portion from a third lamination stack and a fourth lamination stack, the third lamination stack and the fourth lamination stack having a gap therebetween; and
   coupling the first stator portion to the second stator portion by at least one back return lamination to provide a flux path at least partially around a coil;
   wherein the gaps are interlocking gaps; and
   wherein the electrical machine is at least one of a transverse flux machine or a commutated flux machine.

15. A method for reducing losses in an electrical machine, the method comprising:
   forming a first stator portion from a first lamination stack and a second lamination stack, the first lamination stack and the second lamination stack having a gap therebetween;
   forming a second stator portion from a third lamination stack and a fourth lamination stack, the third lamination stack and the fourth lamination stack having a gap therebetween; and
   coupling the first stator portion to the second stator portion by at least one back return lamination to provide a flux path at least partially around a coil;
   wherein the first lamination stack comprises alternating layers of a first planar material and a second planar material; and
   wherein the electrical machine is at least one of a transverse flux machine or a commutated flux machine.

* * * * *